US005619631A

United States Patent [19]
Schott

[11] Patent Number: 5,619,631
[45] Date of Patent: Apr. 8, 1997

[54] METHOD AND APPARATUS FOR DATA ALTERATION BY MANIPULATION OF REPRESENTATIONAL GRAPHS

[75] Inventor: Eric G. Schott, Mercer Island, Wash.

[73] Assignee: BinaryBlitz, Reno, Nev.

[21] Appl. No.: 472,390

[22] Filed: Jun. 7, 1995

[51] Int. Cl.$^6$ ............................................. G06F 15/00
[52] U.S. Cl. ................................................. 395/140
[58] Field of Search ........................... 395/140, 135, 395/133, 155, 161; 345/113, 114

[56] References Cited

U.S. PATENT DOCUMENTS

| | | | |
|---|---|---|---|
| 4,788,538 | 11/1988 | Klein et al. | 340/747 |
| 5,237,648 | 8/1993 | Mills et al. | 395/133 |
| 5,461,708 | 10/1995 | Kahn | 395/140 |
| 5,522,022 | 5/1996 | Rao et al. | 395/140 |
| 5,553,212 | 9/1996 | Etoh et al. | 395/140 |

*Primary Examiner*—Phu K. Nguyen
*Attorney, Agent, or Firm*—Christensen, O'Connor, Johnson & Kindness PLLC

[57] ABSTRACT

A method and apparatus are provided for altering data by manipulation of representational dynamic graphs. Specifically, a method and apparatus are provided for using dynamic graphs wherein the computer user is able to manipulate the graph shape directly, which in turn not only modifies the graph, but also alters the corresponding and underlying tabularized data, as well as any associated numeric representations of the data that may be presented to the computer user. The method and apparatus are provided for use with a computer system having a processing unit, system memory, a user manipulation device, and a video display, wherein a dynamic graph is created having at least one data representation element which may be focused or unfocused. Creation of the dynamic graph includes creating and saving graphical and statistical characteristics of the dynamic graph. Manipulation of a data representation element via the user manipulation device may include reconfiguring the dynamic graph to select a focused data representation element desired to be manipulated. Modification of the dynamic graph according to user manipulation includes altering not only the graphical display, but also the underlying graph data corresponding to the dynamic graph. The method and apparatus thereby provide a simple and easy way for users to alter their data and modify the interrelationship between associated data by intuitive manipulation of representational dynamic graphs.

46 Claims, 36 Drawing Sheets

METHOD AND APPARATUS FOR DATA ALTERATION BY MANIPULATION OF REPRESENTATIONAL GRAPHS

FIELD OF THE INVENTION

This invention generally relates to systems for inputting, storing, and displaying data in textual and graphical form, and particularly relates to a method and apparatus for data alteration by manipulation of a representational graph.

BACKGROUND OF THE INVENTION

It is common in computer systems to represent and convey information through graphic representations. These representations may take a variety of forms, such as alphanumeric characters, various sorts of graphs, as well as images of physical objects rendered on various computer output devices, such as display video displays or printers. Historically, humans have controlled computer systems through keyboard entry of discrete commands, and entered data through keyboard data entry. Such commands or data are typically comprised of letters, numbers, and symbols. It has been discovered, however, that the ease of using computerized systems is generally a function of how close the system models the logical thought of its human user. A person can absorb and manipulate information placed in a visual or graphical context much faster than if the same information is represented merely by alphanumeric text. As a result, in recent years, interfaces for computer systems have been developed that more closely model what is expected by their human users, taking advantage of benefits associated with the visual or graphical display of information to make such systems easier to learn and use. These are often known as WYSIWYG (What-You-See-Is-What-You-Get) or GUI (Graphical-User-Interface) interfaces. Providing for computer control and data entry by a variety of means other than through keyboard entry, such as by mouse, joystick, trackball, or light pen, these interfaces have gone a long way to make user accessibility to computer data and its manipulation a reality.

Beyond simply controlling the computer and entering data, however, it is frequently desirable to see graphically the data entered, and in particular to see the interrelationship of this data. One way of accomplishing this has been the development of spreadsheet programs for use on computer systems that provide for data, such as numbers, to be entered into the computer system and subsequently displayed in graphic form. The numbers entered are initially represented by alphanumeric characters stored in a multiplicity of cells identified by a row and column address on the video display. Subsequent manipulation of data disposed in these spreadsheet programs typically requires the user to enter data into the cells by typing the numbers on a computer keyboard. To see the interrelationship of these numbers in graphic form, the numbers are output as a graph. Should the shape of the graph not be to the liking of the user of the computer system, or should the user desire to change the interrelationship among the numbers represented by the graph, new numbers must be typed into the cells of the spreadsheet, at which time the graph shape may change to reflect the change made to the numbers. While the data generally can be simultaneously displayed on the same computer video display as both alphanumeric characters and as a graph, the requirement that the user enter data on the keyboard renders the operation of the spreadsheet more difficult, and slows the user's quest for ultimate results, namely the manipulation of the interrelationship among the data to achieve the desired graph shape.

SUMMARY OF THE INVENTION

In accordance with the present invention, a method and apparatus are provided to create a dynamic graphical representation of data, such as data found in a computer spreadsheet program, reconfigure the graphical representation according to user manipulation of the graph, and modify the graphical representation as well as the underlying data stored in data arrays based on the user input. Such a method and apparatus overcome limitations associated with computer keyboard entry of data, and provides a simple and easy way for users to alter their data and modify the interrelationship between associated data by intuitive manipulation of representational graphs.

More specifically, a method and apparatus are provided for use with a computer system having a processing unit, system memory, a user manipulation device, and a video display, wherein a dynamic graph is created having at least one data representation element which may be focused (selected by the user directly or indirectly through the computer system components) or unfocused (deselected by the user directly or indirectly through the computer system components). The status of the data representation element as focused or unfocused relates to its capability to be manipulated by the user manipulation device. Creating the dynamic graph includes determining graph data for representation as a data representation element, along with graph parameters including graphical hardware and software constraints. A scaling factor is determined for use in scaling the data representation element such that it can be displayed within the graph parameters. The graph data and scaling factor is then used to create data representation element display characteristics, which describe the numerical as well as the visual characteristics of the data representation element. These characteristics are saved in system memory. The dynamic graph and its corresponding data representation elements are displayed on the video display.

The present invention then monitors the computer system for user input and determines, based on that input, whether the computer user seeks to manipulate an unfocused data representation element. If the user seeks to manipulate an unfocused data representation element, focus information is determined indicating which data representation element the computer user is selecting for manipulation. The dynamic graph is then reconfigured by shifting the focus to the data representation element indicated by the focus information.

If the user input indicates that the computer user seeks to manipulate a data representation element that is already focused, alteration information is determined that indicates how the computer user desires to alter the underlying graph data represented by the data representation element. Based on the alteration information, the dynamic graph is modified. The underlying graph data stored in system memory is altered according to the alteration information. The alteration of the graph data is reported to associated system components. In this way, the user need only direct a change in the dynamic graph by use of the user manipulation device, whereupon the video display and an associated spreadsheet, for example, are automatically reconfigured.

In accordance with other aspects of the present invention, the data representation element may be protected or unprotected, and the user may be prevented from manipulating a protected data representation element.

In accordance with other aspects of this invention, a dynamic output graph is created and manipulated based on alteration information obtained from associated system components.

In accordance with yet other aspects of the present invention, associated system components are notified of information pertaining to manipulation of the dynamic data representation elements.

In accordance with other aspects of the present invention, attempts for manipulation of the data representation element beyond the boundaries of the dynamic graph results in reverting the data representation element to its position immediately preceding the attempted manipulation.

In accordance with yet other aspects of the present invention, the user manipulation device includes a pointer and a button capable of manipulation, wherein the pointer position is monitored and the button status is monitored to determine the desired position of the pointer within the dynamic graph.

In accordance with still other aspects of the present invention, the dynamic graph is a bar graph having bar elements. The user manipulation device is used to direct change in features of a bar, such as height or width, and the video display and associated data tables are reconfigured to correspond to the bar change.

In accordance with yet other aspects of the present invention, the dynamic graph is a line graph having a line dataset including a least two line data points. The user manipulation device is used to direct changes in the location of a line data point.

In accordance with yet other aspects of the present invention, the dynamic graph includes a pie graph including at least one pie wedge. The manipulation device is used to direct a change in the size of adjacent pie wedges.

In accordance with still other aspects of the present invention, multiple underlying data values for data representation elements can be altered by manipulation of a single data representation element.

In accordance with further aspects of the present invention, the user manipulation device includes a pointer and a pointer indicator, whereupon the pointer indicator changes shape based on its proximity to focused and unfocused data representation elements and other dynamic data representation elements.

As will be appreciated by the foregoing summary, the invention provides a method and apparatus for data alteration by manipulation of representational graphs that overcomes limitations associated with keyboard entry of data. The present invention provides a simple and easy way for computer users to alter their data and modify the interrelationship between associated data by intuitive manipulation of representational graphs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

Notation and Nomenclature

Figure 1:
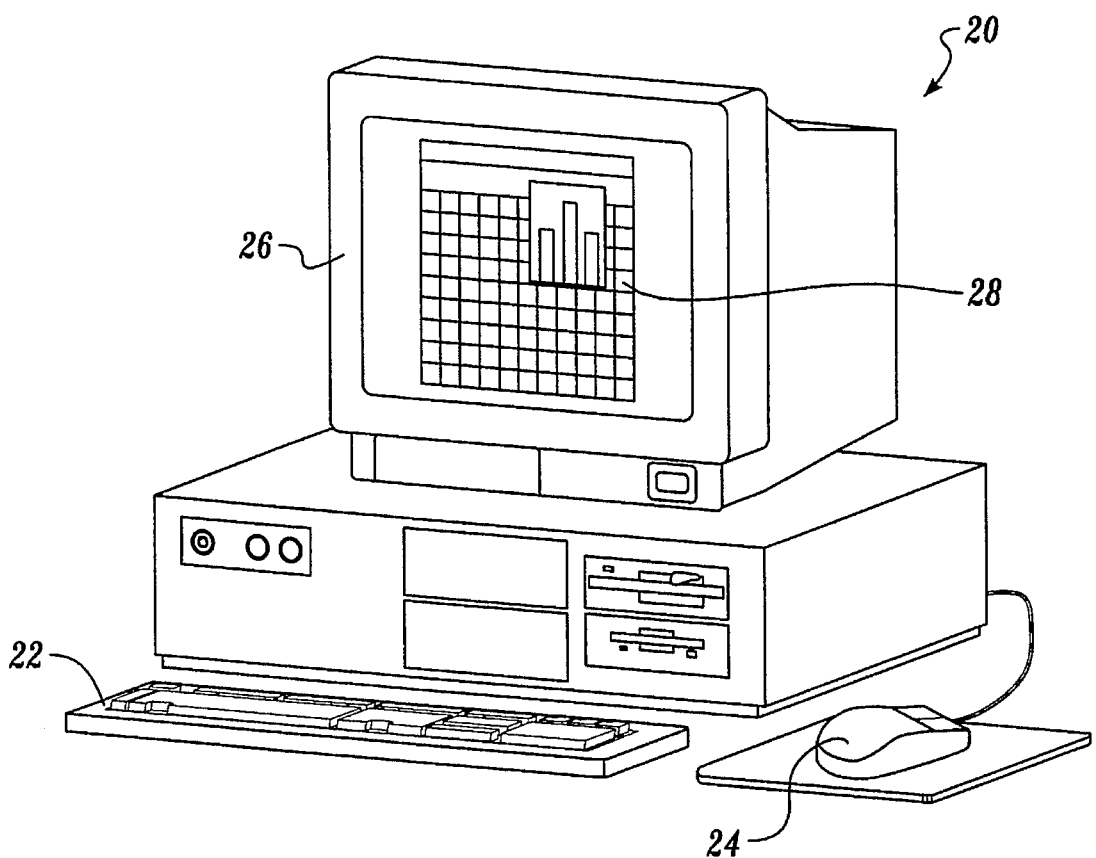
FIG. 1 is a diagrammatic illustration of a computer system having a user manipulation device (a mouse), a keyboard, and a video display showing a spreadsheet program in which the present invention is useful.

The detailed description that follows is presented largely in terms of descriptions of operations on, and manipulations of, data and symbolic representations of data such as graphic images within a computer and on a computer video display. These descriptions are the means used by those skilled in data processing arts, particularly with respect to Graphical User Interfaces, to most effectively convey the substance of their work to others skilled in the art.

Environment: The collection of hardware devices and/or software elements associated with the computer.

Cursor Control Keys: Keys on a keyboard which are typically indicated by arrows indicating a direction such as up, down, right, or left. These keys are frequently used to cause movement of a cursor or other object displayed on the video display.

User Manipulation Device: Any pointing device, subsystem, or system operating directly or indirectly as an input device of a computer, such as a mouse, pen, track ball, light-pen, a finger or stylus on a touch or position sensitive panel, cursor control keys, or any other device, subsystem, or system achieving the same effect, also referred to as a pointing device.

Transparent Windows: A transparent zone on the video display that can interact with the user manipulation device.

Pointer: Refers to the internal pointer which indicates a position to other system components and to computer programs based on the input of the user manipulation device.

Pointer Indicator: The visual indicator displayed by the computer on the video display which is tied to the motion of the associated manipulation device, also referred to as a "cursor." A cursor is frequently an arrow image.

Active Image: The image used by a program to communicate that the cursor is in an area where it can manipulate a graphical object.

Inactive Image: The image used by a program to communicate that the cursor is not in an area where it can manipulate a graphical object.

Active Region: An area where manipulation of a graphical object can occur.

Hot Spot: The precise spot on the cursor which the computer uses in the pointing action controlled by the user. The point is normally at the tip of any arrow used by a system as a cursor.

Click: To depress and release a button on a mouse or other user manipulation device, without otherwise moving the mouse or pointer, or any analogous control or selection operation using a pointer.

Double Click: To click twice in rapid succession without otherwise moving the mouse or user manipulation device, or any analogous control or selection operation using a pointer.

Select: To unambiguously communicate a choice to a computer; such as in the case of a mouse to click or double click after the mouse-moveable cursor is positioned on the video display image or the item to be chosen.

Focus: When an item is in a state that allows it to be affected by user input through an input device, it is in focus.

Focused: An item or dataset can be referred to as focused when it is in a state that allows it to be affected by user input through an input device.

Unfocused: An item or dataset not having focus.

Focused Dataset: The group, or dataset, of numbers, data, or graphic representation of that data, that is in a state that allows it to be affected by user input through an input device.

Unfocused Dataset: Any dataset which is not in focus.

Focused data element: The particular data item, number, or graphic representation element of the Focused Dataset that is in a state that allows it to be affected by user input through an input device.

Unfocused data element: Any element (whether or not in a focused dataset) that is not a focused element.

Focus Indicator: Anything that indicates to the user which item on the video display has the focus at a particular moment. The focus indicator may be a graphic element such as a crossbar on a line graph; a graphic treatment of an object, such as the beveled look given a bar or the solid line treatment given a focused line dataset, compared to the dashed line treatment given unfocused line datasets; or a symbol such as a white or clear box identifying the edges of pie wedges.

Drag: To move, or cause to move, or otherwise manipulate an object, namely, an item or collection of items from place to place on the video display. The operative steps of dragging (the action of a drag) an object as accomplished by use of a mouse include: (1) depress a mouse button while the mouse-moveable cursor is on the object to be moved; (2) move the mouse, and thereby its cursor, to the desired position; and (3) release the mouse button. The computer then moves the image of the object to the specified position, either continuously as the mouse is being moved (see step 2 above), or at the end of the operation, when the mouse button is released (see step 3 above).

Bitmap: A representation internal to a computer of an image which is in system memory, or is on a video display, or can be displayed on a video display or can be rendered on a surface by a printer.

Bit Block Transfer: An operation performed internally by a computer which moves, copies, combines, and possibly transforms, part of or all bitmaps in system memory or on an output device such as a video display. Many computers, computer components, computer operating systems, and graphic environments are specifically designed or optimized to perform this operation extremely rapidly. Also referred to as Bit Blit.

Flicker: Refers to a sudden and brief overall darkening, lightening, or disappearance of an image or part of an image on a video display. Flicker may look like an old movie, where the image as a whole is affected, or it may look like a poorly animated cartoon, where elements of the image which should remain stable and unchanging are instead wiped out for a brief, but noticeable period. The effect is to distract the viewer, and can measurably tire and stress viewers who are subjected to the phenomena for extended periods.

"Jerk" or "Jerky": Images which appear to move on video displays are normally created by displaying a series of static images, each displaced slightly from its previous position. Such techniques are used in motion pictures, animated cartoons, and television. When the images are displaced in regularly spaced distances and times, and they are displayed in quick enough succession, then there is usually an illusion of smooth and continuous image movement for the viewer. Typically, display rates on the order of 15 to 30 images per second are needed to create such an illusion. Presenting the computer user with an illusion of a graph component being dragged requires the same conditions. The images "jerk" or appear "jerky" when they are not presented in quick enough succession, or if they are presented at highly irregular and unpredictable intervals. Although slow systems may inevitably need intervals which are too long, the "jerky" effect is much more disconcerting when the program presents the images at unpredictable intervals, some of which are long.

Masked Copy: A masked copy is performed somewhat like stenciling. A shape (the mask) is constructed, and a copy is performed from one location to another, but only copying the elements which would fit outside the shape, or only the elements which would fit inside the shape. In this way the source or destination region for a copy can be given a complex shape.

Associated System Components: Computer system hardware or software of related computer applications used in implementation of the preferred embodiment of the present invention. Associated system components may include other elements of the present invention as well as elements external to the present invention, such as a graphical-oriented operating shell to facilitate manipulation of the dynamic graphs or a spreadsheet application to reference underlying data used in the present invention.

Dynamic Graphical Representation: A graph or chart wherein underlying data represented by the graphical elements displayed thereon can be altered by manipulation of the representational graphical elements. Types of graphs capable of implementation as dynamic graphs include but are not limited to the following:

Pie Graph: A common graph appearing to be drawn inside a circle, where the area is broken into wedges whose apexes meet at the center. Each wedge indicates a portion of the whole, and the relative sizes of the wedges is the graphic manner in which the viewer sees the apportionmere. Also referred to as pie chart.

Line Graph: A common graph with an X axis and a Y axis. Data points are plotted on the graph, and are then connected with line segments. The line segments may be straight or curved with line segments connecting data points. Line graphs may be inverted or flipped around any axis. Line graphs may also be shown in a variety of 3D perspectives, and can have a third axis, the "Z" axis. Also referred to as line chart.

Bar Graph: A common graph, similar in most respects to a line graph. The major difference is that bars are drawn from a common baseline to each of the data points, rather than having the data points connected by lines. The graph shown could be inverted or flipped around any axis. These graphs can also be shown in a variety of 3D perspectives, and can have a third axis, the "Z" axis. Also referred to as bar chart.

Stacked Bar Graph: A common graph, somewhat similar in appearance to a line graph, but functionally more closely related to a pie graph. In each bar the area of color fill represents the quantity being graphed. Also referred to as stacked bar chart.

Area Graph: A common graph, somewhat similar in appearance to a line graph, but functionally more closely related to a pie graph or a stacked bar graph. The most salient feature of this type of graph is that the quantity indicated is proportional to the area of its color fill, at the graphed points. Also referred to as area chart.

Polar Coordinates Graph: A polar coordinates graph has two scales, one going around the graph, and the other going from the center of the graph outwards. The data can be represented as a line, or as points, or areas, or some combination therewith.

Dynamic Graphical Representation Type Identifier: Anything that indicates to the user the type of dynamic graph being presented, whether a dynamic input graph or a dynamic output graph, the distinction being important to notifying the user as to the manipulability of the data representation elements located therein. The dynamic graphical representation type identifier may be a graphic element; a graphic treatment of the dynamic graph, such as a beveled look to the graph edge; or a symbol noted somewhere on the graph.

Coding Details

No particular programming language, operating system, or graphical environment has been indicated for carrying out the various procedures described herein. This is in part due to the fact that not all languages, operating systems, and graphical environments that might be mentioned are universally available. Each user of a particular computer or software system will be aware of a language, operating system, and graphical environment that is most suitable for its immediate purposes.

In practice, it has proven desirable to implement the present invention using the C++ programming language (ANSI standard version 2.0), under Microsoft® MS/DOS™ (version 5.0) with Microsoft® Windows™ (version 3.1) software. It will be readily appreciated that various other programming languages and computer systems would be equally suitable. It should be noted that programs optimized for speed, code space, stack size, data space, or other system resources may differ in implementation details due to the presence of, or omission of, software routines provided by a particular environment. Of particular use in the present invention's initial reduction to practice were routines available for manipulation of the mouse pointer shape, as well as drawing routines for text, rectangles, circles, pie wedges, and polygons.

Because the computer system used to implement the present invention may consist of various combinations of computer hardware, operating system, graphical environment, and spreadsheet or other program, no detailed program code listing has been provided. It is should be understood that the operations and other procedures described herein and illustrated in the accompanying drawings are sufficiently disclosed to permit one of ordinary skill to practice the present invention.

DETAILED DESCRIPTION OF THE PREFERRED EMBODIMENT

The following detailed description is divided into several sections. The first section summarizes key aspects of the present invention by describing dynamic graphs incorporated therein. The following section concerns the computer system configuration. Subsequent sections deal with the operation of the present invention and the user interface used in its implementation. In addition, in the following description numerous details are set forth describing various aspects and implementations of the preferred embodiment of the present invention in order to provide a thorough understanding of the present invention. However, it will be apparent to one skilled in the art that the present invention may be practiced without these specific details. In other instances, well known circuits, structures, and software routines are not described in detail in order to present the present invention without unnecessarily obscuring its full understanding.

Although specific embodiments of the invention will now be described with reference to the provided FIGURES, it should be understood that such embodiments are by way of example only and merely illustrative of but a small number of the many specific embodiments which can represent applications of the principles of the present invention. Various changes and modifications obvious to one skilled in the art to which the invention pertains are deemed to be within the spirit, scope, and contemplation of the invention as further defined in the appended claims.

Dynamic Graphs

Prior to the present invention, data such as numbers in tables might also be displayed as graphical data representations on a traditional output graph. In such traditional output graphs, the numbers and their corresponding graph could be manipulated by typing new numeric values on a computer system keyboard. The computer system displayed the new numbers, and then modified the displayed graph. The number themselves, however, were incapable of alteration by direct manipulation of the representational output graph.

In overcoming limitations associated with such traditional output graphs and to allow user alteration of underlying data by manipulation of representational graphs, the present invention provides dynamic input and output graphs. The present invention provides dynamic input graphs wherein the computer user is able to manipulate the graph shape directly, which in turn not only modifies the graph, but also alters the corresponding and underlying tabularized data, as well as any associated numeric representations of the data that may be presented to the computer user. Specifically, the present invention creates a dynamic graph representing data, such as data found in a computer spreadsheet program, reconfigures the graph according to user manipulation of the shape of the dynamic graph, and modifies the graphical representation as well as the underlying data stored in data arrays based on the user input. The present invention therefore provides a simple and easy way for users to alter their data and modify the interrelationship between associated data by intuitive manipulation of representational graphs. The present invention communicates the same information to computer users as traditional output graphs, yet adds a dimension by its enablement of graphical manipulation of the related underlying data. The present invention also provides dynamic output graphs which, while not manipulable by the computer user, enable efficient modification of the graphical data representations according to manipulation of dynamic input graphs.

Computer System Configuration

The method and apparatus of the present invention may be implemented on a specially constructed computer system or a general purpose computer system. The methods of the present invention presented herein are not inherently related to any particular computer system, other apparatus, or software system. In particular, various general purpose computer systems and software systems may be used with the teaching herein, or it may prove more convenient to construct more specialized computer systems or software systems to perform the invented methods. The required structure for a variety of these computer systems and software systems will be apparent from the description given below.

FIG. 1 shows a computer system 20 of the type in which the present invention is useful. For purposes of explaining the operation of the present invention, a personal computer system 20 having a keyboard 22, a mouse 24, a video display 26, and running a spreadsheet application program 28 will be presumed, although it should be understood by those skilled in the an that application of the present invention is not limited to such systems, but rather includes use on any computerized system having a user manipulation device and a video display capable of displaying graphs representing data. The use of a mouse as a user manipulation device in the initial reduction to practice, for example, is only intended to demonstrate one of many possible user manipulation devices which will be readily evident to any person practiced in the art. The function of the computer system is to produce underlying data for subsequent use in the present invention, as well as necessary system components to carry out the implementation of the present invention.

Figure 2:
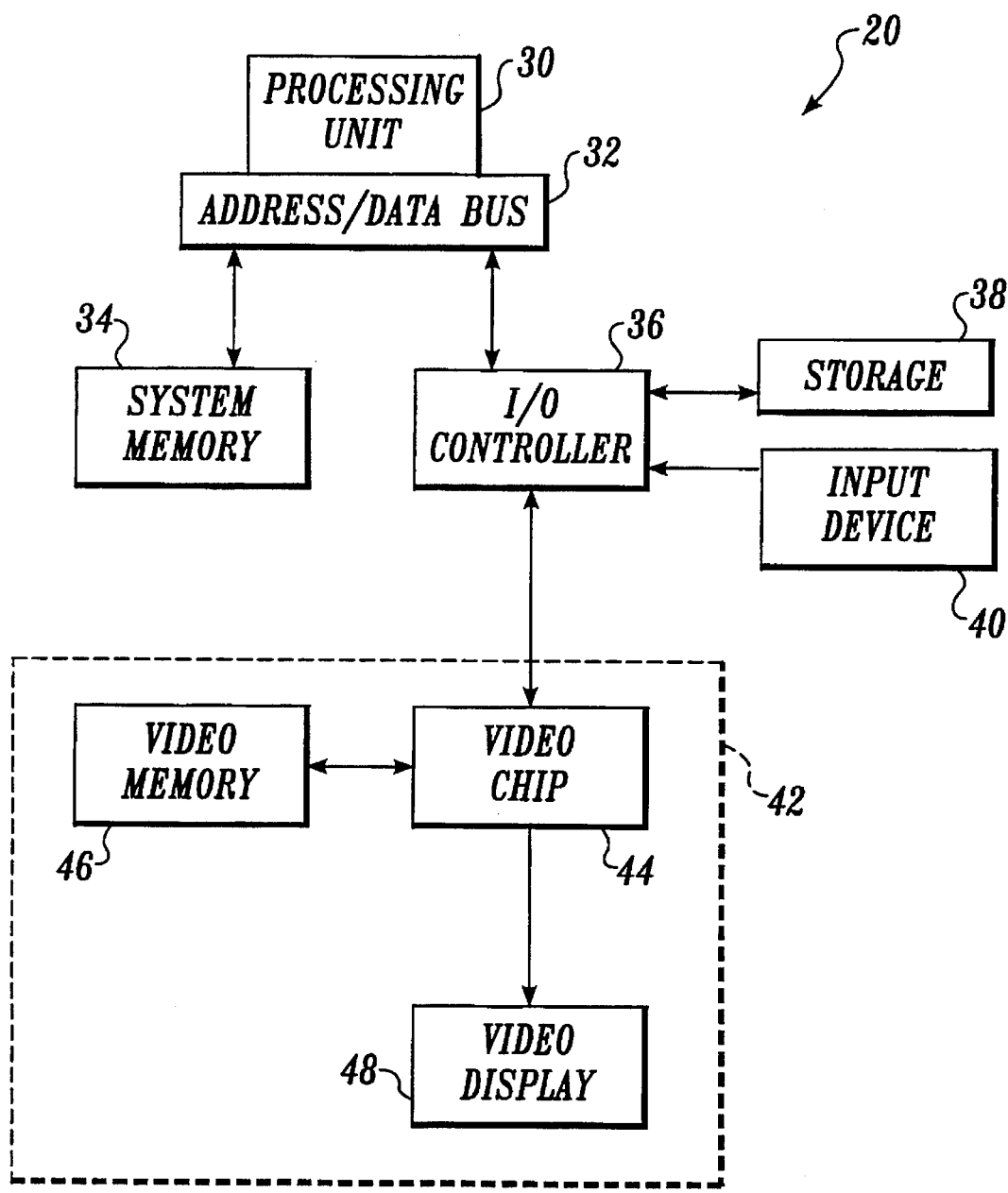
FIG. 2 is a schematic block diagram of the key components of a computer system needed to carry out the dynamic graph program of the present invention.

For purposes of explaining the operation of the present invention, FIG. 2 shows a block diagram of the key components of the computer system 20. The computer system 20 includes a processing unit 30 coupled through an address/data bus 32 to a system memory 34 and an I/O controller 36. The processing unit 30 is coupled via the I/O controller 36 to a permanent storage device 38, such as read-only memory (ROM), a hard disk drive, a CD ROM, or a floppy disk drive. The FO controller 36 also couples the processing unit 30 to an input device 40, a video display system 42 including such devices as a video chip 44, video memory 46, and a video display 48.

The processing unit 30 of the computer system 20 responds to program instructions stored in the permanent storage 38 and maintains values temporarily in system memory 34. Data relevant to the operation of the computer system and operated upon by the programmed instructions may be directed to the processing unit by any known manner of input. Such data is then routed through the I/O controller 36 and along the address/data bus 32 to the processing unit 30. This and other data utilized by the processing unit 30 as it responds to programmed instructions may be maintained temporarily in system memory 34, or more permanently in the storage 38. The video chip 44 of the video display device 42 routes data between the video memory 46 and the I/O controller 36. The video chip 44 has a bit block transfer (Bit Blit) engine well known to those skilled in the relevant art, which is used to efficiently transfer video display data from the video memory 46 to and from system memory 34. More specifically, the programmed instructions controlling the processing unit's operation in the preferred embodiment of the present invention create dynamic graphs wherein underlying data represented by the graphical elements displayed thereon can be altered by manipulation of the representational graphical elements.

Details of Implementation Techniques

To create dynamic graphs, various methods and techniques can be used which are best understood by those practiced in the art of programming for Graphical User Interfaces, particularly programming systems which utilize objects and messages, such as Microsoft® Windows™. In order to avoid obscuring the understanding of the non-obvious points, this teaching does not deal with the basics of programming for GUIs such as Microsoft® Windows™ and the basic elements of message processing. This teaching will explain: (1) the method and apparatus used to create, reconfigure, and modify dynamic input and output graphs with particular references to three instructive examples (bar, line, and pie graphs); (2) the use of intermediate graphic bitmaps in system memory in conjunction with the Bit Blit operation in the implementation of the dynamic graphs; and (3) the manipulation of dynamic graphs using a user manipulation device such as a mouse or keyboard.

General Program Overview

Figure 3:
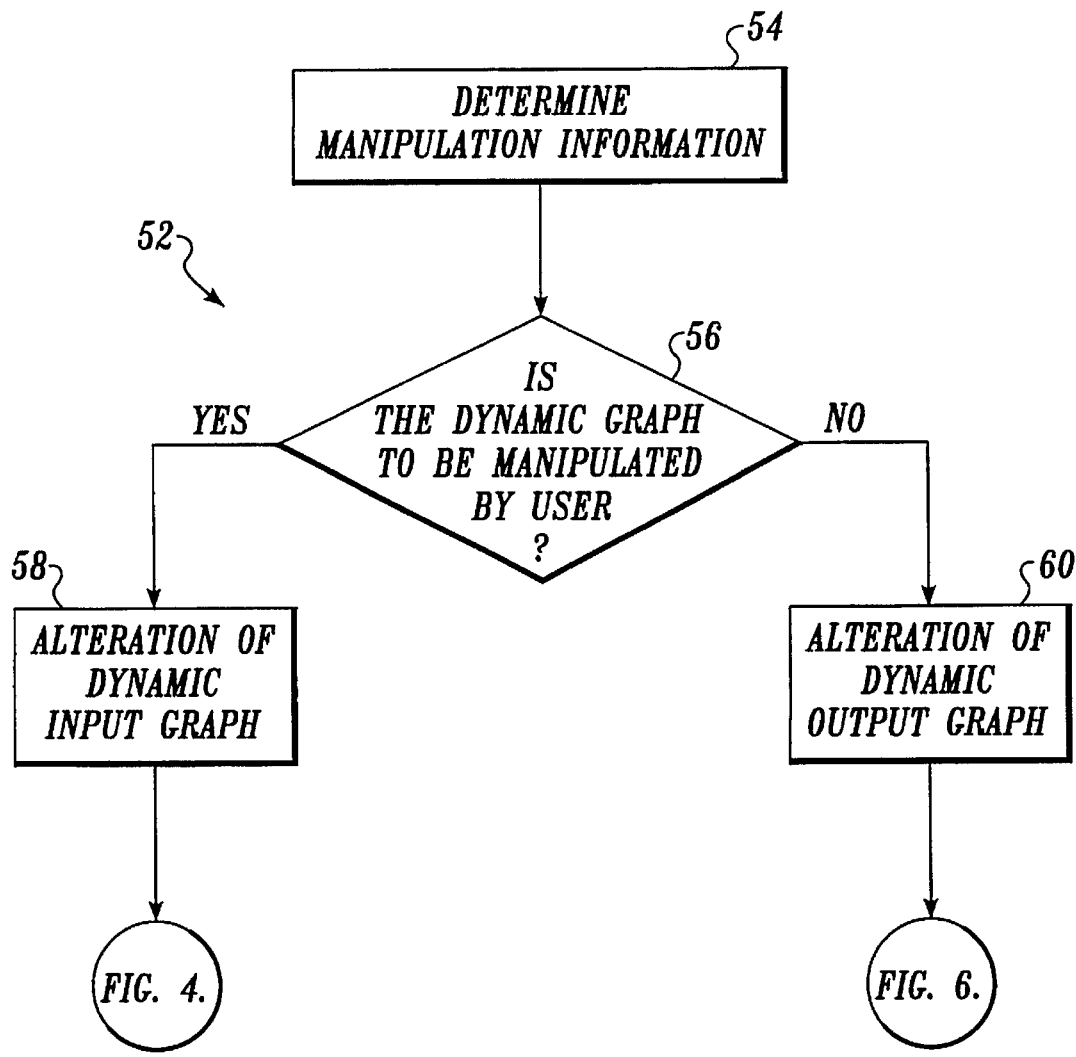
FIG. 3 is a flowchart illustrating the steps carried out by a dynamic graph program of the present invention.

FIG. 3 is a flowchart of a dynamic graph program 52 in accordance with the present invention and suitable for use by the processing unit of the computer system, which is stored in the permanent storage device. The program 52 begins at block 54, where manipulation information is determined which indicates the manipulability of the dynamic graphical representation by the user manipulation device. At block 56, a determination is made whether the dynamic graph is to be manipulated by the user manipulation device. If the dynamic graph is to be manipulated by the user manipulation device, the logic of the dynamic graph program 52 proceeds to execute an alteration of dynamic input graph program 58. If the dynamic graph is not to be manipulated by the user manipulation device, the logic of the dynamic graph program 52 proceeds to execute an alteration of dynamic output graph program 60.

Alteration of Dynamic Input Graphs

Figure 4:
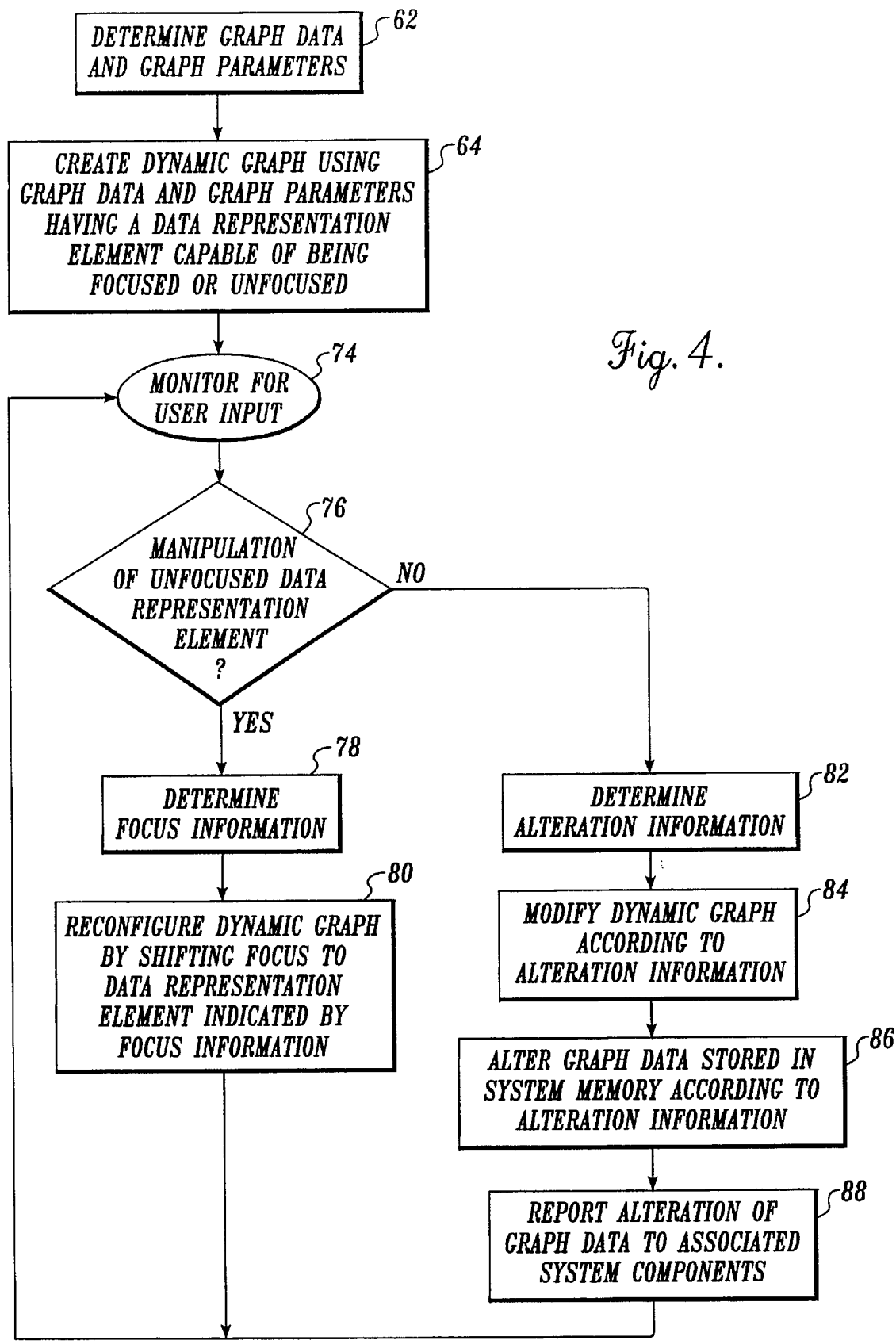
FIG. 4 is a flowchart illustrating the steps carried out by a dynamic input graph program, associated with the dynamic graph program of FIG. 3, for carrying out alteration of a dynamic input graph.
Figure 4A:
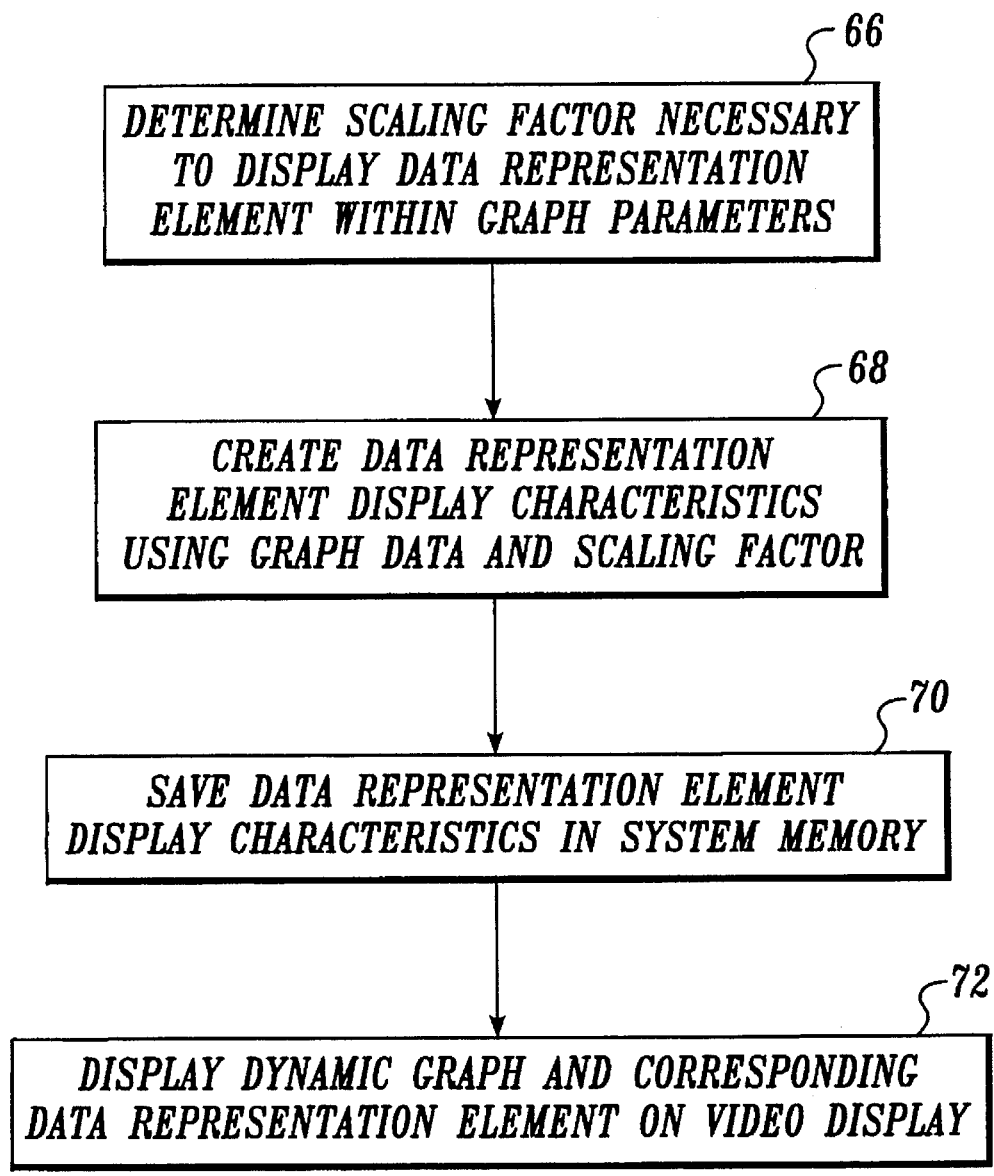
FIG. 4A is a flowchart illustrating the steps carried out in creating a dynamic input graph according to the dynamic input graph program of FIG. 4.
Figure 5:
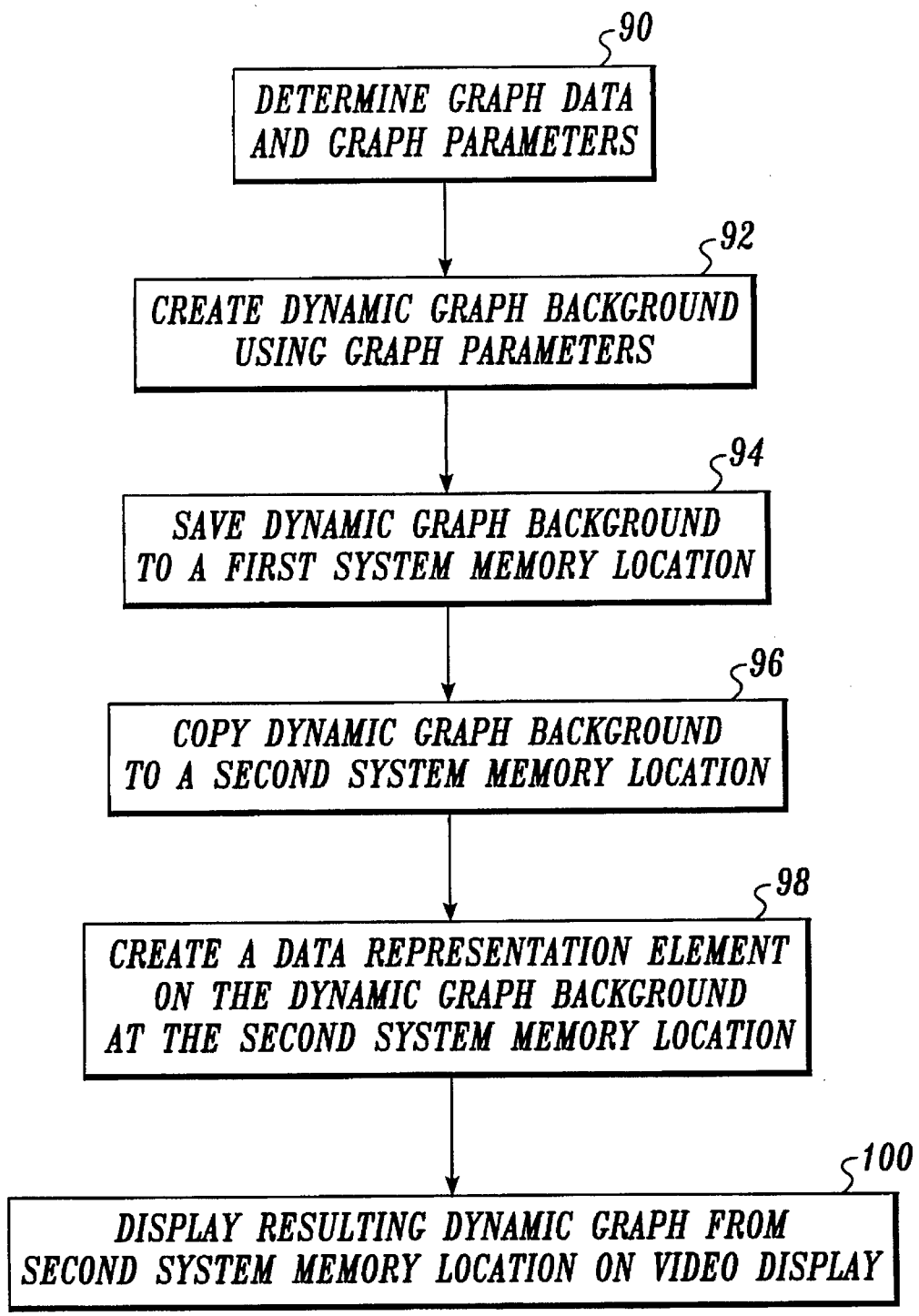
FIG. 5 is a flowchart illustrating alternative steps carried out in creating a dynamic input graph according to the dynamic input graph program of FIG. 4.

With reference to FIGS. 4, 4A, and 5, the overall flow of the dynamic input graph program 58 can be described. Obvious aspects of the program such as exiting, keyboard handling, and loss of focus are left out for the sake of clarity. FIG. 4 is a flowchart of a dynamic input graph program 58 formed in accordance with the invention and suitable for use by the processing unit of the computer system, which is stored in the permanent storage device described above. The program 58 begins at block 62, where the graph data and graph parameters are determined. Graph data is the numerical value of the information to be subsequently displayed in graphical form. Graph data is input into the computer system and generally stored in either the permanent storage or, if used frequently or if in current use in an application, stored in system memory. When the dynamic input graph program 58 is used in conjunction with an associated system component such as a spreadsheet application, such graph data may also be stored in additional locations as alpha numeric characters in a multiplicity of cells identified by a row and column address on the video display. Graph parameters include video display parameters associated with the hardware of the video display, and with the type of graph to be used in representing the graph data, as well as limitations or restrictions placed on the dynamic graph program by associated system components. Graph parameters specifically set forth key attributes of the graph, namely specifying such things as graph location, color, size, and orientation.

The logic of the program continues to block 64, where the dynamic input graph program 58 creates a dynamic graph using the graph data and graph parameters. Among the possible elements created with the dynamic graph is, at a minimum, a data representation element, which element is capable of being focused or unfocused. As used in this context, a data representation element is a graphical representation of graph data. The fact that a data representation element is capable of being focused or unfocused is a key in creating a dynamic input graph capable of manipulation. Specifically, the states of focused or unfocused refer to the capability of a data representation element to be affected by input from a computer user through a user manipulation device, such as a mouse or cursor control keys of a keyboard. Although such input may affect multiple data representation elements displayed on a dynamic graph, it is generally desirable that user input be restricted to a single data representation element at any particular moment. This restriction enables the computer user to manipulate discrete amounts of graph data, represented by a corresponding data representation element.

Creation of the dynamic graph may be understood with more particularity by reference to FIG. 4A. At block 66 of the creation step of the dynamic input graph program 58, a determination is made of the scaling factor necessary to display a data representation element within the graph parameters. Specifically, at block 66 calculations are made which determine the necessary ratio for display of graph data within the limitations of the graph parameters, including the size and shape of the graphical area available in which to display the data representation element.

At block 68, the program 58 creates data representation element display characteristics using the graph data and the scaling factor determined at blocks 62 and 66, respectively. The data representation element display characteristics include both the numerical description of the data representation element as well as its corresponding visual description. In other words, beyond the numerical representation of the data representation element, at block 68, the image describing the appearance of the data representation element upon display on the video display is created. At block 70, the data representation element display characteristics are saved in system memory. This step is significant in the creation of the dynamic input graph and it yet another way the dynamic input graph creation step of the dynamic input graph program 58 is distinguishable from traditional output graph creation methods. Whereas traditional output graphs are used to display data representation elements a single time, after which new data representation elements are created and displayed corresponding to keyboard input of new graph data, the present invention creates a graph capable of dynamic movement of the data representation elements corresponding to simultaneous manipulation by the computer user of the data representation element. By saving the data representation element characteristics, the present invention enables instant reconfiguration and modification of the data representation element by providing for instant retrieval of the data representation element display characteristics.

At block 72, the dynamic input graph, including the corresponding data representation elements, are displayed on the video display. More specifically by reference to FIG. 2, this occurs by transfer of the data representation element display characteristics through the video chip 44 of the video display system 42 to the video memory 46, where they are subsequently transferred via the video chip 44 to the video display 48 in an expedited fashion.

Referring again to FIG. 4, the logic of the dynamic input graph program 58 continues at block 74, where the program monitors the computer system for user input. User input occurs via a user manipulation device, for example, a mouse. Via the user manipulation device, a computer user is able to manipulate the data representation element displayed on the dynamic graph.

At decision block 76, a determination is made whether the user input seeks to manipulate an unfocused data representation element. As discussed above, in the preferred embodiment of the present invention, the user manipulates a single data representation element representing discrete graph data on the dynamic input graph. Depending upon the creation of the dynamic graph, the data representation element indicated by the user input may be a focused or an unfocused data representation element, in which case the dynamic input graph program 58 must reconfigure so as to present to the computer user the indicated data representation element as a focused and therefore manipulable element. Therefore, if the determination is made at decision block 76 that the computer user has selected an unfocused data representation element, the logic of the program 58 proceeds to block 78, where focus information relating to the data representation element selected by the computer user is determined.

At block 80, the dynamic graph is reconfigured by shifting focus to the data representation element indicated by the focus information. Specifically, data representation element display characteristics previously created and saved at block 68 and 70, respectively, for the data representation element indicated by the focus information is used to change the dynamic graph in an expedited fashion. Once focus is shifted to the data representation element selected by the computer user, the flow of the dynamic input graph program 58 returns to monitoring the computer system for user input at block 74.

Assuming, however, that at decision block 76, the determination is made that user input seeks to manipulate a focused data representation element, the logic of program 58 continues to block 82, where alteration information about the nature of the user input is determined. Specifically, such information relates to how the computer user manipulation of the dynamic graph seeks to change the underlying graph data. At block 84, the dynamic graph is modified according to the alteration information determined at block 82. Once again, the data representation element display characteristics created and saved at blocks 68 and 70, respectively, are used to change the dynamic graph, including all affected data representation elements therein, in an expedited fashion.

At block 86, graph data stored in system memory, corresponding to the data representation elements modified at block 84, are altered according to the alteration information. Finally, at block 88, the alteration of the graph data is reported to associated system components, namely, in the preferred embodiment of the present invention used in conjunction with a spreadsheet application, to that spreadsheet application. The underlying graph data as it is stored in system memory is ultimately altered according to the alteration information by the associated system components.

An alternate presentation of the method of creating a dynamic graph is presented in FIG. 5. As shown in FIG. 5, the dynamic input graph program 58 determines graph data and graph parameters at block 90 in the same manner as described above relating to block 62. At block 92, the graph parameters are used to create a dynamic graph background. Depending upon the information presented in the graph parameters, the dynamic graph background may include a range of textual and graphical elements, such as legends, symbols, graticules, and other objects.

At block 94, the dynamic graph background is saved to a first system memory location. As previously discussed with relation to block 70 of FIG. 4A describing the step of saving the data representation element display characteristics, the step of the dynamic graph program 58 is used in the creation of a dynamic input graph capable of manipulation by the computer user so as to prevent flicker or jerk as the graphical elements of the dynamic graph are displayed on the video display. In the present invention, the dynamic graph backgrounds of each dynamic input graph are maintained at a separate system memory location from that system memory location used to complete the final dynamic graph to be displayed, including data representation elements. This facilitates easy reconfiguration and modification of the dynamic graph concurrent with user manipulation of data representation elements thereon, while reducing flicker and jerk typically associated with altering a traditional output graph.

At block 96, the dynamic graph background at the first system memory location is copied to a second system memory location. At block 98, a data representation element is then created on the dynamic graph background at the second system memory location. The steps represented by block 98 describing the creation of the data representation element are identical to those found in blocks 66 through 70 discussed above in conjunction with FIG. 4A.

At block 100, the resulting dynamic graph from the second system memory location is displayed on the video display 48. More specifically by reference to FIG. 2, this occurs by transfer of the data representation element display characteristics through the video chip 44 of the video display system 42 to the video memory 46, where they are subsequently transferred via the video chip 44 to the video display 48 in an expedited fashion.

At the most fundamental level, the dynamic input graph program has three sections. As best understood by reference to FIG. 4, the first section 64 creates the dynamic input graph on the video display and its related structures in system memory. The second and third sections are the basic responses to computer user input. In the second section, blocks 78–80, the dynamic input graph is reconfigured by, for example, shifting the focus to select other data representation elements to manipulate. In the third section, blocks 82–88, the user is modifying the dynamic input graph in order to change graph data corresponding to data representation elements.

Programaticly, the dynamic input graph is quite different from the traditional output graph, which is static in its presentation. In creating such a static output graph, the computer programmer is primarily concerned with how the graph is to be drawn on the video display. Secondary concerns may be the system constraints such as the amount of system memory available for executable program object code, or the amount of space available on the program stack.

In the creation of a dynamic input graph, programmers need to make provisions for rapid reconfiguration and modification of the dynamic graph for the user. Thus, the programmer needs to plan for and prepare for the rapid changes which take place as the user manipulates the data representation elements of the dynamic graph. Special constraints result from the need to provide a pleasing and plausible illusion of movement of data representation elements to the user who manipulates the data representation elements. The two important constraints in this regard are (1) the dynamic graph should not noticeable flicker, and (2) the data representation element being manipulated must appear to move as smoothly as possible, and must not jerk unpredictably.

The steps used in the sections which create 64, reconfigure 80, or modify 84 dynamic input graphs are fundamentally reducible to two concepts of operation, namely, (1) drawing various shapes to build up the image of the graph, and (2) determining what shapes to draw and where to draw them. The dynamic input graph program is designed so that a minimum amount of drawing and calculation takes place while the data representation elements are being manipulated. By minimizing drawing and calculation during the manipulation, the successive changes to the data representation elements can be displayed on the video display in rapid succession. This is essential to creating the plausible illusion for the user of "dragging" the dynamic graph into the desired shape.

Time for calculations can be saved by saving many intermediate results derived during the creation process for later re-use during a manipulation. Similarly, time for drawing can be saved by saving intermediate drawings as bitmaps in system memory for later re-use, and by preparing images in system memory which can rapidly be combined with other images when needed. These combining processes can take place in system memory, or on the video display.

Thus, the thrust of the creation section, block 64, is to prepare for rapid, flicker-free reconfigurations at block 80 of the dynamic graph when, for example, focus is shifted, and for efficient modification of the dynamic graph at block 84. The three sections can be best understood with reference to the later examples dealing with bar, line, and pie graphs.

Alternation of Dynamic Output Graphs

Figure 6:
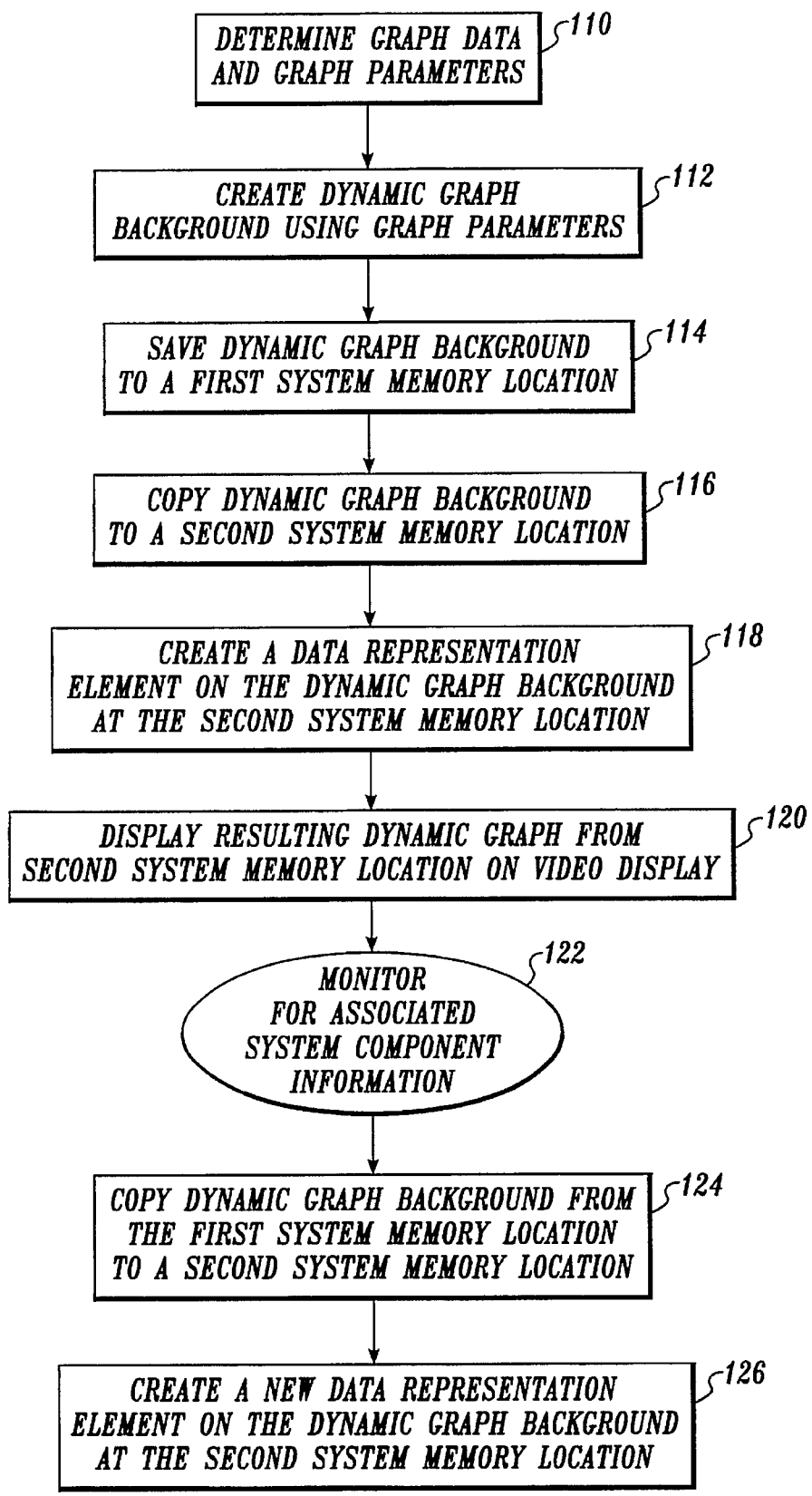
FIG. 6 is a flowchart illustrating the steps carried out by a dynamic output graph program, associated with the dynamic graph program of FIG. 3, for carrying out the alteration of a dynamic output graph.

Referring again to FIG. 3, at decision block 56, if the determination is made that the dynamic graph is not to be manipulated by the user manipulation device, the logic of the dynamic graph program 52 proceeds to execute an alteration of dynamic output graph program 60. As represented in FIG. 6, the dynamic output graph program 60 determines graph data and graph parameters at block 110 in the same manner as described above relating to block 62. At block 112, the graph parameters are used to create a dynamic graph background. Depending upon the information presented in the graph parameters, the dynamic graph background may include a range of textual and graphical elements, such as legends, symbols, graticules, and other objects.

At block 114, the dynamic graph background is saved to a first system memory location. As previously discussed with relation to block 70 of FIG. 4A describing the step of saving the data representation element display characteristics, the step of the dynamic output graph program 60 saving the dynamic graph background allows the creation of a dynamic graph capable of manipulation by the computer user so as to prevent flicker or jerk as the graphical elements of the dynamic graph are displayed on the video display. In the present invention, the dynamic graph backgrounds of each dynamic graph are maintained at a separate system memory location from that system memory location used to complete the final dynamic graph to be displayed, including data representation elements. This facilitates easy reconfiguration and modification of the dynamic graph concurrent with user manipulation of data representation elements thereon, while reducing flicker and jerk typically associated with altering a traditional output graph.

At block 116, the dynamic graph background at the first system memory location is copied to a second system memory location. At block 118, a data representation element is then created on the dynamic graph background at the second system memory location. The steps represented by block 118 describing the creation of the data representation element are identical to those found in blocks 66 through 70 discussed above in conjunction with FIG. 4A.

At block 120, the resulting dynamic graph from the second system memory location is displayed on the video display 48. More specifically with reference to FIG. 2, this occurs by transfer of the data representation element display characteristics through the video chip 44 of the video display system 42 to the video memory 46, where they are subsequently transferred via the video chip 44 to the video display 48 in an expedited fashion.

Returning to FIG. 6, the logic of the program proceeds to block 122, where the program monitors the associated system components for information. The associated system component information includes information affecting the data representation element of the dynamic output graph reported by either other elements of the present invention, or elements external to the present invention, such as manipulation information reported by a graphical-oriented operating shell or alterations in the underlying graph data made directly to a spreadsheet or related application via keyboard input. With reference to other elements of the present invention, associated system component information may be reported based on user manipulation of data representation elements on a dynamic input graph linked to the dynamic output graph. By so doing, it can be appreciated that multiple data representation elements of output graphs can be altered according to user manipulation of dynamic input graphs.

At block 124, the dynamic graph background is again copied from the first system memory location to a second system memory location. At block 126, a new data representation element is created on the dynamic graph background at the second system memory location according to the associated system component information determined at block 122. The logic of the program then returns to block 120, where the resulting dynamic graph from the second system memory location is displayed on the video display. More specifically by reference to FIG. 2, this occurs by transfer of the data representation element display characteristics through the video chip 44 of the video display system 42 to the video memory 46, where they are subsequently transferred via the video chip 44 to the video display 48 in an expedited fashion.

Application of Dynamic Input Graph Program to Specific Graph Types

While the invention disclosure described above can have application to any type of dynamic graph, in an effort to better understand the operation and implementation of the present invention, it is desirable to examine the application of the dynamic input graph program to specific graph types, namely bar, line, and pie graphs.

Creation of dynamic Input Bar Graphs

Figure 7A:
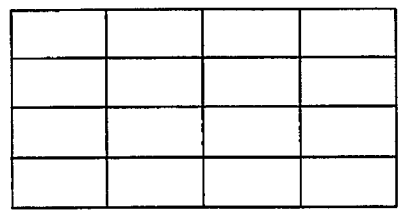
FIG. 7A is an illustration of a dynamic bar graph background having graticules formed in accordance with the present invention.
Figure 7B:
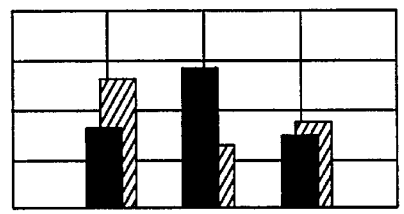
FIG. 7B is the illustration of FIG. 7A, further including unfocused bar datasets.
Figure 7C:
FIG. 7C is an illustration of a focused bar element with beveled edges.
Figure 7D:
FIG. 7D is the illustration of FIG. 7B, further including a focused bar dataset.
Figure 7E:
FIG. 7E is the illustration of FIG. 7D, wherein the focused bar element of FIG. 7C has replaced one of the bar elements of the focused bar dataset.
Figure 8:
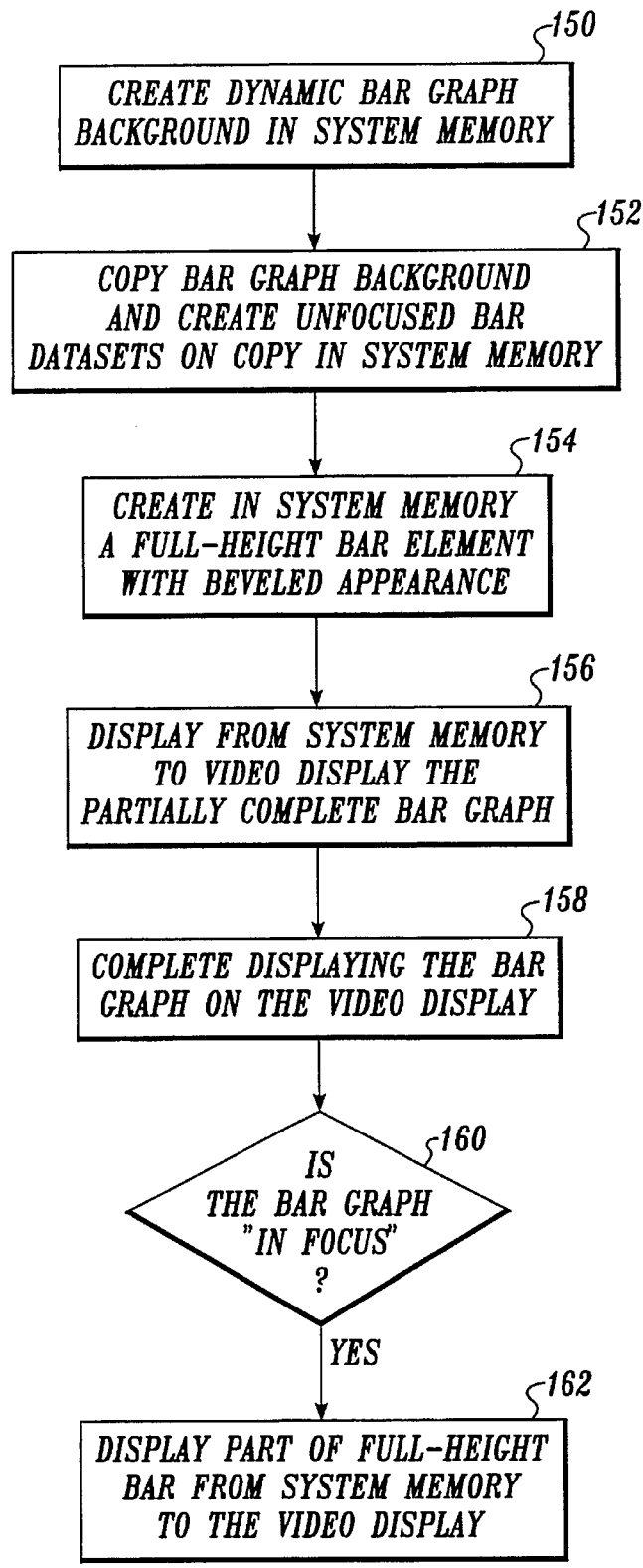
FIG. 8 is a flowchart illustrating the steps carried out by the dynamic input graph program of FIG. 4 in creating a dynamic input bar graph.

With respect to input bar graphs, the creation step at block 64 of FIG. 4 is best understood by reference to FIGS. 7 and 8. As referenced in FIG. 8, at block 150 a dynamic bar graph background is created at a first system memory location. An illustration of the dynamic bar graph background is shown as FIG. 7A. Such a dynamic bar graph background will include the complete static background of the bar graph and may further include, for example, gradations or graticules, images of symbols or objects, or even text such as labels and legends. FIG. 7A shows the simple example of a dynamic bar graph background having only a graticule. The background FIG. 7A will be used to improve efficiency during dynamic bar graph reconfiguration and modification.

At block 152 referenced in FIG. 8, the dynamic bar graph background is copied from the first system memory location to a second system memory, which is identical in every respect to FIG. 7A. Unfocused bar datasets comprised of bar elements are then created on the copy of the dynamic bar graph background at the second system memory location, yielding an image in system memory shown as FIG. 7B.

At block 154 referenced in FIG. 8, the full-height bar element with a beveled appearance shown as FIG. 7C is created in system memory. The special beveled look is used to denote a focused bar element. The purpose of this step is to have at all times a pre-drawn copy of a complex object, namely the focused bar element. This allows it to be put on the video display with a fast copy operation rather than being drawn slowly, bit by bit, each time it is required. Since the bar element in this example is the very object which the user will manipulate, it is clear that much time will be saved during the manipulation operation by having such an image readily available for immediate display on the video display.

Blocks 156–162 referenced in FIG. 8 actually compose the image of the dynamic input bar graph on the video display. At block 156, the background shown in FIG. 7B is displayed on the video display. At block 158, additional bar elements are displayed on the video display as needed, including focused bar datasets, shown as FIG. 7D. At decision block 160, a determination is made whether there should be a bar element on the bar graph that is focused. If there is a bar element which should have focus, then that bar element is displayed on the video display by copying the pertinent part of the focused bar element drawn and saved in system memory, shown as FIG. 7E. In this example, the unfocused bars are simple rectangular objects which are displayed quickly. Should a more complex bar representation be desired, such as the beveled focused bar, then it should be created in system memory and saved, and then quickly copied to the video display when and where needed, just as with the focused bar element in this example.

Note that the complexities of programming in this way are not designed to speed the initial production of the bar graph image on the video display, nor are they designed to minimize system memory use. The purpose of each extra image in system memory is to save time during reconfiguration of the graph and, most of all, to save time during the modification of the bar element by user manipulation.

Reconfiguration of Dynamic Input Bar Graphs

Figure 9:
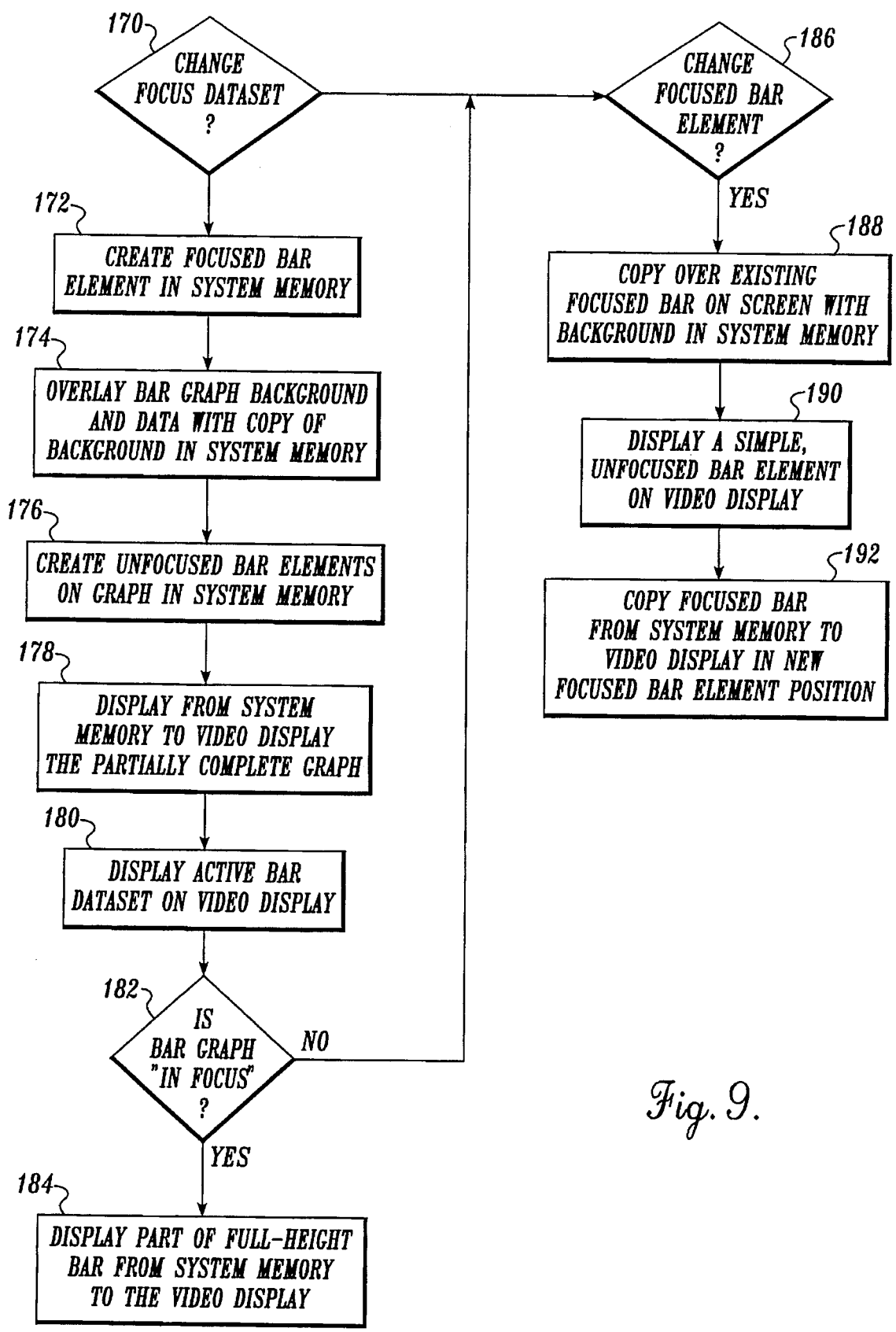
FIG. 9 is a flowchart illustrating the steps carded out by the dynamic input graph program of FIG. 4 in reconfiguring a dynamic input bar graph.

The reconfiguration step at block 80 of FIG. 4 is best understood by reference to FIGS. 7 and 9. In this example, the user has selected a different bar dataset to be the focused dataset, or has selected an unfocused bar element within the focused dataset to be the focused bar element. Selection in this and other related contexts can be accomplished by positioning a cursor on the desired data representation element with a mouse or other user manipulation device and actuating a control, such as a button on a mouse or keyboard. At decision block 170, if the determination is made that there is a change is the bar dataset, the logic of the program proceeds to block 172. At block 172, should the focused bar element shown as FIG. 7C have a different appearance than the previous focused bar element, a new focused bar element is created in system memory. Should the new focused bar have the same appearance as the previous focused bar element, this step would not be needed.

Starting at block 174, the dynamic bar graph is again being built, starting with the dynamic bar graph background. In this case, the graticule of the dynamic bar graph background will not change, but the unfocused bars will change. For this reason, the first system memory location where the dynamic bar graph background was created shown as FIG. 7A will not have to be recreated. At block 174, the dynamic bar graph background is copied from the first system memory location to a second system memory, which is identical in every respect to FIG. 7A. At block 176, unfocused bar elements are then created on the copy of the dynamic bar graph background at the second system memory location. The sets of bar elements shown as FIG. 7B are thereby replaced at blocks 174 and 176 with the bar element datasets that are newly unfocused. The final reconfigured bar graph is displayed on the video display at blocks 178–184, following the same method as described above for blocks 156–162 of FIG. 8.

In this example, at decision block 186, the determination can also be made whether there was a change in the focused bar element. If a different bar element is selected by the computer user to be the focused bar element, at block 188 the current focused bar element is erased from the video display by copying a section of the dynamic bar graph background shown as FIG. 7B to the video display. Only the area of the old focused bar element needs to be copied, re-establishing the original dynamic bar graph background. At block 190, a simple rectangle, that is, an unfocused bar element, is displayed on the video display. At block 192, the new focused bar element is displayed on the video display by copying it from system memory following the same method as described above for block 162 of FIG. 8.

Note that reconfiguring the graph is simpler and faster than creating and displaying it in the first place. This is intentional, because although computer users can grow impatient waiting for a bar graph to display, they are even less patient with delays resulting from redisplay of slightly changed bar graph images. Note that delays in modification of data elements are tolerated even less by users. For this reason every effort must be made by the programmer to have the modification of data elements be faster than the reconfigurations, and the reconfigurations faster than creations of graphs.

Modification of Dynamic Input Bar Graphs

Figure 10:
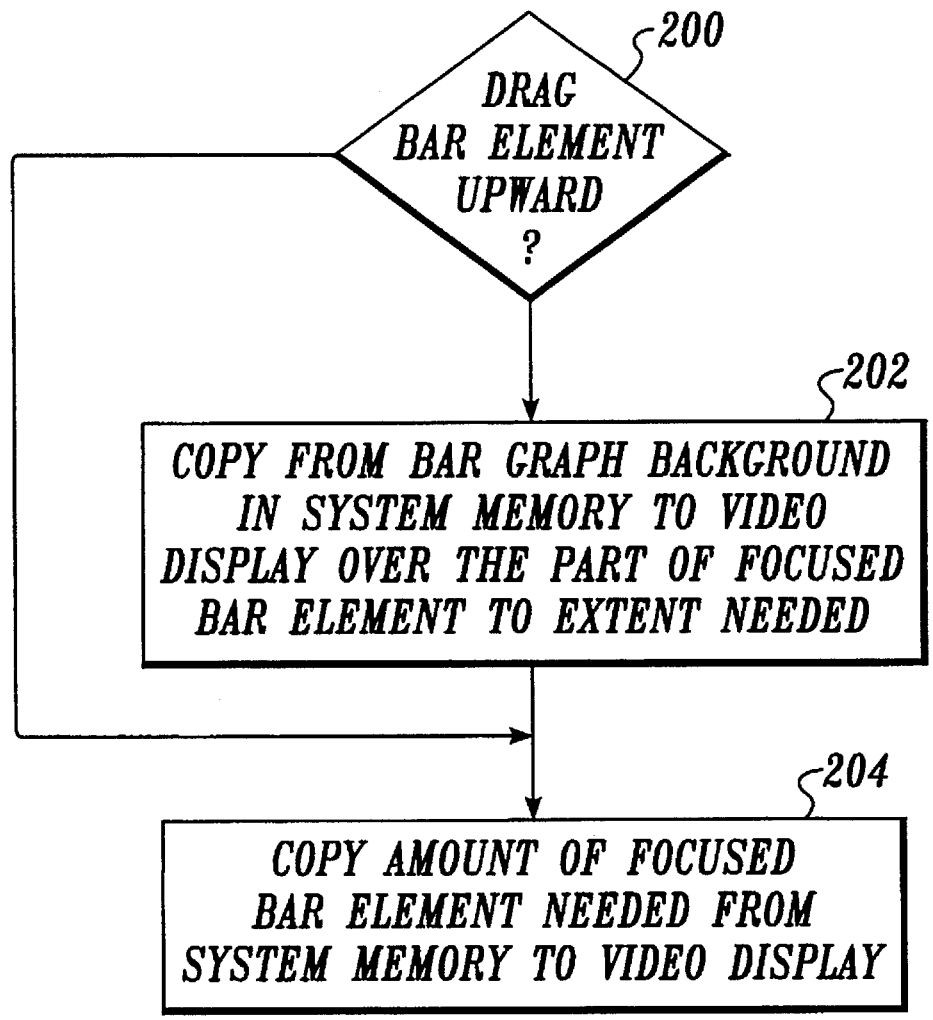
FIG. 10 is a flowchart illustrating the steps carded out by the dynamic input graph program of FIG. 4 in modifying a dynamic input bar graph.

The modification step at block 84 of FIG. 4 is best understood by reference to FIGS. 7 and 10. Note that the modification of the bar graph occurs very quickly because images are not composed afresh on the video display; rather, they are copied from existing bar element images previously saved in system memory.

At decision block 200 of FIG. 10, the determination is made as to the direction the bar element is being manipulated by the user. If the bar element is being shortened by having its top edge dragged downward, the dynamic bar graph background is being uncovered, and the logic of the program proceeds to block 202. At block 202, the dynamic bar graph background uncovered by the movement of the bar element on the video display shown as FIG. 7E is replaced by copying a corresponding portion from the background in system memory shown as FIG. 7B. Only the small part which is needed is transferred from system memory to the video display. At block 204, the focused bar element on the video display shown as FIG. 7E is updated by copying the relevant part of the focused bar element from system memory shown as FIG. 7C.

If the determination is made at the decision block 200 that the bar element is being lengthened by having its top edge dragged upward, the dynamic bar graph background remains covered, and the logic of the program proceeds to block 204, wherein the focused bar element is copied from system memory shown as FIG. 7C to the video display for display as shown as FIG. 7E, covering the section of the video display image with the old bar element.

No matter how complex the image of the bar element, the present invention will yield a fast and unflickering change in the position of the manipulated bar element on the video display. This is due to the complex preparations made during the creation of the graph.

Creation of Dynamic Input Line Graphs

Figure 11A:
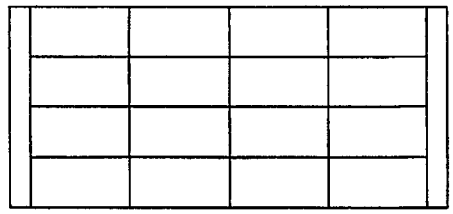
FIG. 11A is an illustration of a dynamic line graph background having graticules formed in accordance with the present invention.
Figure 11B:
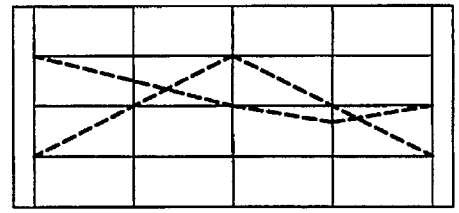
FIG. 11B is the illustration of FIG. 11A, further including unfocused line datasets.
Figure 11C:
FIG. 11C is an illustration of a crossbar background of a dynamic line graph.
Figure 11D:
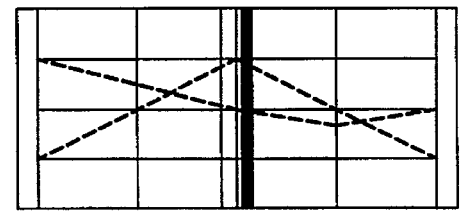
FIG. 11D is the illustration of FIG. 11B, further including a crossbar.
Figure 11E:
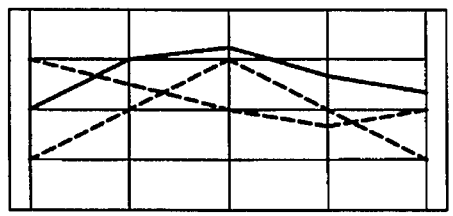
FIG. 11E is the illustration of FIG. 11B, further including a focused line dataset.
Figure 11F:
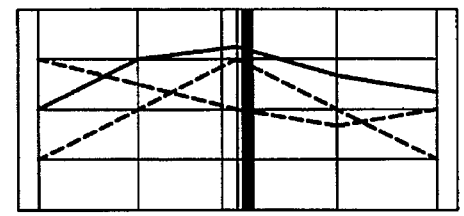
FIG. 11F is the illustration of FIG. 11E, further including the crossbar of FIG. 11D.
Figure 12:
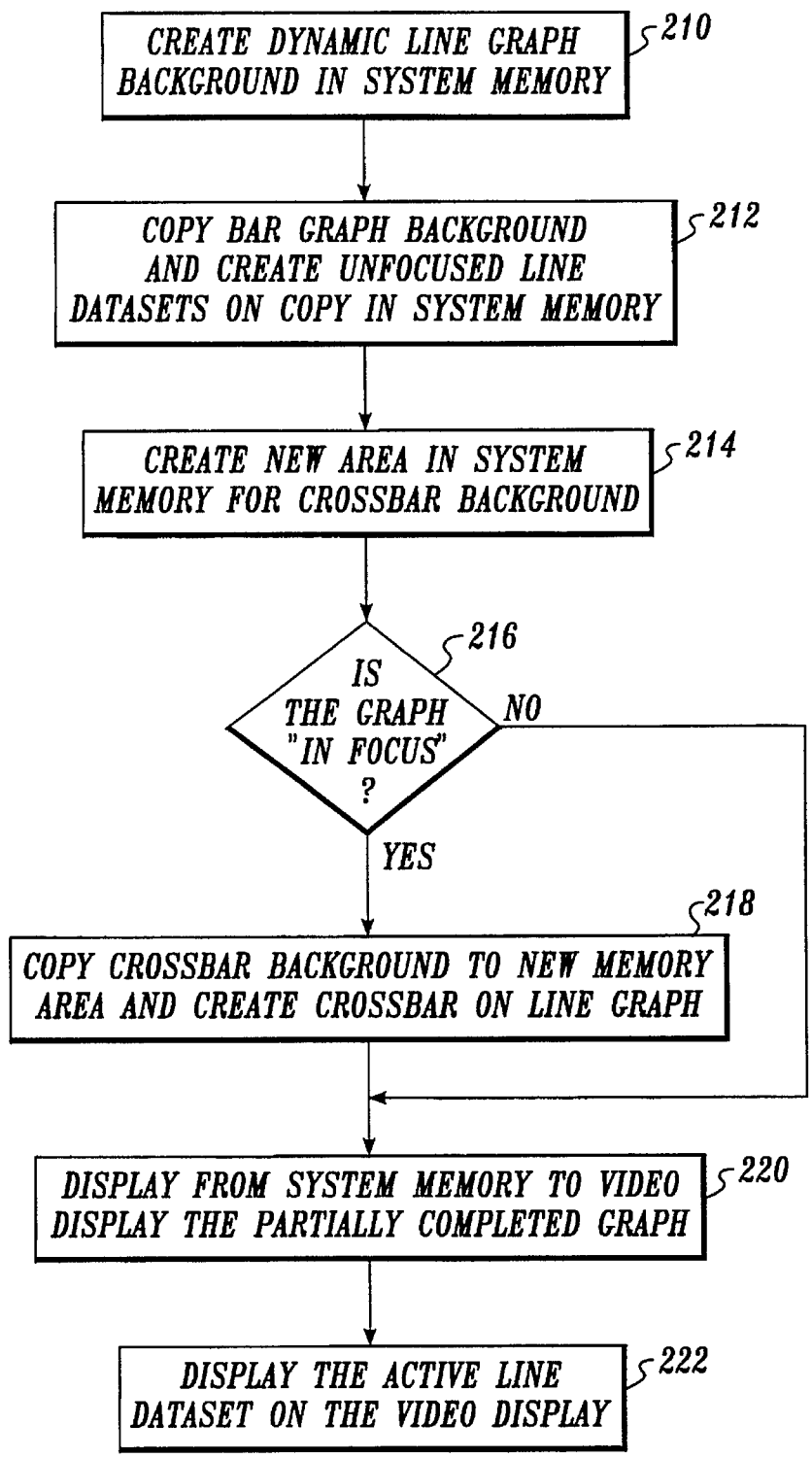
FIG. 12 is a flowchart illustrating the steps carded out by the dynamic input graph program of FIG. 4 in creating a dynamic input line graph.

With respect to input line graphs, the creation step at block 64 of FIG. 4 is best understood by reference to FIGS. 11 and 12. As referenced in FIG. 12, at block 210 a dynamic line graph background is created at a first system memory location. An illustration of the dynamic line graph background is shown as FIG. 11A. Such a dynamic line graph background will include the complete static background of the bar graph and may further include, for example, gradations or graticules, images of symbols or objects, or even text such as labels and legends. FIG. 11A shows the simple example of a dynamic line graph background having only a graticule. The dynamic line graph background FIG. 11A will be used to improve efficiency during bar graph reconfiguration and modification.

At block 212 referenced in FIG. 12, the dynamic line graph background is copied from the first system memory location to a second system memory, which is identical in every respect to FIG. 11A. Unfocused line datasets are then created on the copy of the dynamic line graph background at the second system memory location, yielding an image in system memory shown as FIG. 11B.

At block 214, an area is set aside in system memory shown as FIG. 11C of the same size and shape as the focus-indicating crossbar will have. The focus crossbar will be drawn later on the background shown as FIG. 11B, over the top of the unfocused line dataset shown as FIG. 11B.

At decision block 216, a determination is made whether there should be a line data point on the line graph that is focused. If there is a line data point which should have focus, the logic of the program proceeds to block 218, where the portion of the dynamic line graph background which will be obscured by the focus crossbar shown as FIG. 11D is first saved, then the focus crossbar is created. At block 218 a portion of the dynamic line graph background corresponding to the crossbar area shown as FIG. 11B is copied to the save area shown as FIG. 11C. Also at block 218, the resulting crossbar is created on the dynamic line graph background shown as FIG. 11B, yielding an image shown as FIG. 11D.

At this point, the line graph shown as FIG. 11D is complete in every respect for viewing and use by the user except that (1) it is not on the video display, and (2) it does not yet have the focused dataset displayed. At blocks 220 and 222, these aspects of the line graph creation are accomplished, respectively, yielding video display images shown as FIG. 11E in the case where the line graph does not have focus, or FIG. 11F in the case where the graph does have focus.

Note that the complexities of programming in this way are not designed to speed the initial production of the bar graph image on the video display, nor are they designed to minimize system memory use. The purpose of each extra image in system memory is to save time during reconfiguration of the graph and, most of all, to save time during the modification of the bar element by user manipulation.

Reconfiguration of Dynamic Input Line Graphs

Figure 13:
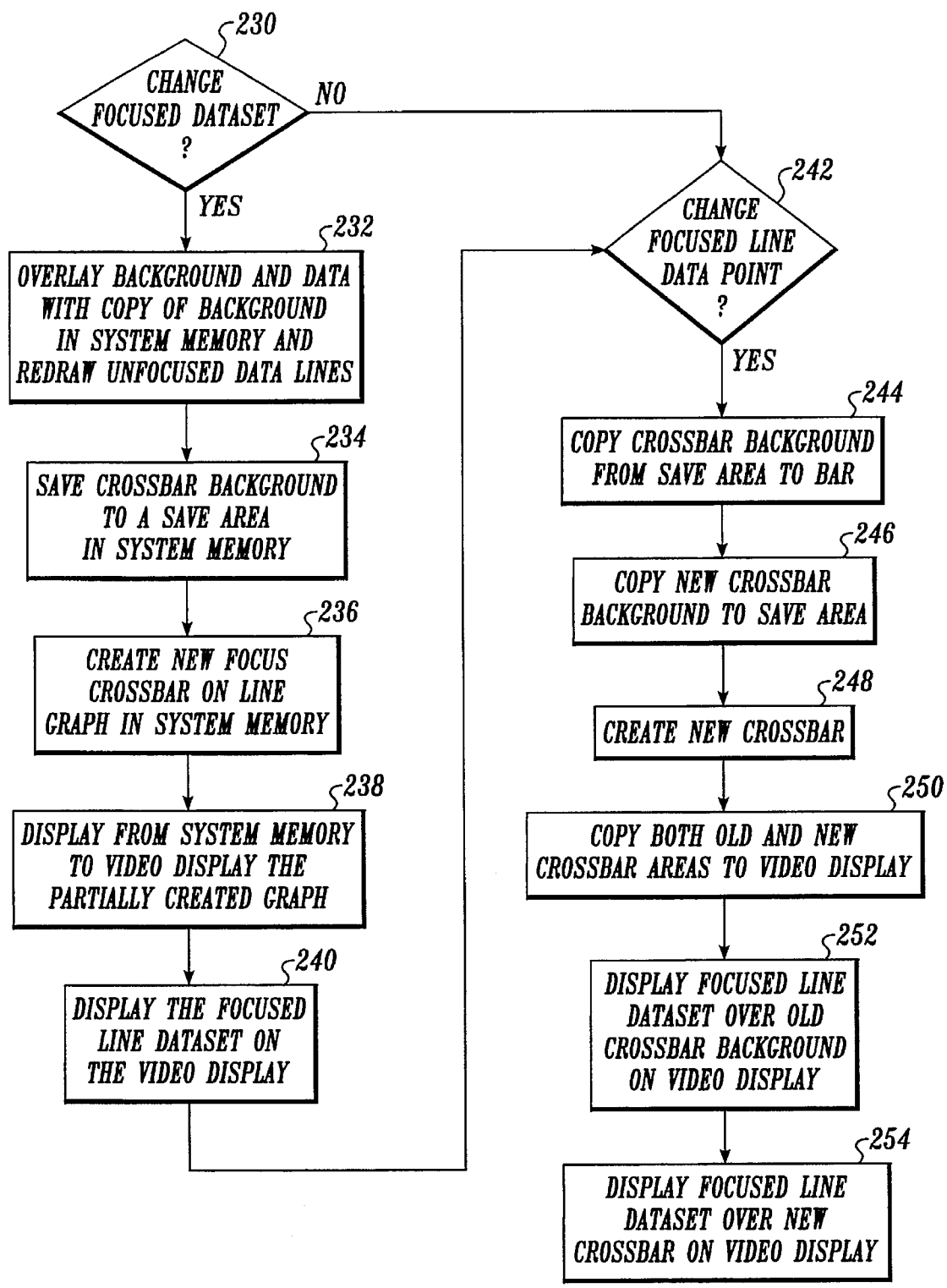
FIG. 13 is a flowchart illustrating the steps carded out by the dynamic input graph program of FIG. 4 in reconfiguring a dynamic input line graph.

The reconfiguration step at block 80 of FIG. 4 is best understood by reference to FIGS. 11 and 13. The program begins at a decision block 230, where the determination is made whether there is a change in the line dataset. If there is a change in the line dataset, the logic of the program proceeds to block 232. At block 232, the dynamic line graph background and data lines in system memory shown as FIG. 11F are copied over with the line background in system memory shown as FIG. 11A. Also at block 232, the new group of unfocused dataset lines are created, yielding a result shown as FIG. 11B.

At block 234 crossbar background which will be used for the focus crossbar is saved to the existing save area in system memory, shown as FIG. 11C. At block 236, the crossbar is drawn on the dynamic line graph background with the unfocused line dataset shown as FIG. 11D. These steps are analogous to the step at block 218 in FIG. 12 representing the creation process. Following the same method as described above for blocks 220 and 222 of FIG. 12, blocks 243 and 244 complete the process of presenting the graph on the video display. At this point the reconfiguration of the graph is complete with respect to a changing focused line dataset.

In this example, at decision block 242, the determination can also be made whether there was a change in the focused line data point. If a different line data point is selected by the computer user to be the focused line data point, blocks 244–254 are performed. At block 244, the crossbar background shown as FIG. 11C is copied to the dynamic line graph background shown as FIG. 11D, restoring it to the state shown as FIG. 11B. At block 246, the new location for the crossbar is copied from system memory shown as FIG. 11B to the existing save area in system memory, shown as FIG. 11C. At block 248, the crossbar is created in system memory, shown as FIG. 11D, at its new system memory location. At this point the system is ready to update the image on the video display for the user. At block 250, both the new and old crossbar areas are copied to the video display, shown as FIG. 11F, from system memory just prepared shown as FIG. 11D. At blocks 252 and 254, the portions of the focused line dataset in the old and new crossbar areas on the video display are redrawn, since they were obscured by the copying operations at block 250.

Note that reconfiguring the graph is simpler and faster than creating and displaying it in the first place. This is intentional, because although computer users can grow impatient waiting for a line graph to display, they are even less patient with delays resulting from redisplay of slightly changed line graph images. Note that delays in modification of data elements are tolerated even less by users. For this reason every effort must be made by the programmer to have the modification of data elements be faster than the reconfigurations, and the reconfigurations faster than creations of graphs.

Modification of Dynamic Input Line Graphs

The modification step at block 84 of FIG. 4 is best understood by reference to FIGS. 11 and 13. Note that the modification of the line occurs very quickly because the line graph is not composed from scratch on the video display; rather, sections of lines which are virtually complete are quickly copied from system memory to the video display.

Figure 14:
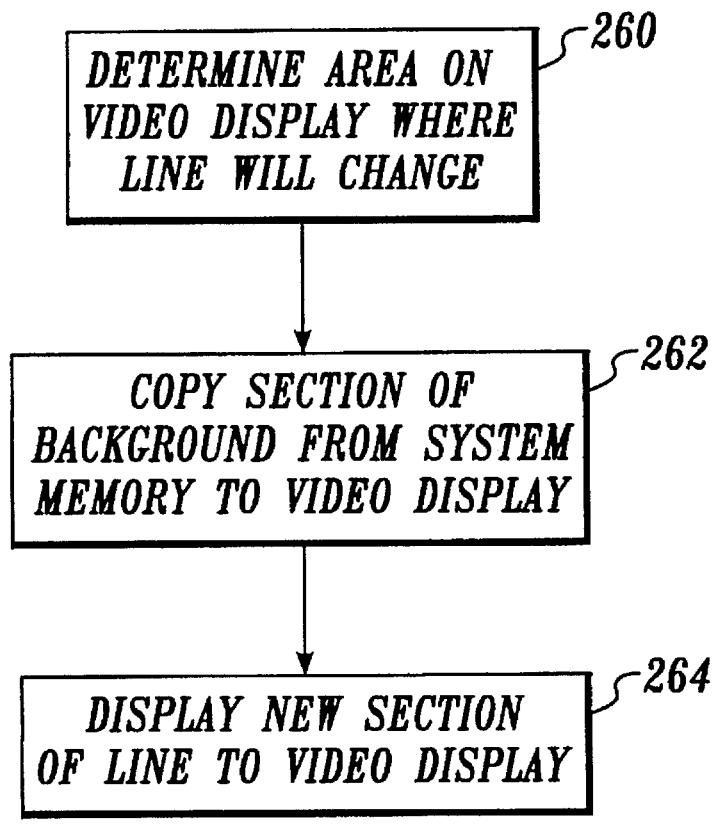
FIG. 14 is a flowchart illustrating the steps carded out by the dynamic input graph program of FIG. 4 in modifying a dynamic input line graph.

At block 260 of FIG. 14, a determination is made where the line being manipulated by the computer user will change. In this embodiment of the present invention, line segments are straight and connect corresponding graph data points. At block 262 the line segments to be changed will first be erased by copying a section of the background system memory shown as FIG. 11B to the video display. Copying as little as possible from system memory to the video display will save time in the copy process. Block 260 is therefore concerned with determining the minimum area which can be copied. Note that it may prove desirable to make just one copy of a large area, or several copies of smaller areas. In practice, the characteristics of the system will determine which is more efficient. Although the data points are connected by straight line segments in this example, it is obvious that various curve smoothing techniques can generate lines which are also within the scope of these methods. After the changing line segments are erased from the video display, at block 264 new line segments can be drawn on the video display, shown as FIG. 11F.

In an alternate embodiment of the present invention, it is also possible to copy the dynamic line graph background from system memory shown as FIG. 11A to yet another area of system memory where the new data line is drawn. That new area of system memory may then be copied to the video display shown as FIG. 11F.

Creation of Dynamic Input Pie Graphs

Figure 15A:
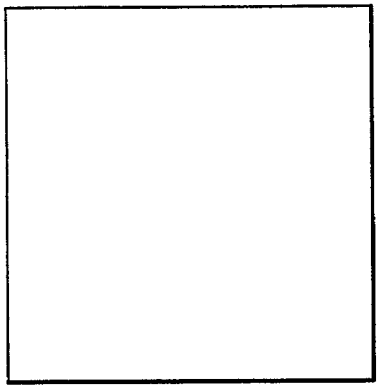
FIG. 15A is an illustration of a dynamic pie graph background formed in accordance with the present invention.
Figure 15B:
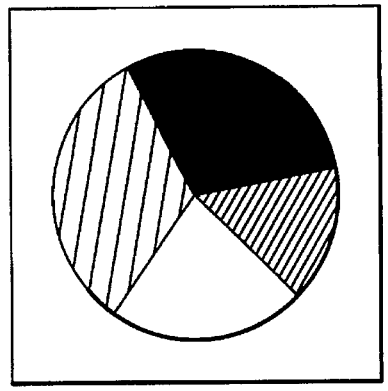
FIG. 15B is the illustration of FIG. 15A, further including pie elements, namely pie wedges, forming a complete pie graph.
Figure 15C:
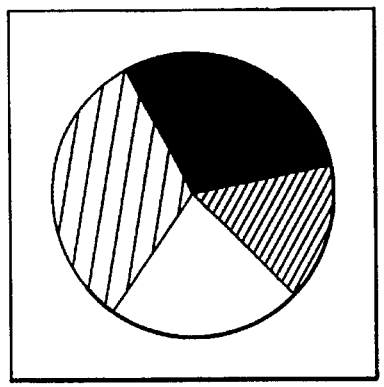
FIG. 15C is the illustration of FIG. 15B displayed on the video display.
Figure 15D:
FIG. 15D is an illustration of a pie focus indicator symbol.
Figure 15E:
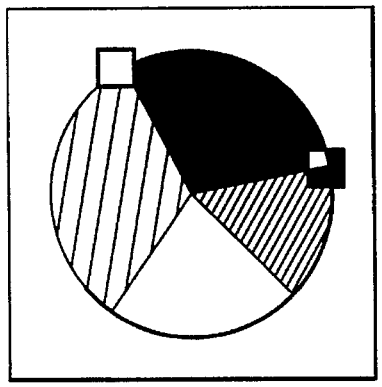
FIG. 15E is the illustration of FIG. 15C, further including two pie focus indicator symbols of FIG. 15D placed at opposite outside edges of a pie wedge of the dynamic pie graph.
Figure 16:
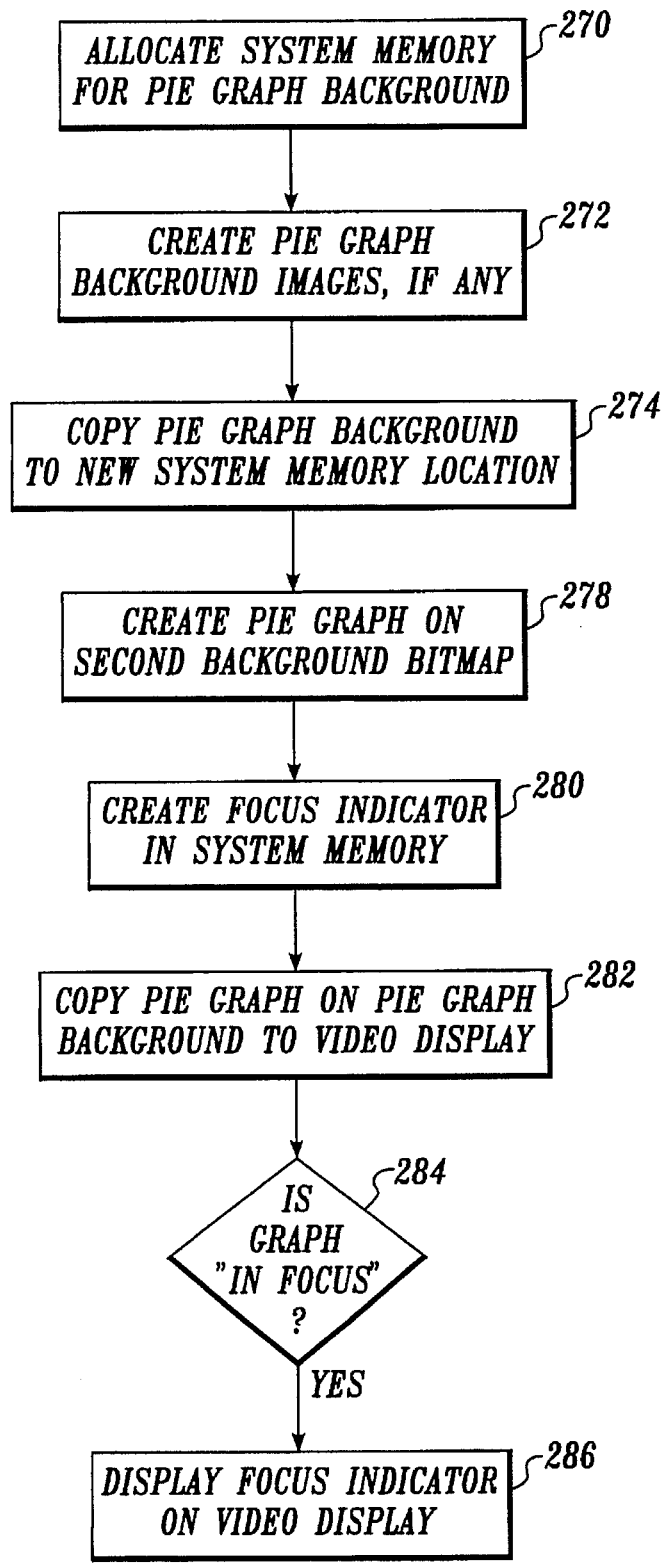
FIG. 16 is a flowchart illustrating the steps carried out by the dynamic input graph program of FIG. 4 in creating a dynamic input pie graph.

With respect to input pie graphs, the creation step at block 64 of FIG. 4 is best understood by reference to FIGS. 15 and 16. As referenced in FIG. 16, at block 270 an area in system memory shown as FIG. 15A is allocated that corresponds to the pie graph as it will ultimately appear on the video display, shown as FIG. 15C. At block 272, system memory, shown as FIG. 15A, has created on it the complete dynamic pie graph background of the pie graph, potentially including, for example, images of symbols or objects, or even text such as labels and legends. FIG. 15A shows the simple example of a graph background composed of a single even color. The dynamic pie graph background shown as FIG. 15A will be used to improve efficiency during pie graph reconfiguration and modification.

At block 274, a second area shown as FIG. 15B is set up in system memory, which is identical in every respect to FIG. 15A, and the FIG. 15A system memory contents are copied into the new area shown as FIG. 15B. At block 278, the pie wedges are created onto the second dynamic pie graph background, producing the pie graph shown as FIG. 15C. At block 280, a focus indicator symbol for delineation of the focused pie element is created and saved in memory, shown as FIG. 15D. At block 282, the pie graph shown as FIG. 15B is then copied from system memory to the video display to produce the image shown as FIG. 15C. At decision block 284, a determination is made whether a pie wedge of the pie graph is focused. If a pie wedge is focused, the logic of the program proceeds to block 286, where the focus indicator is copied from system memory shown as FIG. 15D to the video display, producing the focused pie graph shown as FIG. 15E.

Note that the various images in system memory, namely, those shown as FIGS. 15A, 15B, and 15D, are being retained to speed later processes of reconfiguration and modification. Should, for example, a more complex background representation than FIG. 15A be desired, then this will have no effect on the speed of a reconfiguration or a modification. Saving the pie graph image shown as FIG. 15B further provides for an extremely fast undo/redo operation during pie graph modification. The undo/redo option will be discussed below.

Reconfiguration of Dynamic Input Pie Graphs

Figure 17:
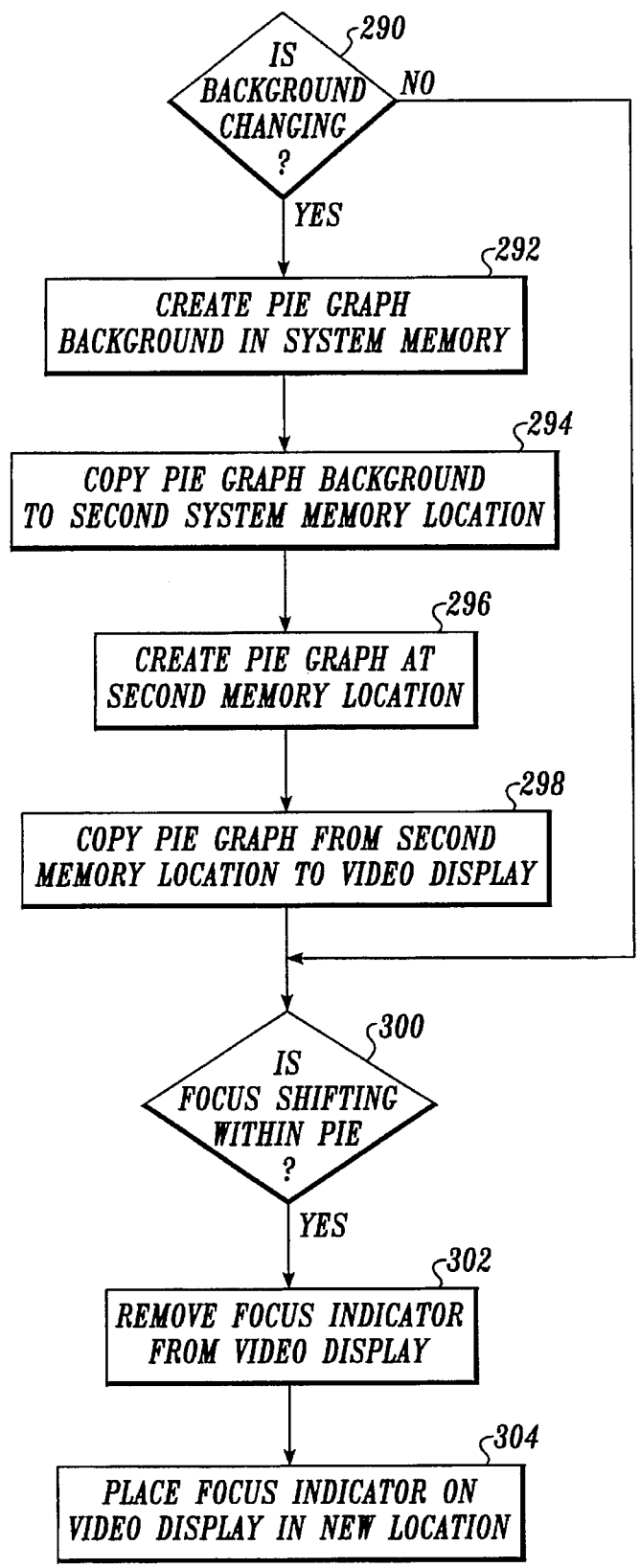
FIG. 17 is a flowchart illustrating the steps carded out by the dynamic input graph program of FIG. 4 in reconfiguring a dynamic input pie graph.

The reconfiguration step at block 80 of FIG. 4 is best understood by reference to FIGS. 15 and 17. The program begins at a decision block 290, where the determination is made whether there is a change in the dynamic pie graph background. If there is a change in the dynamic pie graph background, the logic of the program proceeds to block 292. At block 292, the dynamic pie graph background is created in system memory shown as FIG. 15A. Next, the dynamic pie graph background and the pie graph are reestablished at the second system memory shown as FIG. 15B. At block 294, the dynamic pie graph background, shown as FIG. 15A, is copied to a second memory location shown as FIG. 15B. At block 296, the pie graph is created at the second system memory location. These steps yield an image such as shown as FIG. 15B. Once the pie graph shown as FIG. 15B is prepared in system memory, it is copied to the video display at block 298 and, if needed, the focus indicator, shown as FIG. 15D, is displayed In an alternate implementation of the present invention, it will be appreciated that some systems have the ability to rapidly and directly combine two images in one step through a masked copy. In such a case, the new dynamic pie graph background shown as FIG. 15A can possibly be combined with a complex pie graph image such as shown in FIG. 15B in one "masked copy" step that replaces blocks 294 and 296. This powerful mask-and-copy technique may find other applications, such as erasing various symbols or other items from bitmaps or the video display, or combining bitmaps onto the video display.

At decision block 300, the determination is made whether a pie wedge has gained or lost focus. If focus has shifted from one pie wedge to another, the logic of the program proceeds to block 302, where the old focus indicator is first removed from the video display by copying the needed areas from the dynamic pie graph background in system memory shown as FIG. 15B over the corresponding focus indicator areas on the video display. At block 304, the new focus indicator is put on the video display by copying from system memory shown as FIG. 15D or by drawing on or otherwise directly manipulating the video display.

Note that reconfiguring the graph is simpler and faster than creating and displaying it in the first place. This is intentional, because although computer users can grow impatient waiting for a pie graph to display, they are even less patient with delays resulting from redisplay of slightly changed pie graph images.

Modification of Dynamic Input Pie Graphs

Figure 18:
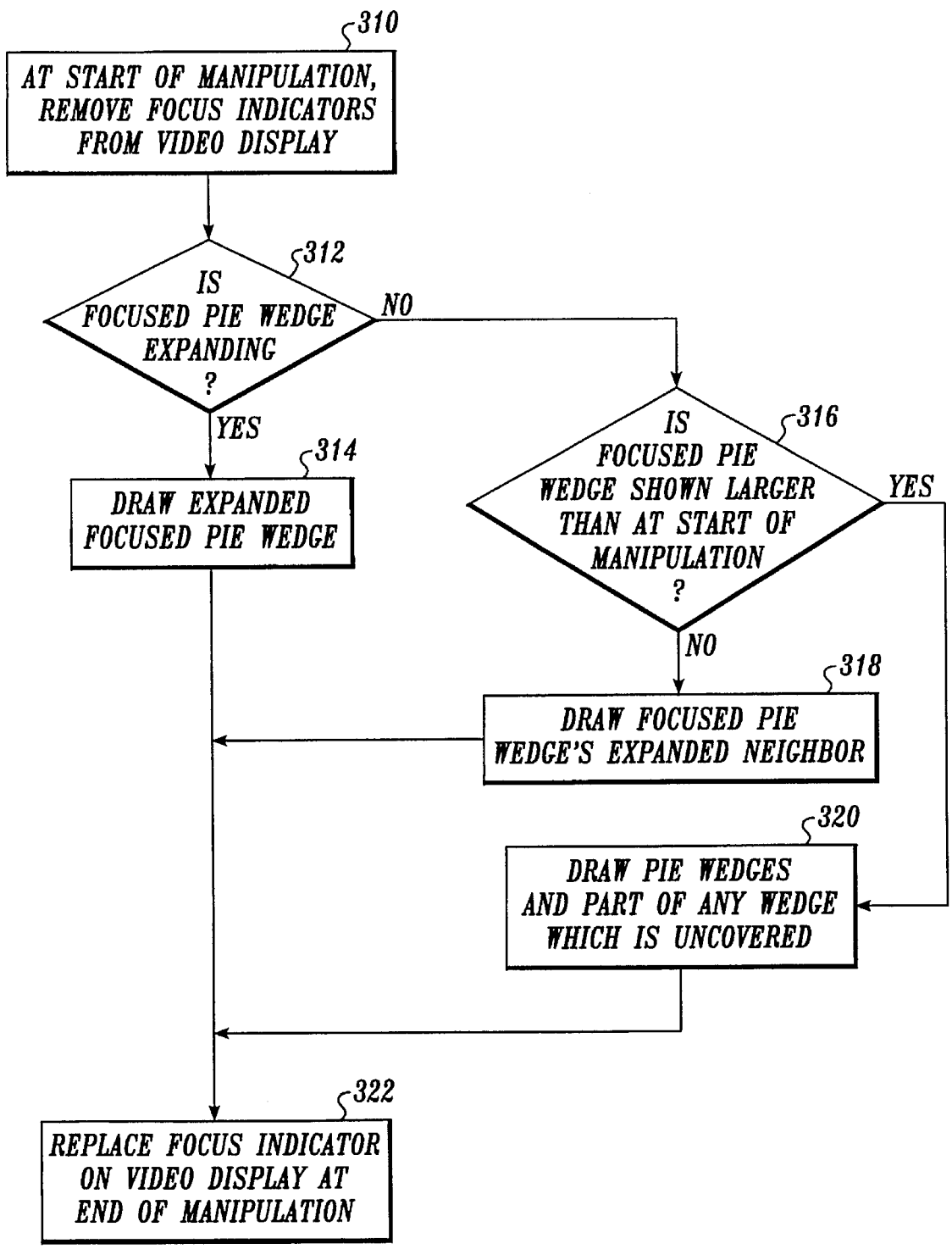
FIG. 18 is a flowchart illustrating the steps carded out by the dynamic input graph program of FIG. 4 in modifying a dynamic input pie graph.

The modification step at block 84 of FIG. 4 is best understood by reference to FIGS. 15 and 18. Note that the modification occurs quickly because only wedges which are expanding or contracting are modified. In addition, the addition or removal of a focus indication can be achieved quickly.

In this example, the focus indicator can be added by copying it to the video display shown as FIG. 15C from system memory shown as FIG. 15D, where they have been previously drawn and saved. The focus indicator cannot be removed from the video display shown as FIG. 15E by copying over them on the video display shown as FIG. 15C with the corresponding area of system memory shown as FIG. 15B. At block 310, the focus indicator is therefore removed from the video display.

At decision block 312, the determination is made whether the user manipulation is causing the focused pie wedge to expand or contract. If the focused pie wedge is expanding, the pie wedge having focus is simply redrawn at block 314, overlaying a portion of its neighbor wedge up to the location of the edge which is being manipulated. If, on the other hand, at decision block 312, the determination is made that the focused pie wedge is being decreased in size by the user through manipulation of the focused pie edge, the logic of the program proceeds to decision block 316. At decision block 316, a determination is made whether the focused pie wedge shown is larger in size than it was at the start of the manipulation. In this example, if the user first increases the focused pie wedge in size, and then moves the dragged edge back, shrinking the wedge, the previous appearance of the pie is restored at block 320. Thus, it looks to the user like the focused pie wedge first covers, and then uncovers, the pie wedges which it neighbors. The other possibility is that the focused pie wedge was made smaller by the user's manipulation from the start. If this is the case, then the neighbor is expanded. That is, the other unfocused pie wedge neighboring the focused pie edge is expanded at block 318.

Regardless whether from block 314, 318, or 320, the logic of the program proceeds to block 322, where the focus indicator is replaced on the video display. This replacement of the focus indication can be accomplished through a copy or a display as discussed above.

The description in detail of the modes in the example are not intended in any way to restrict or limit the broad features or principles of the invention, or the scope of the patent monopoly to be granted. Note that it is obvious that other modes of behavior can be designed for pie graphs, such as for example, shrinking the unfocused pie wedges equally, as the focused pie wedge increases in size. It is contemplated that many changes and modifications may be made to the present invention without departing from the spirit and scope of the invention as disclosed.

The Use of Intermediate Graphic Bitmaps in System Memory

Although graphics are highly desirable as a means of interfacing between users and their computers, computer graphics programs have one serious drawback. They require large amounts of resources, such as system memory, storage, and (most especially) high speed processing units. This is doubly so for animation, since animation involves rapidly redrawing graphic images, often on the order of 10 or more times per second. Since today's commonly used hardware, operating systems, and graphic environments are just barely capable of supporting believable animation from the point of view of speed, it was necessary to optimize the graphic animation routines for speed.

In order to speed up the animation routines associated with the dynamic graph manipulation, intermediate results of computations that are performed repeatedly are saved. In practice this involves storing in system memory the (x,y) location of every point of significance which is displayed on the video display, as well as numbers such as conversion factors used in computing the locations. In addition, intermediate bitmaps of the graphics are retained in system memory, as well as a bitmap of the final graph.

The high speed Bit Blit operation is used to copy the needed portion of system memory-resident graphic image to the video display for viewing by the user. In the process of building the final graphic image for display, Bit Blit operations are used frequently for copying from one intermediate image in system memory to another. For example, FIG. 25C shows a line graph 448 having a crossbar 470 created from three bitmaps saved in system memory, shown as FIGS. 25D–25F. FIG. 25D shows the background to the line graph 448, in this case a simple graticule. Note that the frame 472 is not part of the bitmap, rather it represents the limit of the bitmap image in system memory. FIG. 25E is created by copying the FIG. 25D bitmap, and then drawing the lines 464 and 468 representing the unfocused datasets. FIG. 25F shows the third bitmap which is built up in system memory. This bitmap is created by copying the FIG. 25E bitmap, and then drawing the crossbar 470 and the focused line data point 466.

When the user moves the user manipulation device in a manipulation, a program section responding to the movements is repeatedly invoked in rapid succession at many points along the path of the user manipulation device. The first step in the program section is to erase the line segments of focused line data point 380 in FIG. 25F that will change by copying over them with the corresponding area from FIG. 25E. The new line segments are drawn on the bitmap in FIG. 25F. Finally, the FIG. 25F bitmap is copied to the video display. Clearly, it is faster to copy the small sections that change rather than copying the whole graph. It should be noted that the coordinates used for the copy should be computed once, and then stored for subsequent use in responding to the next time the section is invoked as the manipulation continues.

From the foregoing, it should also be clear that if extra features are present such as the crossbar 470, it is preferable to draw separate bitmap images of the object. If the image is complex, such a strategy can significantly speed the program as a whole. The methods of high speed graph drawing exemplified by the bar line, and pie graph drawing methods are detailed in the present invention.

It should also be noted that on slow systems running software such as Microsoft®Windows™, it is extremely important to paint the bitmaps in system memory and on the video display from within the program section responding to pointer movement, rather than the more from the more usual video display-drawing program section. Given today's typical processor speeds, the wait for the usual video display-drawing program section delays the process as a whole. This slows to an unacceptable degree the overall motion on the video display during a manipulation.

Manipulating the Dynamic Graph with a Mouse

The dynamic graph can be changed with the mouse or other user manipulation device. Data representation elements representing data values can be manipulated. The normal graphic manipulation technique for the graphic environment being used is employed. The initial reduction to practice of the present invention, for example, uses the mouse "drag" technique described in the Notation and Nomenclature section above.

Figure 21A:
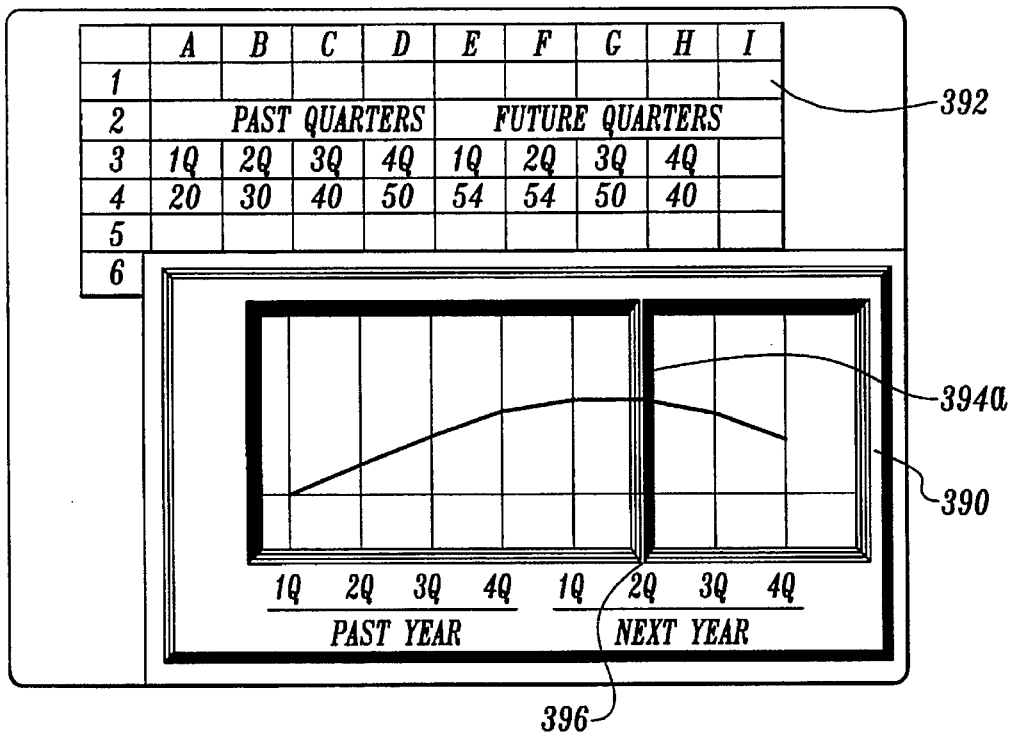
FIG. 21A is an illustration of cells of a spreadsheet having data and a dynamic input line graph, wherein the dynamic input line graph corresponds to the data of the spreadsheet and includes a focused line dataset and a crossbar that is stationary on a line data point.
Figure 21B:
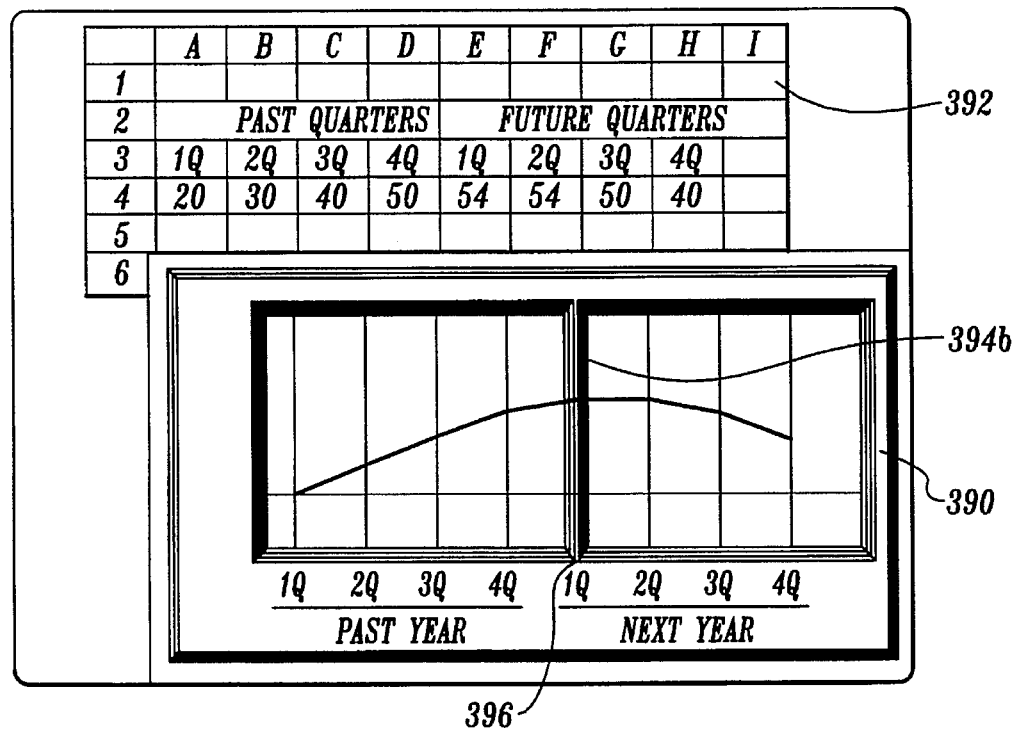
FIG. 21B is the illustration of FIG. 21A showing a change in the location of the crossbar distinct from the location of the crossbar of FIG. 21A, reflecting a change in the focused line data point.
Figure 21C:
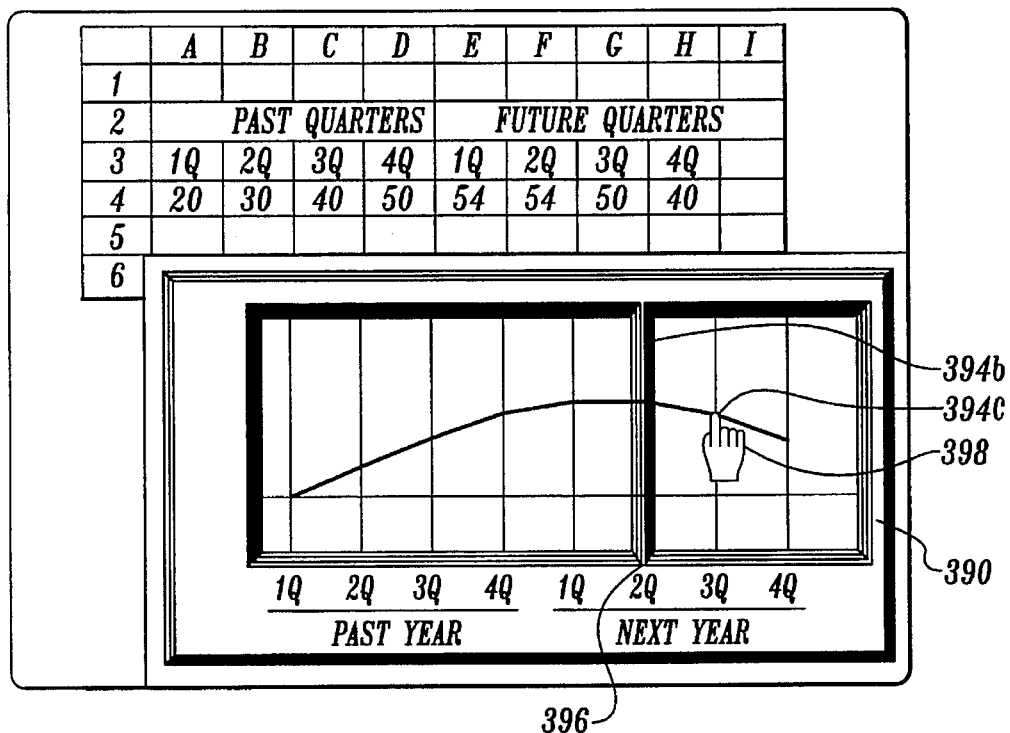
FIG. 21C is the illustration of FIG. 21A, wherein the dynamic input line graph further includes a cursor poised to select a new focused line data point.
Figure 21D:
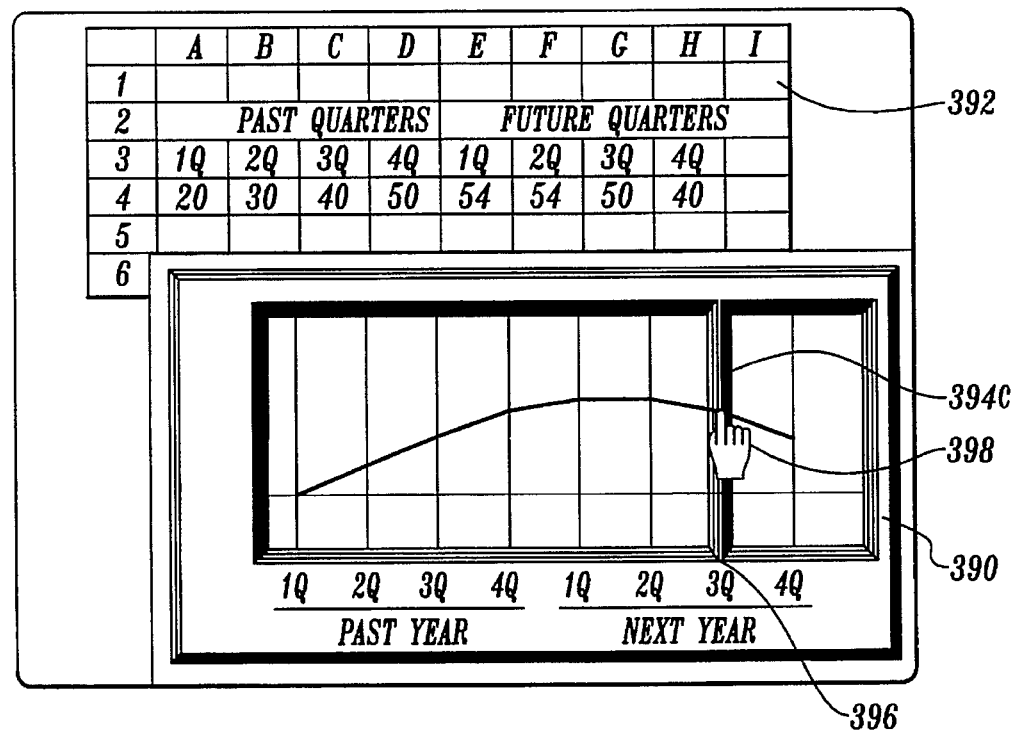
FIG. 21D is the illustration of FIG. 21A showing a change in the location of the crossbar distinct from the location of the crossbar of FIG. 21C, reflecting a change in the focused line data point.
Figure 21E:
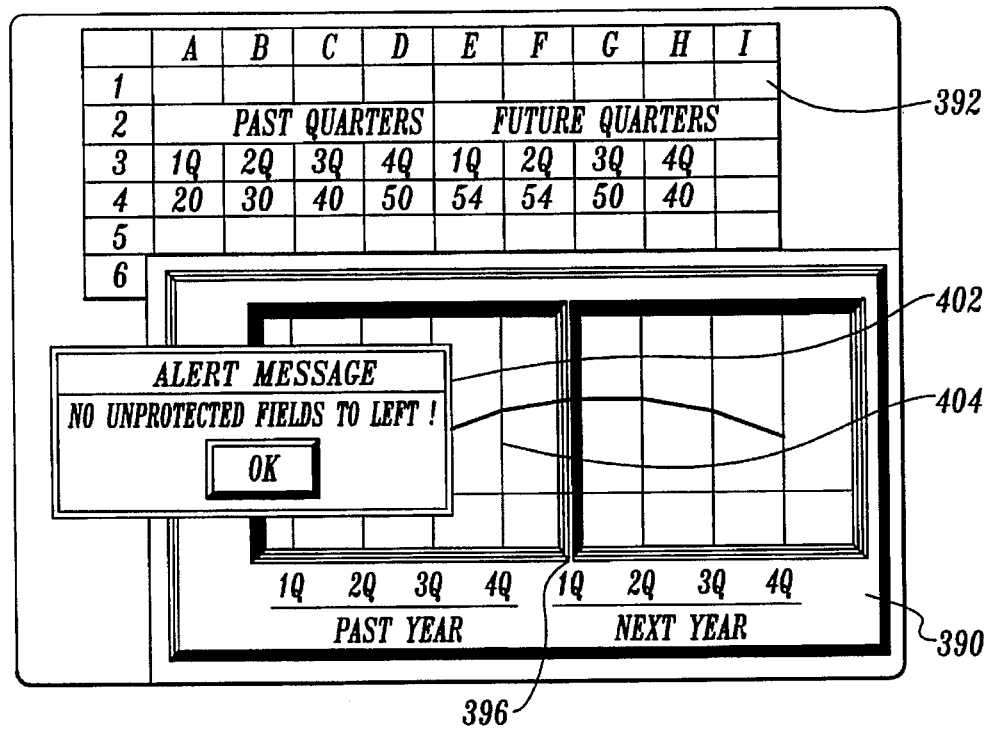
FIG. 21E is the illustration of FIG. 21A, further including an alert message prominently displayed on the dynamic input line graph indicating an attempt to shift the focus of the dynamic input line graph to a protected line data point.
Figure 21F:
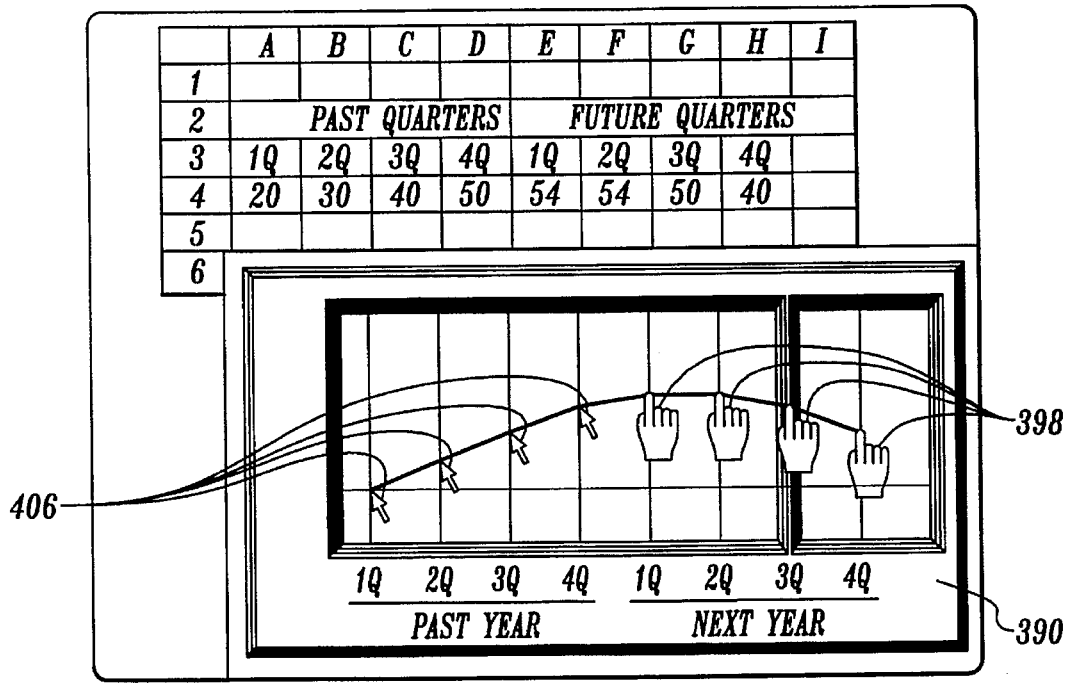
FIG. 21F is the illustration of FIG. 21A, further including eight cursor images positions above eight distinct line data point, four of which indicate nonmanipulable line data points because of their location in a protected area, while the other four indicate manipulable line data points.

A change of cursor shape can indicate where drag can be started. The user can use the mouse to sweep the standard cursor, an arrow 406 as shown in FIG. 21F, across the dynamic graph on the video display. As it is swept across the graph, it is transformed into a "hand with the index finger extended" 398 whenever it passes over an area where a graphic element can be dragged. The areas for a line graph are shown, for example, in FIG. 22E, 418a–418h. Whenever the cursor's "hot spot" is in one of these areas, the cursor is transformed, notifying the user of the manipulability of the graphic element.

Another type of indicator can cue the user that a graphic element can be manipulated. A focus indicator such as a symbol can be displayed which shows the user where a mouse drag can be initiated. For example, with reference to the dynamic pie graph shown in FIGS. 26A–26F, white symbols 480 and reversed-color symbols 482 are used in the dynamic pie graph context. When, as shown in FIG. 26C, the "hot spot" of the cursor 484b is on one of the indicators, it is changed to the "hand with the index finger extended" that is used in manipulation. The edge of the pie wedge can then be dragged around the pie from the indicated point as shown in the sequence FIGS. 26C–26E. The change of one pie wedge's size will also change the size of a neighboring pie wedge and, at the end of the manipulation, alter the underlying graph data corresponding to all pie wedges. The present invention can therefore change multiple graph data in the spreadsheet application by changing the respective wedges in the dynamic input graph.

Other variations of modifications of the pie graph are also contemplated, including: (1) when the focused pie wedge increases, the absolute amounts represented by the other wedges does not change, thus the graph total amount represented changes; (2) when the focused pie wedge increases, the total amount does not change, but each of the others decreases by an amount that is the same for each of the remaining non-zero wedges; and (3) when the focused pie wedge decreases, all others increase to such an extent that the total is unchanging.

Dragging to the Margins

Figure 22A:
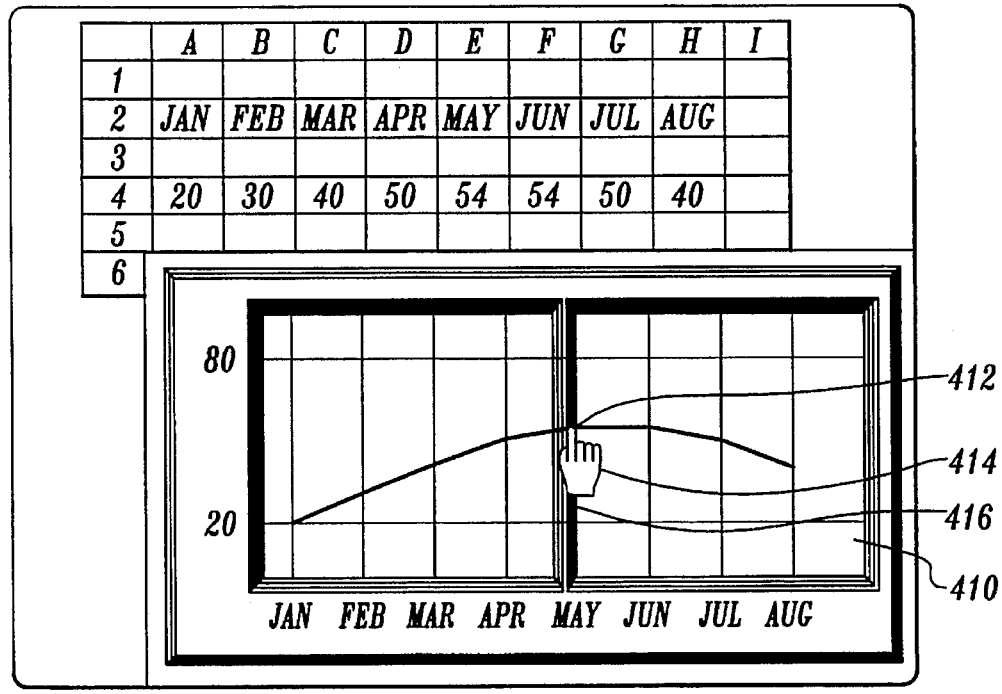
FIG. 22A is an illustration of cells of a spreadsheet having data and a dynamic input line graph, wherein the dynamic input line graph corresponds to the data of the spreadsheet and includes a focused line dataset, a crossbar, and a cursor poised to manipulate a line data point.
Figure 22B:
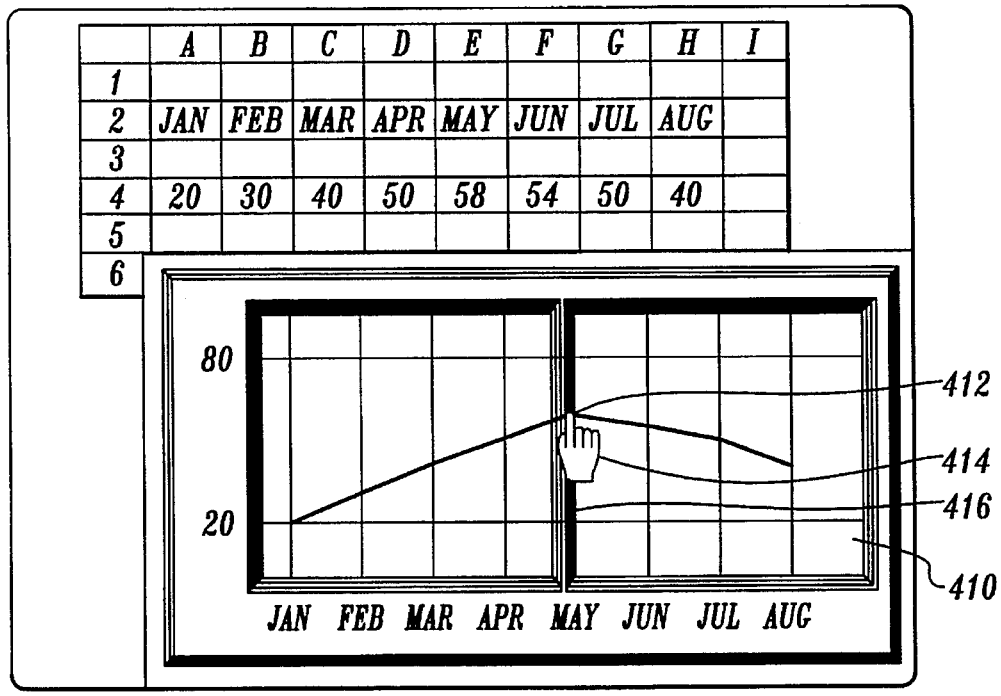
FIG. 22B is the illustration of FIG. 22A, wherein the line data point has been manipulated upwards, altering the position of adjacent lined segments of the focused line dataset and the underlying graph data displayed in a cell of the spreadsheet.
Figure 22C:
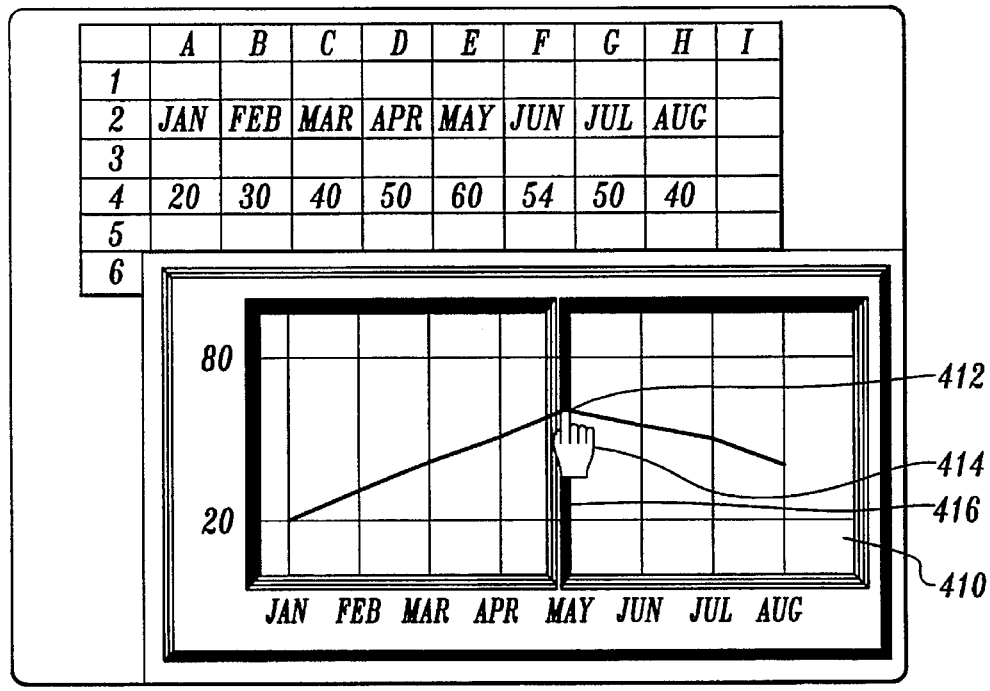
FIG. 22C is the illustration of FIG. 22A, wherein the line data point has been manipulated further upwards, again altering the position of adjacent lined segments of the focused line dataset and the underlying graph data displayed in a cell of the spreadsheet.
Figure 22D:
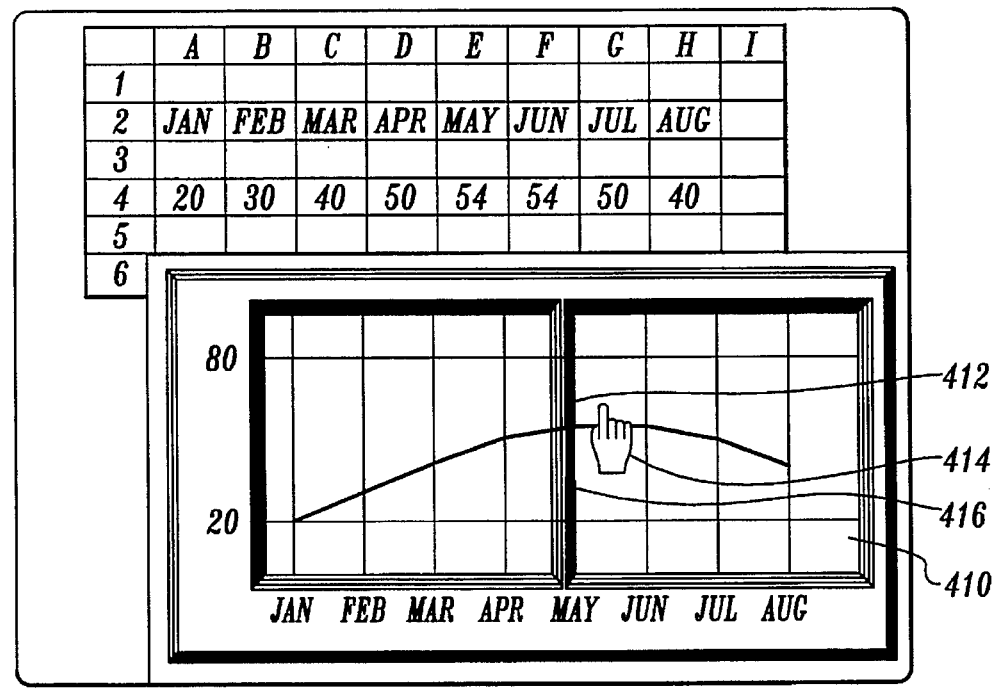
FIG. 22D is the illustration of FIG. 22A, wherein the cursor previously manipulating the line data point of the focused line dataset has been moved away from the manipulation area, causing the focused line dataset to revert to its position prior to manipulation.
Figure 22E:
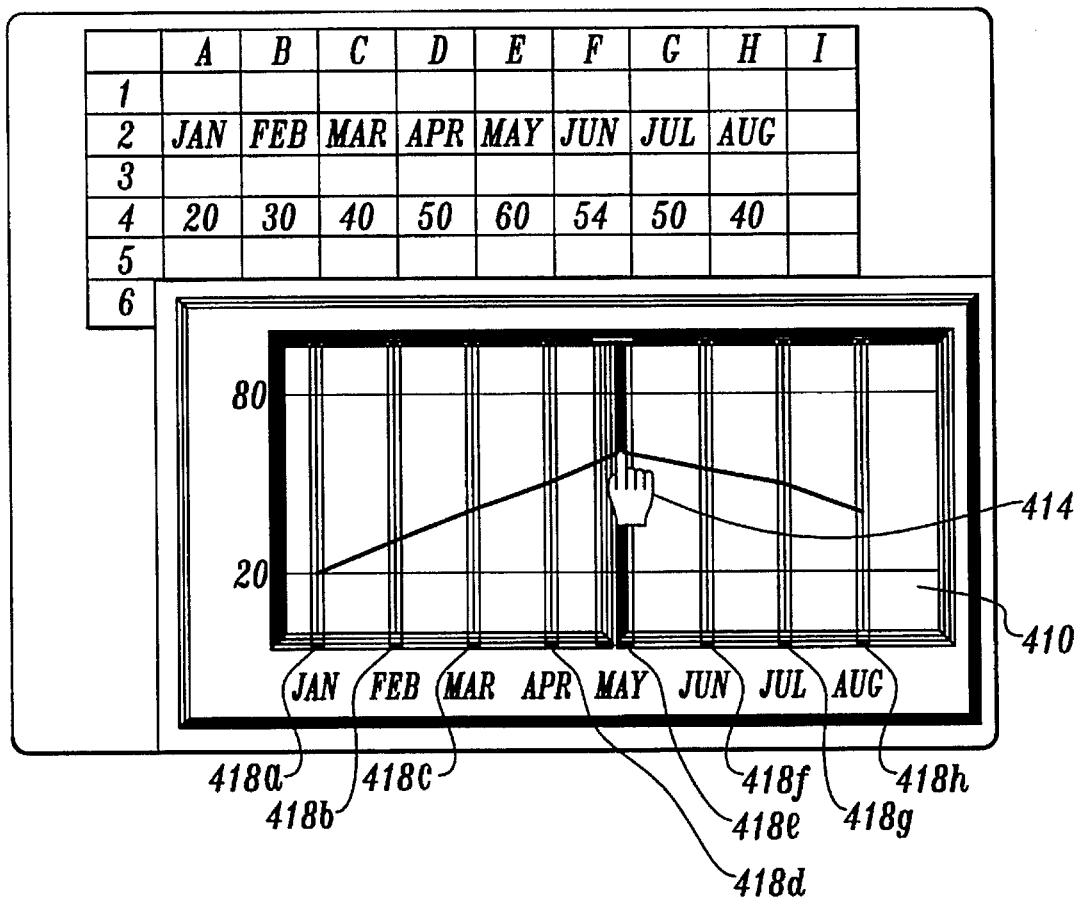
FIG. 22E is the illustration of FIG. 21A, wherein the manipulation area corresponding to each line data point is illustrated, including the tolerance regions at the top and bottom of the graph that allows movement of the cursor slightly beyond the bounds of the dynamic input line graph without causing the undo operation.

Often a user will want to manipulation a data element to the margin of the graph, i.e. to the limit of its range on the graph. As a matter of convenience to the user, the interface allows the user to overshoot the margin slightly, and acts as though no overshoot has occurred, creating in essence a tolerance range. With reference to FIG. 22E, the overshoot tolerance is achieved using transparent windows by making the transparent windows signifying manipulation area 418a–418h slightly larger than the face of the dynamic graph. This causes mouse positions to be reported which are slightly past the margins of the graph face while still allowing the user to manipulate the date element.

The desired amount of overshoot tolerance is a matter of programmer preference. The tolerance is therefore to be adjusted according to how much the transparent window extends beyond the graph face. In the preferred embodiment, the overshoot tolerance factor is adjusted with a dynamic graph parameter prior to program compilation, but can also be made a user-controlled variable for changing during run-time.

Undo/Redo for Mouse Movement During Dynamic Graph Manipulation

Manipulation of a dynamic graph is itself a dynamic operation, and computer users frequently make mistakes in manipulating the dynamic graph, while at other times the computer users simply are uncertain how they wish to proceed. Many computer programs help the user in both these situations by providing "undo/redo" mechanisms. The computer simply keeps a history of the state of the system, and upon request by the user, backs up to reestablish a prior state. The request by the computer user normally involves clicking on an "undo" button, or selecting an "undo" menu option. After backing out of one or more actions, it is typically also possible to retrace the "undone" steps by clicking on a "redo" button, or selecting a "redo" menu item The action which is undone or redone is normally a keystroke, a selection using the mouse, or a drag by the mouse.

The present invention has an undo/redo capability that the computer user can activate during manipulation of the dynamic graph by way of a user manipulation device such as a mouse. Using this undo/redo capability, a computer user can redisplay the graph and its associated numbers as it was prior to a manipulation, while the manipulation is actually being done. This ability to snap quickly between two graph states is useful in evaluating desirable graph shapes and the associated graph data, and further allows computer users to evaluate possible graphs and numbers with unparalleled speed and ease.

By way of example, reference can be make to FIG. 22, which is a pictorial representation of the undo/redo operation applied to a line graph 410. The manipulation of a line data point 412 on a line graph 410 proceeds normally while the cursor 414 "hot spot" is on or near the crossbar 416, as shown in FIGS. 22A–22C. When, as shown in FIG. 22D, the cursor 414 is slid to the right or the left of the crossbar 416, the line graph 410 and associated line data point 412 snap back to their initial state, demonstrating the undo feature. Should the cursor 414 be brought back onto the crossbar 416, the line graph 410 and line data point 4 12 snap back to the new state, as shown in FIG. 22C, demonstrating the redo feature.

By way of another example, reference can be made to the dynamic pie graph 478 shown in FIG. 26, which is a pictorial representation of the undo/redo operation applied to a pie graph. Manipulation of a pie wedge 486 proceeds normally as long as the cursor 484b "hot spot" is inside or near the edge of the pie graph 478 as shown in FIGS. 26C–26E. The undo feature is initiated if the cursor 484b is moved out of the circle 488 circumscribing the pie graph 364 as shown in FIG. 26D, whereupon the pie wedge 486 snaps back to its initial state. Bringing the cursor 484b back to the circle 488 of the pie graph snaps the pie and numbers to the new state, demonstrating the redo feature.

With reference to the overall flow of the dynamic input graph program shown in FIG. 4, the undo/redo function is implemented at block 82. To implement this feature, at block 82 a determination is made whether the mouse or other user manipulation device has, during the manipulation, strayed past defined limits based on the expected motion of the manipulated data representation element. For example, a vertical bar can be dragged up or down to the margins of the graph, but not beyond. Neither can a bar which is being adjusted vertically by the user reasonably be expected to also be dragged to the right or left. The feature is implemented by setting bounds, such as a rectangle, to define the range of mouse movement. The rectangular bound, in this case, might extend from the upper graph margin to the lower graph margin, and have a width equal to the bar element being dragged. If, however, during the manipulation by the user, the pointer moves beyond the bounds, then the "undo" feature is invoked. The "redo" feature is invoked if, during the same manipulation, the pointer doing the dragging moves back inside the predetermined bounds.

The bounds can be implicit, such as in the bar example given, or can be explicit, such as in a pie graph implementation. In such a case, the bounding circle of the pie graph can be the region limit. While the manipulation pointer is inside the circle, the manipulation is normal. Should the user wish to see how the graph looked prior to the manipulation, the manipulation can be "undone" by moving the pointer outside the explicitly shown boundary of the circle itself. Thus, an explicit boundary can be used to show where the user can move to for a temporary "undo" action. During a manipulation, moving the pointer outside the boundary redraws the graph as it was prior to the manipulation. Moving back inside the boundary while the manipulation operation continues causes the normal graph manipulation to be reverted to, which constitutes the "redo." At block 82, the program determines whether an "undo" condition has been entered into.

Drawing the "undone" graph image can be done in the normal way of drawing the image of the particular graph in question, or in a novel way. Some graphs could require complex changes, such as pie graphs, since many pie wedges might need to be drawn, in order to restore the original image. Such complex changes could, in turn, take too long to construct on the video display, from the perspective of the user.

It is preferable, however, to save the image of a graph or portions of a graph at creation block 64 of FIG. 4 or the beginning of the manipulation step of block 82 of FIG. 4 as a bitmap in system memory. For example, with reference to FIG. 16, a pie graph can be saved in its entirety shown as FIG. 15A. At "undo" time, the program simply copies the original image shown as FIG. 15A from system memory back to the video display shown as FIG. 15B. This method yields a "snappy" look to the undo that is pleasing to computer users. The use of a saved bitmap also has application in the "redo" function implementation.

Keyboard Focus

A vital hardware element of computer systems is the user input device. The overwhelming majority of general purpose computers currently use a keyboard for input. The mouse, although popular and widely available in recent years, is not universally available, and some computer users prefer not to use it. Graphical user interfaces to computer programs should therefore support full functionality through a keyboard.

Keyboard interfaces to graphical systems: (1) must show the user which component on the video display has the keyboard focus; (2) must allow the user to move the focus from component to component; and (3) must allow control of each component by the user through the keyboard.

Clearly, when the keyboard focus is on a particular graph, the focus within the graph itself should be on the focused data element of the focused dataset. That aspect of the interface of the present invention has been discussed in detail above.

Dynamic Graph Manipulation Using a Keyboard

Figure 23A:
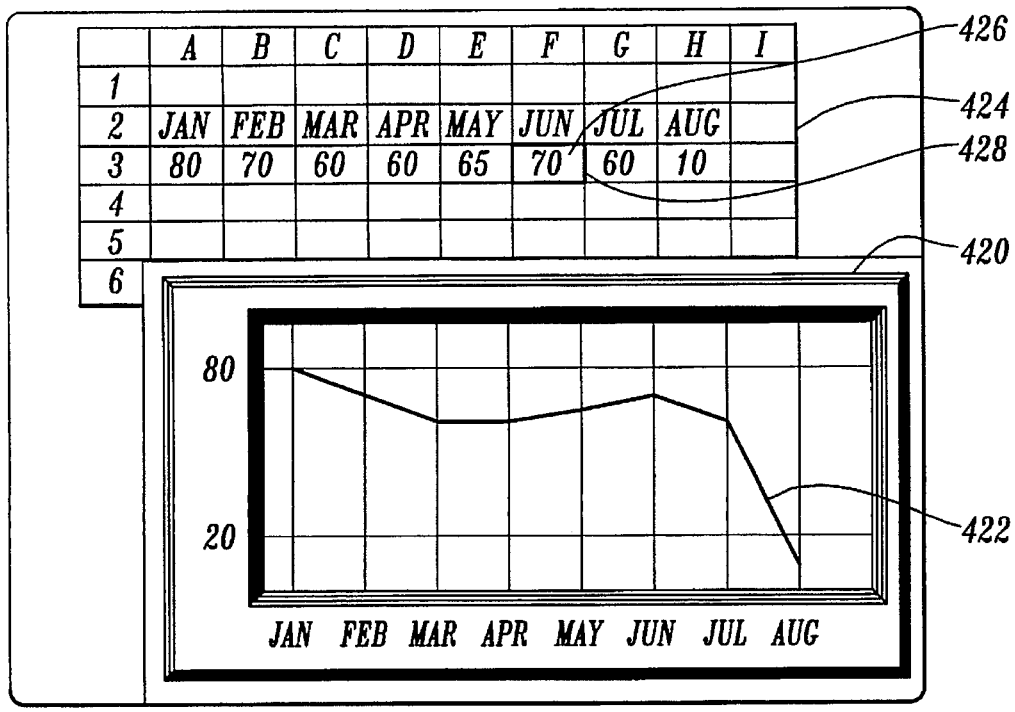
FIG. 23A is an illustration of cells of a spreadsheet having data and a dynamic line input graph, wherein the dynamic input line graph corresponds to the data of the spreadsheet and includes a focused line dataset and where the focus is on the spreadsheet such that there is no focused crossbar on the dynamic input line graph.
Figure 23B:
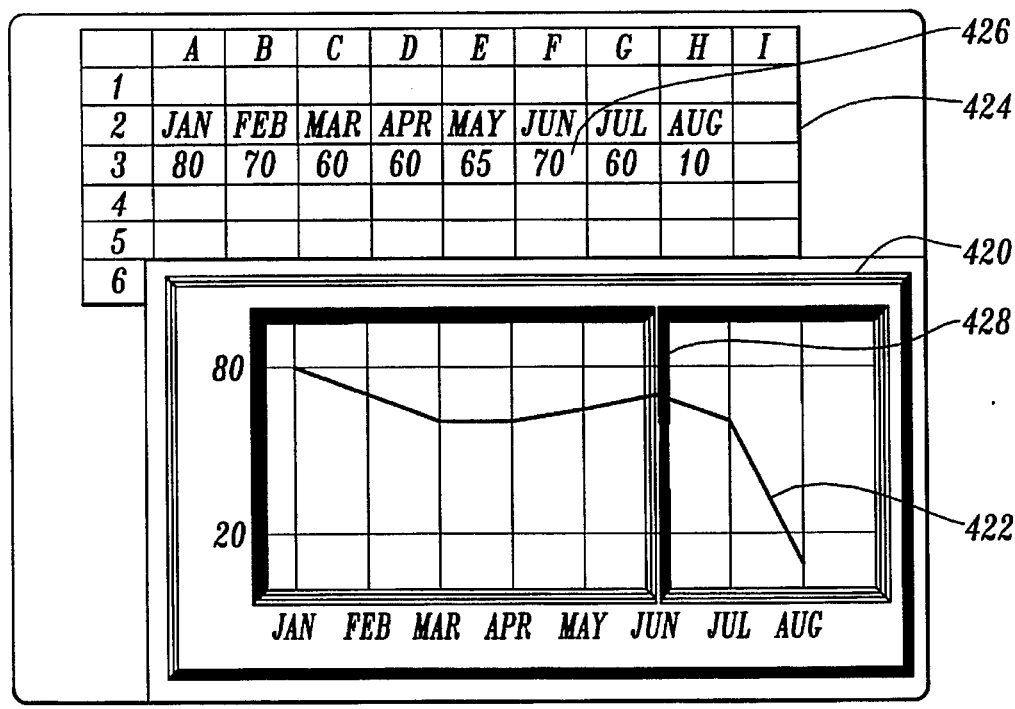
FIG. 23B is the illustration of FIG. 23A, wherein focus has been shifted from the spreadsheet cells to the dynamic input line graph such that the dynamic input line graph includes a crossbar.

A graph can be directly manipulated using a keyboard. A data representation element can be changed with, for example, the up and down arrow keys. These up and down arrow keys can indicate the user's desire to move the data representation element in the indicated direction, as in the case of a data point on a line graph. FIG. 23A shows a line graph 420 having a line 422 and an associated spreadsheet application 424. The focus is on a cell 426 in the spreadsheet, indicated by a heavy border 428 of the cell. In the preferred embodiment, depression of the tab key of the keyboard shifts the focus from the spreadsheet 424 to the line graph 420 as shown in FIG. 23B. It will be appreciated that any number of keyboard key or key combination can be used to shift the focus according to the present invention. Note that the heavy border 428 has been removed from the cell 426 it surrounded. Also note that the graph has a crossbar 428 added to indicate the presence of the focus on the dynamic line graph, as well as to indicate the location of the focused line data point.

Figure 23C:
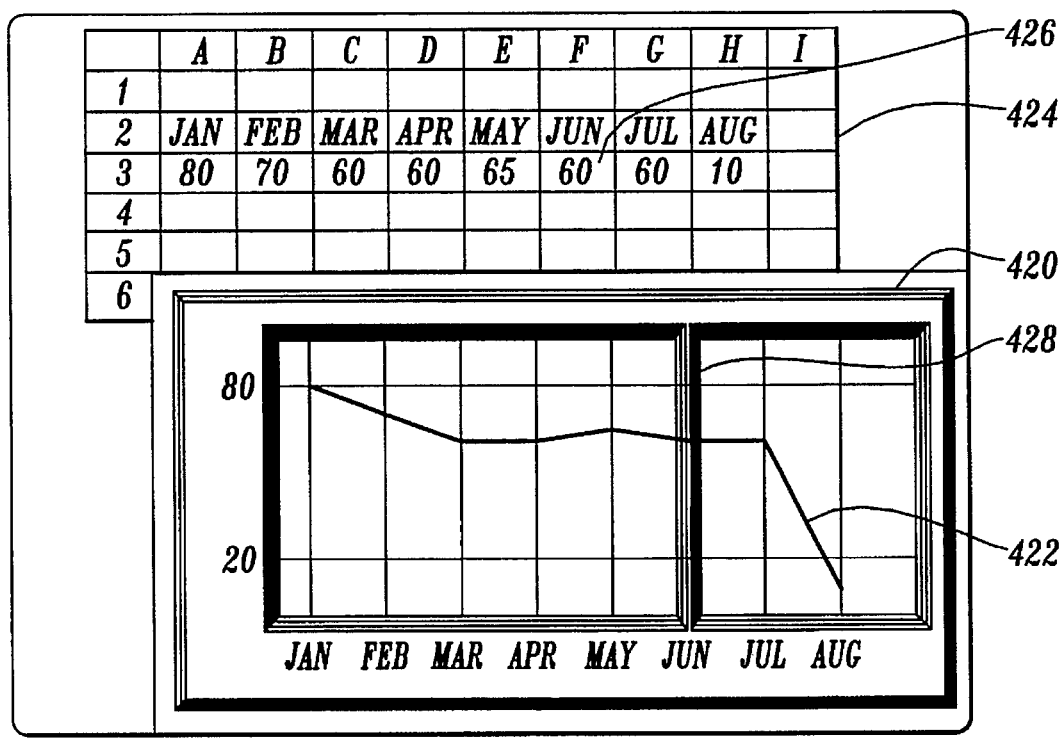
FIG. 23C is the illustration of FIG. 23A, wherein a focused line data point has been further manipulated so as to alter the underlying graph data and the presentation of that graph data in the cells of the spreadsheet corresponding to the line data point.

FIG. 23C shows the line graph after the user has reduced the value of the graph data corresponding to the line data point 422 ten units by pressing the "down arrow" cursor control key 10 times. The arrow keys indicate that the underlying graph data presented in cell 426 should be increased or decreased by a set amount. In this case, the amount is one unit per keystroke. The amount of the change on each key stroke can be defaulted by the computer program or set by the user.

Note that pie graphs present a special case, because two elements are changing. As one pie wedge decreases in size, another increases. In such cases, the present invention indicates the focused pie wedge with additional focus pie indicator symbols 480 and 482 as shown in FIG. 26C. One of the focus indicator symbols, in this case the white symbol 480, is used to indicate an edge where the keyboard focus is on the focused pie wedge. Thus the "up arrow" increases the focused pie wedge at the indicated edge, as shown by contrasting FIG. 26C to FIG. 26D, and the "down arrow" correspondingly decreases the focused pie wedge.

Distinguishing Dynamic Graphs

It is convenient for computer users to be able to distinguish between the two dynamic graph types. The dynamic graph needs a distinctive appearance, so that users will neither futilely try to change a dynamic output graph, nor fail to realize that a dynamic input graph can be manipulated.

Figure 20A:
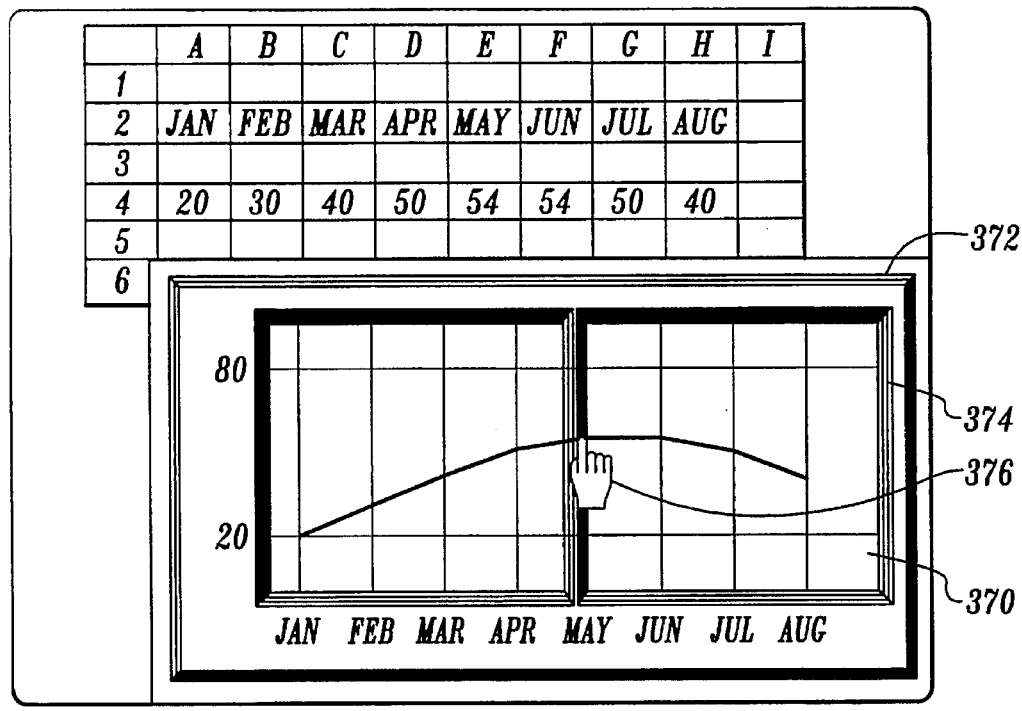
FIG. 20A is an illustration of cells of a spreadsheet having data and a dynamic input line graph, wherein the dynamic input line graph corresponds to the data of the spreadsheet and includes a focused line dataset, a crossbar, and a cursor poised to manipulate the focused line dataset.
Figure 20B:
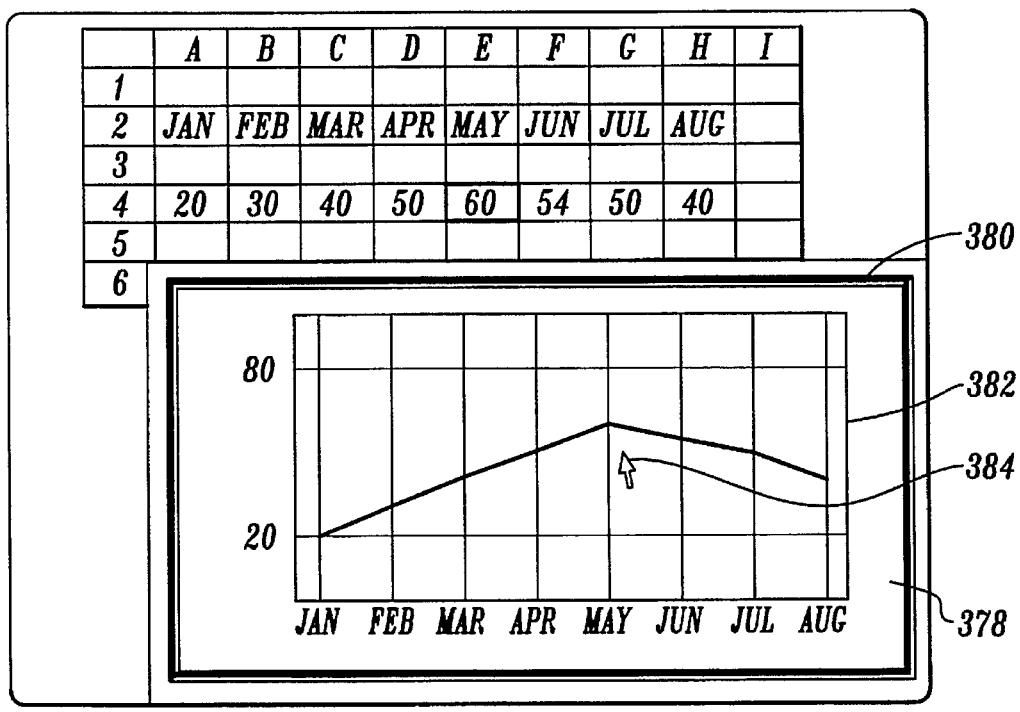
FIG. 20B is the illustration of FIG. 20A, wherein the dynamic input line graph does not have the crossbar and the cursor is not poised to manipulate the focused line dataset.

The first visual cue for the user in determining whether a particular graph or graph element can be manipulated distinguishes the new input graph from the existing output-only graph. The user is shown that the graph can be manipulated in this case by the beveled appearance of the frame. Thus the dynamic input graph can be distinguished from dynamic or traditional output graphs. FIG. 20A shows one possible distinctive appearance for a dynamic input line graph which differs from the appearance of a dynamic or tradition output line graph such as is shown in FIG. 20B.

The dynamic input line graph 370 shown in FIG. 20A has a frame 372 which appears to be beveled, and thus pushed out, or extruded, from the surrounding display surface. The area of the graph which can be modified appears to be a field 374 which is pushed in, or inset, into the frame. The dynamic input line graph 370 is also noted by the hand cursor 376. In contrast, the output line graph 378 shown in FIG. 20B, in this example, is given a frame 380 which appears to have a border etched into the display surface, and a simple border 382 separates the surface of the graph itself from its frame 380. The output line graph 378 has a standard arrow cursor 384. This distinction provides contrasting visual cues for the user to allow the user to distinguish between dynamic input graphs and other types of graphs.

Determining the Dataset Being Manipulated

For graphs which represent multiple datasets, another visual cue for the user in determining whether a particular graph or graph element can be manipulated concerns the focused dataset. Specifically, the user is shown which dataset can be manipulated at any given moment. The dataset is indicated, for example, by the position of the graphed dataset, the visual treatment of the graphed dataset, or by coloring an indicator such as a crossbar (in the line graph context) to match the dataset's graphic color.

Figures 19A, 19B:
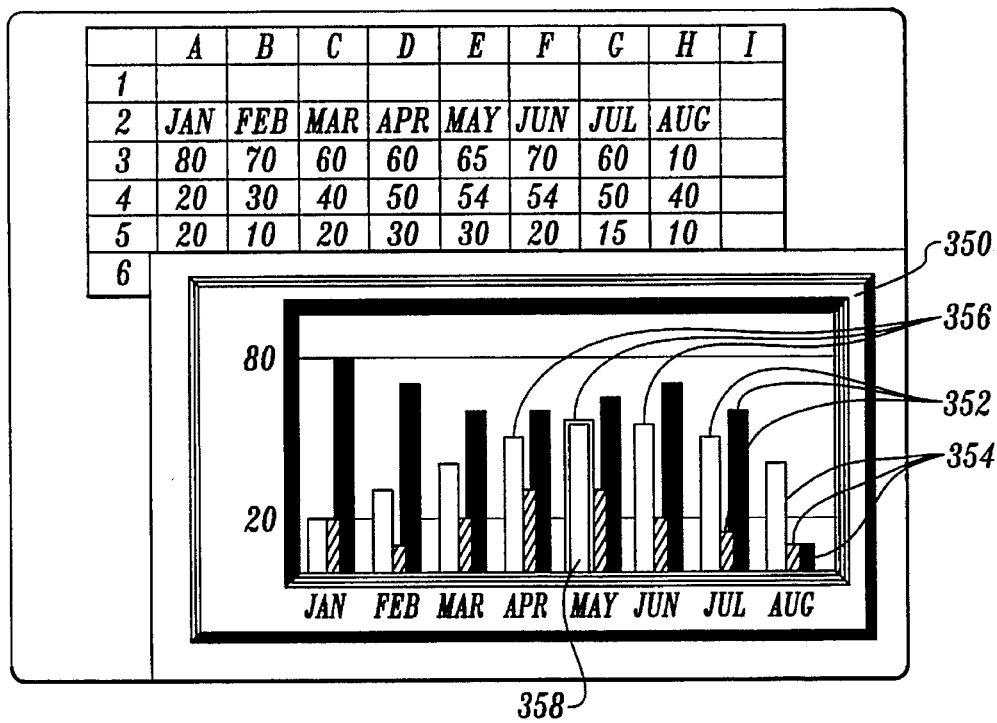
FIG. 19A is an illustration of cells of a spreadsheet having data and a dynamic input graph; wherein the dynamic input bar graph corresponds to the data of the spreadsheet and includes unfocused bar datasets, a focused bar dataset, and a focused bar element.
FIG. 19B is an illustration of cells of a spreadsheet having data and a dynamic input line graph, wherein the dynamic input line graph corresponds to the data of the spreadsheet and includes unfocused line datasets, a focused line dataset, and a crossbar.

The position of graph elements are made to overlap, such as is illustrated in the bar graph 350 of FIG. 19A, where the bar elements 352 in the cluster of each bar dataset 354 overlap. The leftmost bar element in each cluster is thereby made to appear to be the most forward, indicating the focused bar dataset 356 having a focused bar element 358, while the fightmost the furthest back. In this case, the forward bars elements belong to the focused dataset. The visual treatment of the graph datasets can also indicate which set is currently focused. For example, in the line graph 360 of FIG. 19B the focused dataset 362 is represented by a solid line, and the unfocused dataset 364 and 366 by lines that are dashed or dotted. A focus indicator can also be added to the a line graph, as in FIG. 19B, such as a crossbar 368.

Selecting the Desired Dataset

For graphs which represent multiple datasets, the focused dataset can be selected by the user. The user can make the selection from the keyboard or with the mouse. The dataset can be changed from the keyboard by using, for example, the "Page Up" or "Page Down" keys. On some systems these keys are known as "Next" and "Previous" or "Prior." The dataset can also be selected with a mouse by clicking on a dataset element on the spreadsheet, and then refocusing on the graph with, for example, the tab key. Other mechanisms include clicking on an option (radio) button having the name or some other indicator of the dataset, or clicking on a dataset's graphic element on the dynamic graph itself.

Figure 24A:
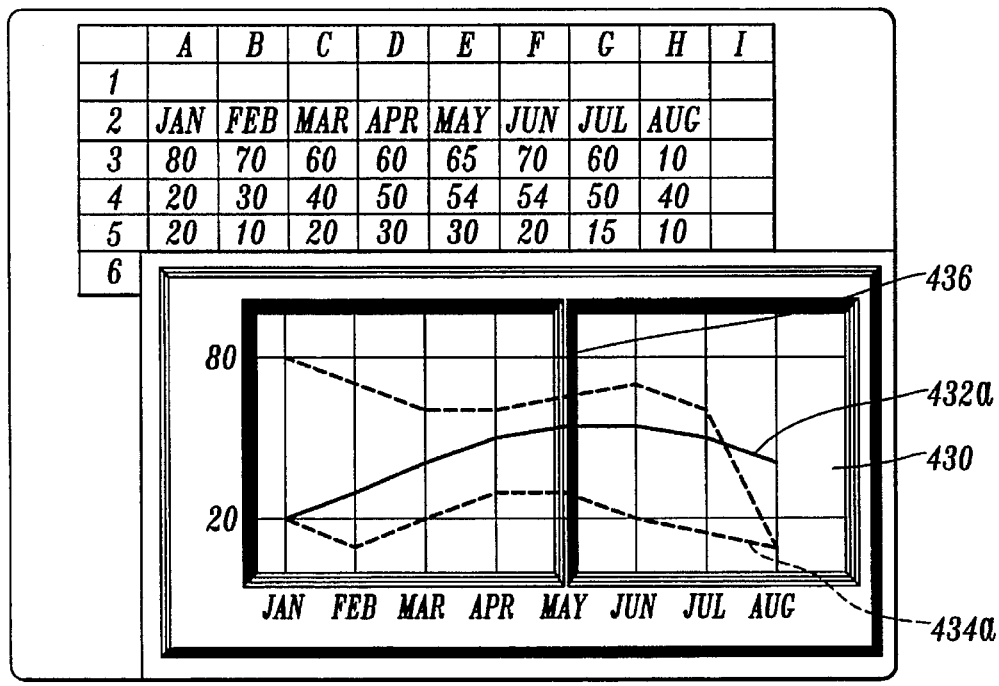
FIG. 24A is an illustration of cells of a spreadsheet having data and a dynamic input line graph, wherein the dynamic input line graph corresponds to the data of the spreadsheet and includes two unfocused line datasets, a focused line dataset, and a crossbar, wherein the middle line dataset is the focused line dataset.
Figure 24B:
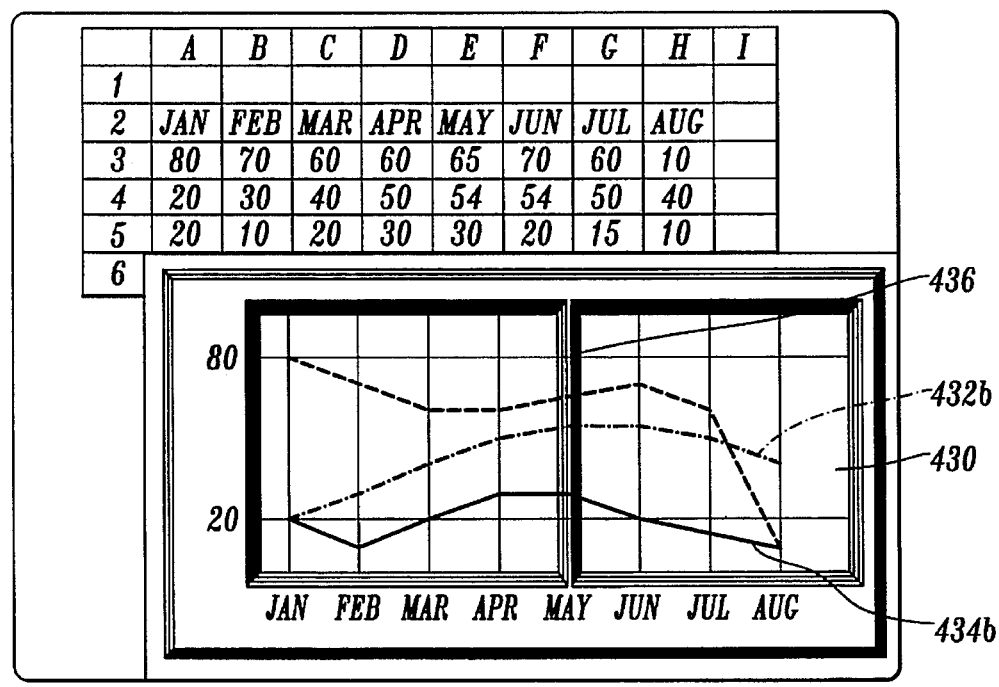
FIG. 24B is the illustration of FIG. 24A, wherein the bottom line dataset is the focused line dataset.

In the case of the keyboard, FIG. 24 shows an example of how the appearance of a dynamic line graph 430 changes when a focused dataset is changed. When the "Page Down" key is used, the solid line 432a of FIG. 24A changes to the dashed line 432b of FIG. 24B. Correspondingly, the dashed line 434a changes to the solid line 434b of FIG. 24B, showing that it now represents the new focused dataset. When the "Page Down" key is pressed again, from the situation shown in FIG. 24B, the focused dataset changes again such that the line is solid, indicating that it represents the focused dataset. In each case, in the preferred embodiment, the crossbar 436 also changes color to match the color of the newly solid line representing the new focused dataset.

Figure 25A:
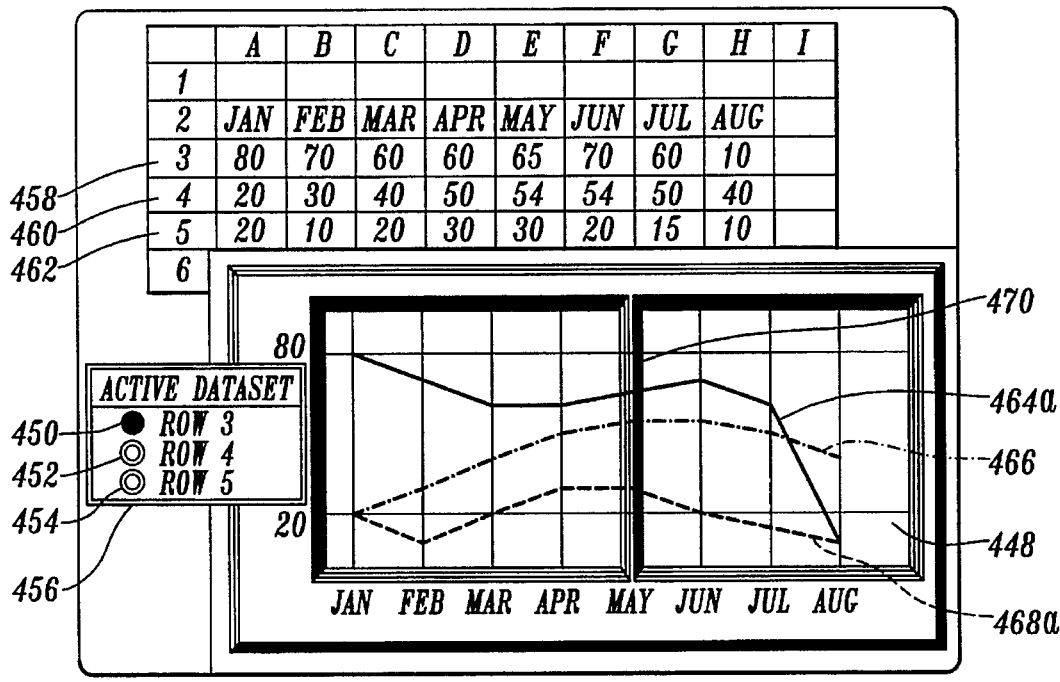
FIG. 25A is an illustration of cells of a spreadsheet having data, a dynamic input line graph, wherein the dynamic input line graph corresponds to the data of the spreadsheet and includes two unfocused line datasets, a focused line dataset, and a crossbar, and further includes a message box with buttons corresponding to each line dataset and the corresponding spreadsheet data, and wherein the top line dataset is the focused line dataset.
Figure 25B:
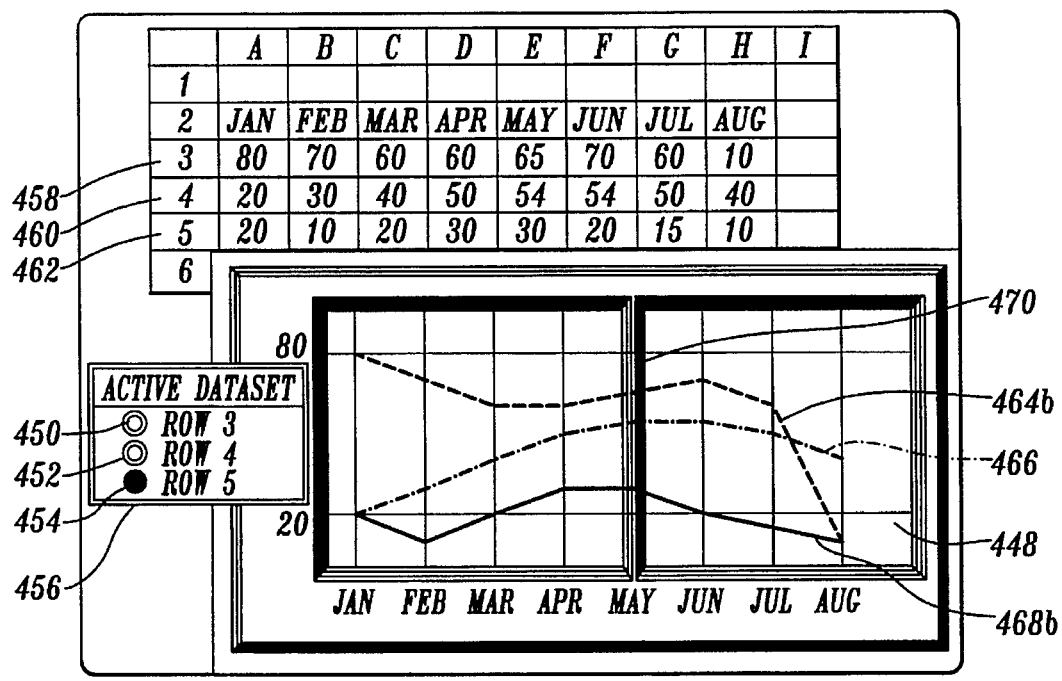
FIG. 25B is the illustration of FIG. 25A, wherein the bottom line dataset is selected as the focused line dataset by manipulation of the corresponding button of the message box.
Figure 25C:
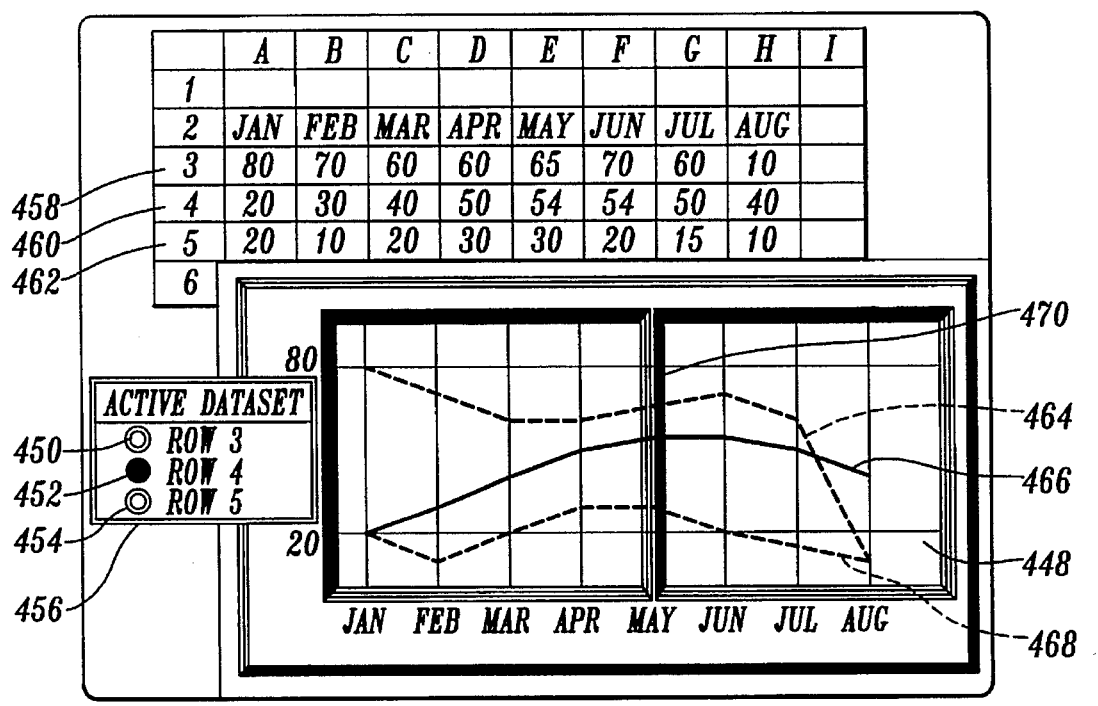
FIG. 25C is the illustration of FIG. 25A, wherein the middle line dataset is selected as the focused line dataset by manipulation of the corresponding button of the message box.
Figure 25D:
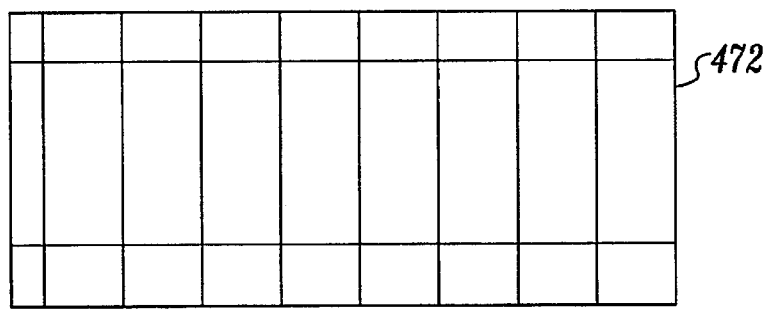
FIG. 25D is an illustration of the dynamic line graph background associated with the dynamic input line graph of FIG. 25C.
Figure 25E:
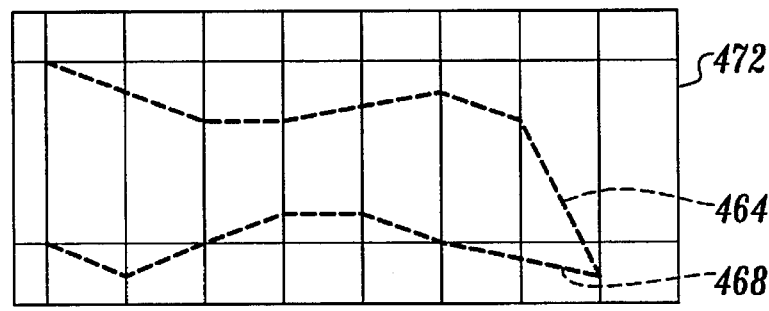
FIG. 25E is the illustration of FIG. 25D, further including the two unfocused line datasets of FIG. 25C.
Figure 25F:
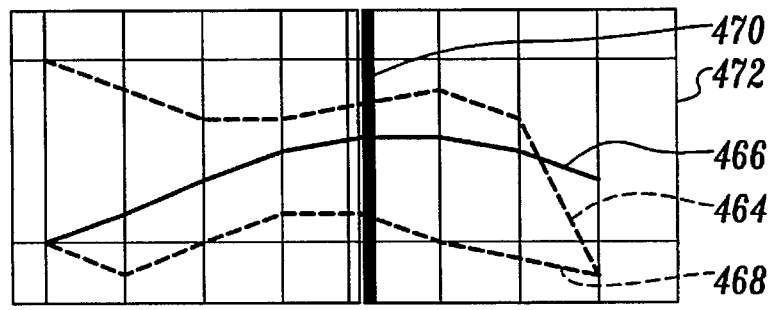
FIG. 25F is the illustration of FIG. 25E, further including the focused line dataset and crossbar from FIG. 25A.

The use of a radio button is shown in a dynamic line graph 448 shown in FIGS. 25A and 25B. In this case, the radio buttons 450, 452, and 454 of radio button box 456, represent the corresponding spreadsheet lines 458, 460, and 462 in rows 3, 4, and 5, respectively, as well as representing the corresponding graph lines 464, 466, and 466, respectively. In the preferred embodiment of the present invention, when the button 454 of FIG. 25A is clicked, several things happen: (1) focus is shifted to the radio button box 456; (2) the graph is told it has lost focus; and (3) associated system components are told which button (in this case 454) has been selected. The associated system components will typically inform the dynamic graph at that time that there is a new focused dataset. When the dynamic graph is notified it has lost focus, it removes the indication of focus (such as the crossbar 470).

When the invented component is notified that there is a new focused dataset, it responds by displaying a new focused dataset as in FIGS. 25A and 25B, with dashed line 468a of FIG. 25A becoming solid line 468b of FIG. 25B, and solid line 464a of FIG. 25A becoming dashed line 464b of FIG. 25B.

Determining the Data Element Being Manipulated

Another visual cue for the user in determining whether a particular graph or graph element can be manipulated concerns the focused data element, the data element which is set for change. It is useful for the computer user to know which graphed data element can be manipulated. The focused data element is indicated, for example, by beveling it, adding a crossbar, or displaying a small indicator such as a white square, as previously discussed above.

Figure 26A:
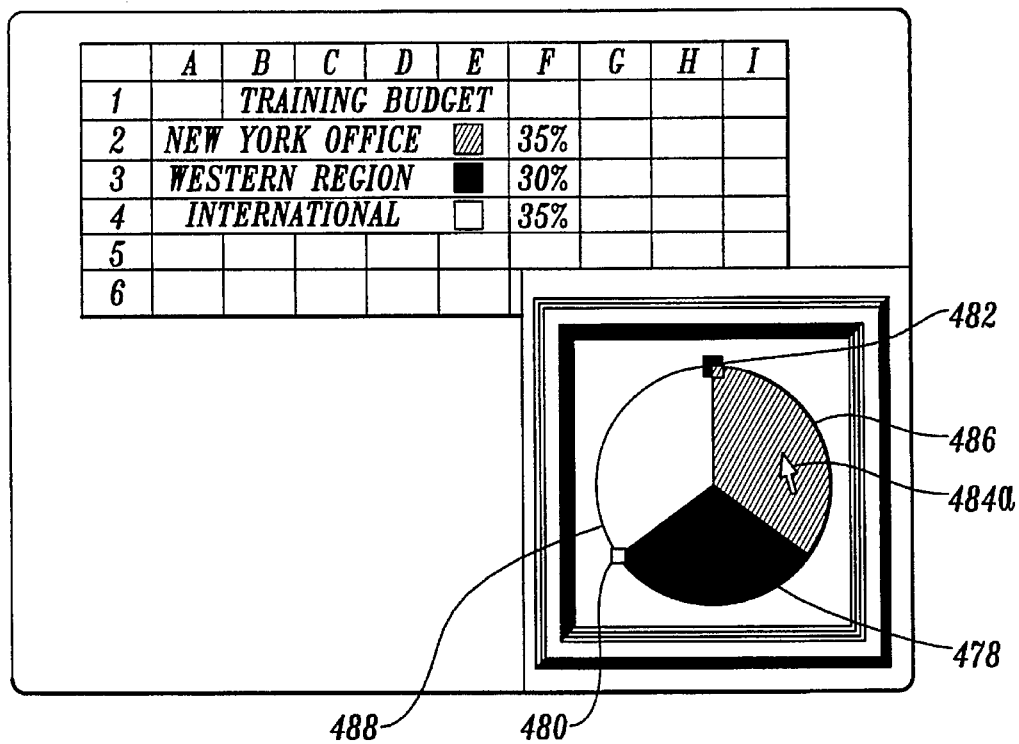
FIG. 26A is an illustration of cells of a spreadsheet having data and a dynamic input pie graph, wherein the dynamic input pie graph corresponds to the data of the spreadsheet and includes three pie wedges, two pie focus indicator symbols, wherein the focus indicator is on the leftmost pie wedge and one focus indicator is manipulable, and a cursor.
Figure 26B:
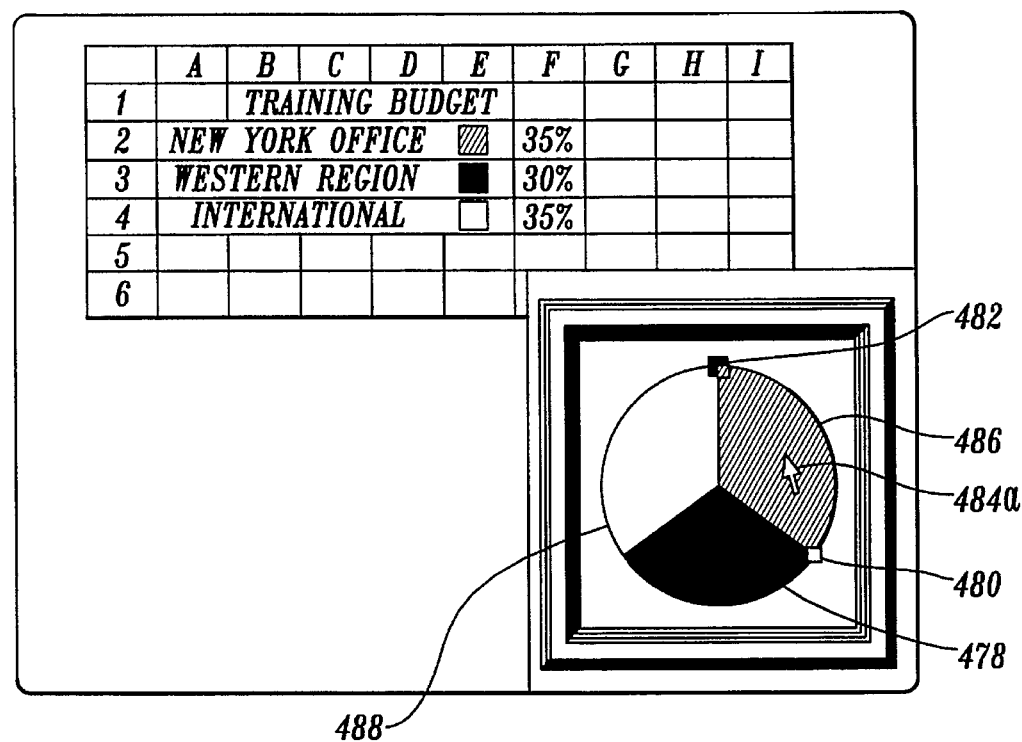
FIG. 26B is the illustration of FIG. 26A, wherein the focus indicator is on the rightmost pie wedge.
Figure 26C:
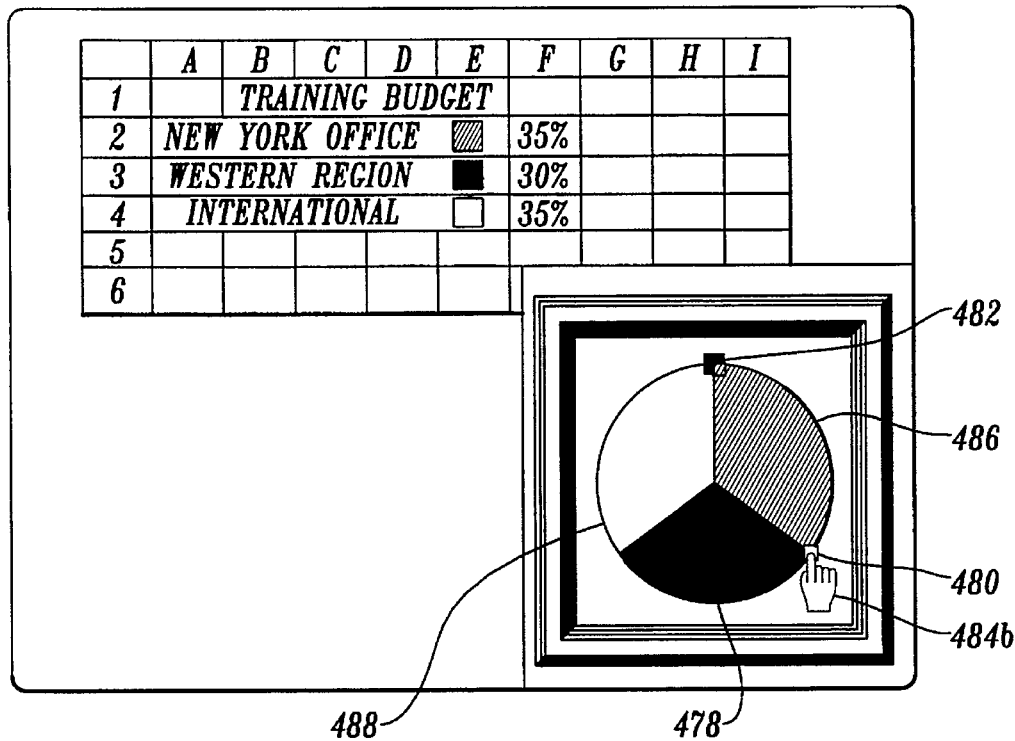
FIG. 26C is the illustration of FIG. 26A, wherein the cursor is poised to manipulate the rightmost pie wedge above the manipulable focus indicator symbol.
Figure 26D:
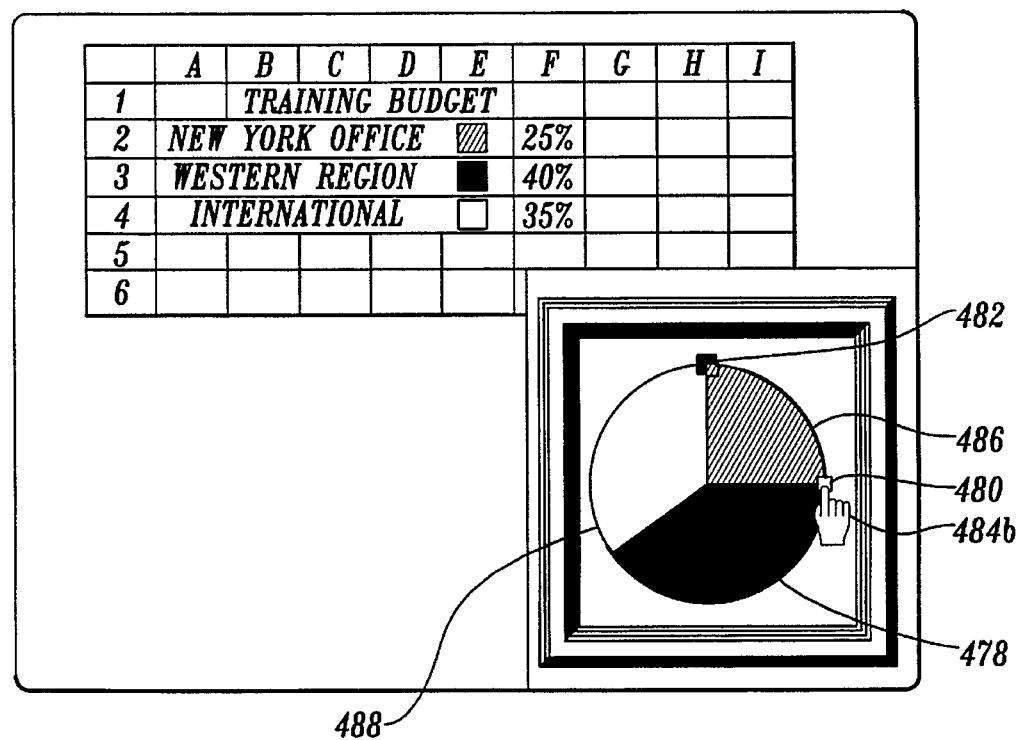
FIG. 26D is the illustration of FIG. 26A, wherein the pie wedge has been manipulated by the movement of the cursor, thereby altering the underlying graph data and the presentation of that graph data in the cells of the spreadsheet.
Figure 26E:
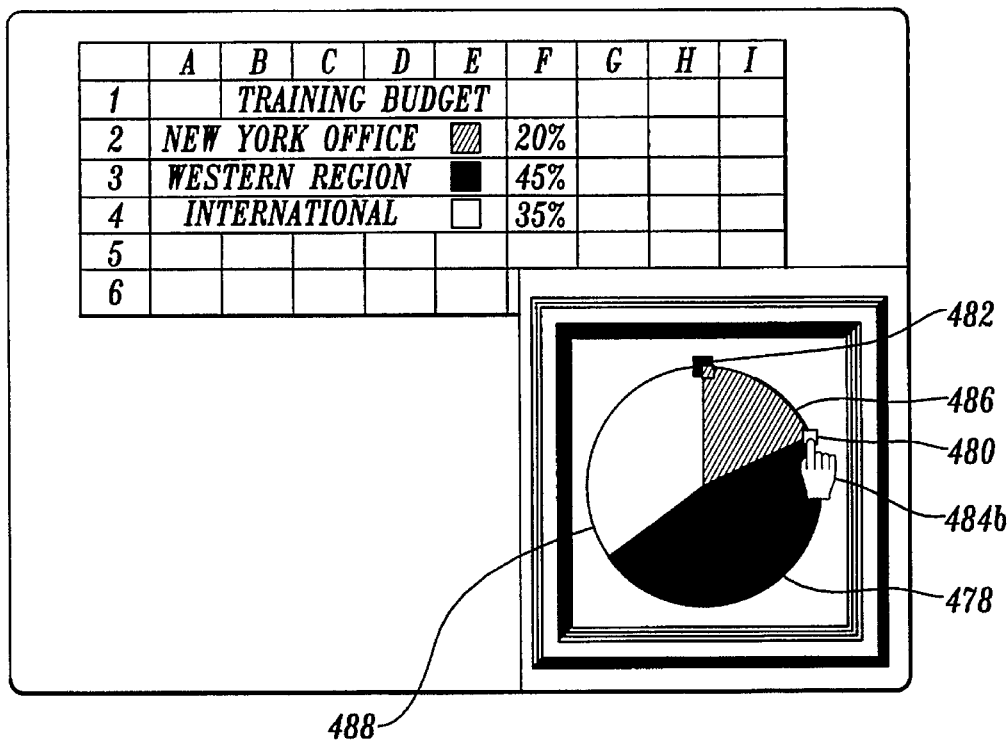
FIG. 26E is the illustration of FIG. 26A, wherein the pie wedge has been further manipulated so as to alter the underlying graph data and the presentation of that graph data in the cells of the spreadsheet.
Figure 26F:
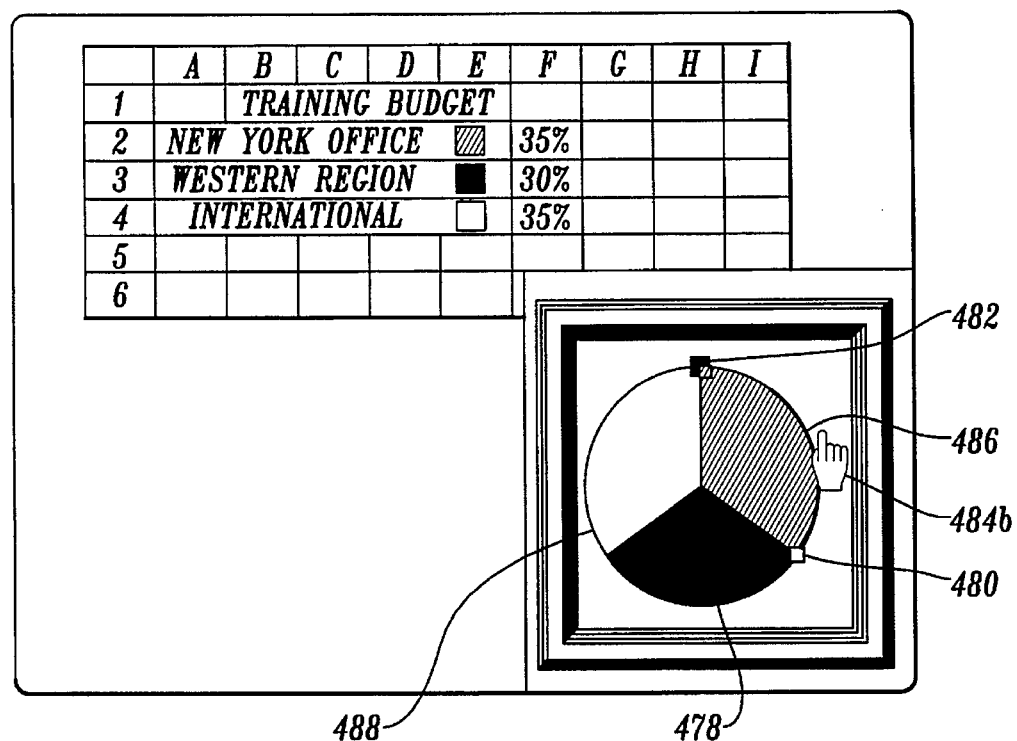
FIG. 26F is the illustration of FIG. 26A, wherein the cursor was moved beyond the manipulation area associated with the dynamic input pie graph, causing the dynamic pie graph and the corresponding underlying graph data to revert to its pre-manipulation status.

Referring to FIGS. 19A, 19B, and 26A, examples of focus indicators are presented. An example of beveling is shown in FIG. 19A, where one bar element 358 has been given a beveled appearance, indicating that it is the focused bar element. In FIG. 19B, the crossbar 368 indicates the focused line data point. In FIG. 26A, the focus indicator, a white square 480, shows where changes will take place dealing with the focused pie wedge.

Selecting the Data Element Desired

The focused data element can also be selected or switched by the user. As with the focused dataset, the selection or switch of the focused data element can be made from the keyboard or with the mouse. FIG. 21 shows a dynamic line graph of the present invention displaying a dynamic line graph 390 representing graph data presented in a "Past quarters/Future quarters" spreadsheet application 392, wherein the Past Quarter's figures are a matter of historical fact, and therefore are unchangeable and "protected." The Future Quarter's figures are, by contrast, used for planning, and can be changed by user manipulation.

A new focused data element can be selected from keyboard, such as with fight or left-pointing "arrow keys." The "arrow key" indicates direction of the desired new focused data element with respect to the current focused data element. FIGURES 21A and 21B show the results of using the "left arrow" cursor control key. In FIG. 21A, the dynamic line graph 390 has a focused data element 394a at the 2Q Future Year point on the graph, indicated by crossbar 396. When the "left arrow" key is depressed, the crossbar 396 is moved. The new situation is shown in FIG. 21B, with the new focused data element indicated by the crossbar 396's new position 394b at 1Q Future Year.

The data element can also be selected with a mouse, by clicking on the data element. FIG. 21C shows a situation where the focused line data point 394b is at 2Q Future Year, and the cursor 398 is poised to click on the 3Q Future Year line data point 394c. FIG. 21D shows the situation following the manipulation, with the focused data element 394c changed to the 3Q Future Year position by the click of the mouse.

Since graphic elements may be present which represent protected, or unchangeable, numbers in the spreadsheet, it is desirable to differentiate these protected graphic elements for the user. As noted above, the protected data points, which should not be changed, cannot be selected as focused data elements by the user. This protection can be brought to the user's attention explicitly, such as presenting a message notifying the user that the data element is protected and cannot be manipulated, for instance when the user attempts to move the crossbar 396 to a protected field. FIG. 21E shows an alert message 402 that the invented component can display to the user in the case that the user tries to use a "left arrow" cursor control key to move the focused data element from 1Q Future Year to a protected line data point 404 position at 4Q 4Q Past Year.

The protection can also be brought to the user's attention implicitly, such as modifying the cursor 398 by changing the cursor's shape when sweeping over an element which can be manipulated. An example of an explicit message to the user indicating the protected nature of the data is presented above. With reference to FIG. 21F, an example of an implicit way of notifying the user is by changing the shape of the cursor from the standard "arrow" shape 406 to the "hand with the index finger extended" shape 398 whenever the user sweeps it over a data element which is changeable. In the current example, the cursor will remain as an arrow 406 in the neighborhood of the Past Quarters points on the line graph. The cursor will change to a "hand with index finger extended" 398 in areas above the changeable Future Quarter's graph line data points. Although only one cursor at a time is actually displayed, eight cursors 406 and 398 are shown on FIG. 21F to illustrate which cursor the user sees at the various line data point locations. The "hand" cursor 398 implicitly informs the user that the dynamic graph can be modified at those line data points, whereas the normal, and unchanged, "arrow" cursor 406 notifies the user that the protected line data points cannot be manipulated.

Implementation Summary

The present invention is not intended to be restricted to any particular form or arrangement, or any specific embodiment disclosed herein, or any specific use, since the same may be modified in various particulars or relations without departing from the spirit or scope of the claimed invention herein above shown and described of which the method and apparatus is intended only for illustration and for disclosure of an operative embodiment and not to show all the various forms of modification in which the invention might be embodied or operated. For example, creation and alteration of dynamic graphs is not limited to those types of graphs presented above, but may also include graphs such as area graphs, stacked bar graphs, and polar coordinates graphs, as well as graphs using more complex scales, including log, exponential, and other non-linear scales; multiple scales on a single graph, with different datasets having different scales, as well as some indication of which scale is the one in use for the focused dataset; changeable scales and/or limits on the graph; and dragable scale lines in the background of a graph.

It is further contemplated that many changes and modifications may be made to the appearance or functionality of the dynamic graphs of the present invention without departing from the spirit and scope of the invention as disclosed above. For example, such changes may include providing a graphically different appearance for protected data representation elements, either in the background, or on the foreground data representation elements; bitmap images (such as symbols for currencies or national flags) may be used in graph background, on graph bars, on pie wedges, or on data areas on the area graph; the drag and drop configuration of the graph and its elements may be added according to programmer preference; ability for user to control properties of various elements of graph such as line thickness, colors, spacing, fonts used in titles and their font characteristics such as size, weight, etc. could be permitted; sound characteristics could be added to further notify the user when limits or levels are reached or crossed such as 100%, zero %, a preset minimum or maximum, or warning message, that are user selectable; and data representation elements may be designed to change colors such as from green to yellow or red to indicate a warning or to otherwise notify the user of a noteworthy condition in the program.

It will be readily apparent that the present invention has equal application to any video display and computer system capable of using dynamic graphs, and is not limited in its implementation to use in conjunction with spreadsheet applications. For example, the present invention could be used with a special purpose apparatus or system which includes a graphic panel displaying and controlling such conditions as lighting color balance or intensity levels; temperature of an enclosure, process, or apparatus; humidity or gas mixture in a room, process, or apparatus; characteristics of sound output such as volume, reverberation, or tone; and the flow rates of fluids, gases, or discrete components such as on production lines or roadways. The variables controlled by such special purpose apparatus or system can be controlled as a function of time, or as a function of some other independent variable. For example, the rate at which cars are allowed onto a freeway can be controlled as a function of time of day, but also as a function of the traffic already on the freeway. Similarly, rates of cooling water flow can be controlled as a function of the temperature of the object to be cooled. A key aspect of the present invention is its ability to create and use dynamic graphs, and to alter underlying data by intuitive manipulation of graphs representing the underlying data.

The embodiments of the invention in which an exclusive property or privilege is claimed are defined as follows:

1. A method for altering data for use with a computer system having a processing unit, system memory, a user manipulation device, and a video display, by manipulation of a dynamic graphical representation of the data, comprising:

(a) creating a dynamic graphical representation using data representation elements, wherein the data elements include graphical elements having at least one data representation element which may be focused or unfocused;

(b) determining focus information based on input received from the user manipulation device;

(c) if the focus information indicates an unfocused data representation element, reconfiguring the dynamic graphical representation to shift focus to the data representation element indicated by the focus information;

(d) determining alteration information concerning the focused data representation element based on input received from the user manipulation device;

(e) modifying the focused data representation element according to the alteration information; and (f) altering the data stored in system memory corresponding to the focused data representation element according to the alteration information.

2. The method of claim 1, wherein:

(a) the data representation element may be protected or unprotected;

(b) the step of creating a dynamic graphical representation includes determining data representation element protection information based on initialization data;

(c) the step of determining focus information includes determining if the input received from the user manipulation device indicates a protected data representation element using data representation element protection information; and (d) the step of reconfiguring the dynamic graphical representation includes if the focus information indicates a protected data representation element, maintaining the current status of the dynamic graphical representation.

3. The method of claim 2, wherein:

(a) the computer system further includes associated system components affected by manipulation of the dynamic graphical representation; and (b) the step of determining focus information includes notifying the associated system components that the input received from the user manipulation device indicates a protected data representation element.

4. The method of claim 1, wherein the step of creating the dynamic graphical representation comprises:

(a) determining initialization data;

(b) creating data representation elements using initialization data;

(c) saving the created data elements in system memory; and (d) displaying the dynamic graphical representation using the created data elements on the video display.

5. The method of claim 4, wherein:

(a) the step of reconfiguring the dynamic graphical representation according to the focus information includes using the data elements from system memory; and (b) the step of modifying the focused data representation element includes using the data elements from system memory.

6. The method of claim 1, wherein:

(a) the step of reconfiguring the dynamic graphical representation according to the focus information comprises:
  (i) determining new data elements based on initialization data;
  (ii) saving the new data elements in system memory; and (b) the step of modifying the focused data representation element includes using the new data elements from system memory.

7. The method of claim 1, wherein:

(a) the computer system further includes associated system components affected by manipulation of the dynamic graphical representation;

(b) the dynamic graphical representation includes focus characteristics describing the focused and unfocused data representation elements within the dynamic graphical representation;

(c) focus information includes information indicating a change in the focus characteristics of the dynamic graphical representation; and (d) the step of reconfiguring the dynamic graphical representation includes if the focus information indicates a change in the focus characteristics of the dynamic graphical representation:
  (i) saving the focus characteristics of the dynamic graphical representation in system memory;
  (ii) if an associated system component alters the dynamic graphical representation, modifying the saved focus characteristics of the dynamic graphical representation; and
  (iii) displaying the dynamic graphical representation according to the focus characteristics on the video display.

8. The method of claim 1, wherein:

(a) the user manipulation device includes a pointer and a button capable of manipulation used to indicate position within the dynamic graphical representation;

(b) the step of determining focus information comprises:
  (i) monitoring the position of the pointer;
  (ii) monitoring the button of the user manipulation device; and
  (iii) if the button is manipulated, determining the position of the pointer within the dynamic graphical representation.

9. The method of claim 1, wherein:

(a) the dynamic graphical representation includes a bar graph;

(b) the data representation element includes a bar element having a minimum and maximum point; and (c) the step of creating the bar graph comprises:
  (i) determining initialization data including bar graph parameters and bar data;
  (ii) determining a minimum bar value using initialization data and a scaling factor required to display the minimum point of the bar element within the parameters of the bar graph;
  (iii) determining a maximum bar value using initialization data and a scaling factor required to display the maximum point of the bar element within the parameters of the bar graph;
  (iv) creating bar display characteristics of the bar element using the minimum bar value, the maximum bar value, and the bar data; and
  (v) displaying the bar graph and corresponding bar elements using the bar display characteristics on the video display.

10. The method of claim 9, wherein:

(a) the user manipulation device includes a pointer indicating through its position the bar data of the corresponding focused bar element within the parameters of the bar graph;

(b) the step of determining the alteration information concerning the focused bar element comprises:
  (i) monitoring the position of the pointer within the parameters of the bar graph;
  (ii) determining new bar data based on the position of the pointer;
  (iii) creating new bar display characteristics of the bar element using the minimum bar value, the maximum bar value, and the new bar data; and (c) the step of modifying the focused bar element according to the alteration information includes altering the bar graph and corresponding bar elements according to the bar display characteristics.

11. The method of claim 1, wherein:
(a) the dynamic graphical representation includes a line graph;
(b) the data representation element includes a line dataset having a minimum and maximum line data point; and
(c) the step of creating the line graph comprises:
  (i) determining initialization data including line graph parameters and line data;
  (ii) determining a minimum line value using initialization data and a scaling factor required to display the minimum point of the line dataset within the parameters of the line graph;
  (iii) determining a maximum line value using initialization data and a scaling factor required to display the maximum point of the line dataset within the parameters of the line graph;
  (iv) creating line display characteristics of the line dataset using the minimum line value, the maximum line value, and the line data; and
  (v) displaying the line graph and corresponding line dataset using the line display characteristics on the video display.

12. The method of claim 11, wherein:
(a) the user manipulation device includes a pointer indicating through its position the line data of the corresponding focused line dataset within the parameters of the line graph;
(b) the step of determining the alteration information concerning the focused line data point comprises:
  (i) monitoring the position of the pointer within the parameters of the line graph;
  (ii) determining new line data based on the position of the pointer;
  (iii) creating new line display characteristics of the line element using the minimum line value, the maximum line value, and the new line data; and
(c) the step of modifying the focused line data point according to the alteration information includes altering the line graph and corresponding line dataset according to the line display characteristics.

13. The method of claim 11, wherein:
(a) the dynamic graphical representation includes a line graph;
(b) the data representation element includes a line dataset including at least two line data points, a focused line data point that may be manipulated and an unfocused line data point, and a line section spanning the distance between the two line data points;
(c) the user manipulation device includes a pointer indicating position within the parameters of the line graph;
(d) the step of determining the alteration information concerning the focused line data point comprises:
  (i) monitoring the position of the pointer within the parameters of the line graph;
  (ii) determining new line data based on the position of the pointer;
  (iii) creating a new line section using the minimum line value, the maximum line value, and the new line data; and
(e) the step of modifying the line graph according to the alteration information comprises:
  (i) removing the line section between the two line data representation points; and
  (ii) displaying the new line section on the video display.

14. The method of claim 1, wherein:
(a) the dynamic graphical representation includes a line graph;
(b) the data representation element includes a line dataset including at least two line data points, a focused line data point and an unfocused line data point;
(c) the focused line dataset includes a focus indicator corresponding to the focused line data point; and
(d) the step of reconfiguring the line graph according to the focused information comprises:
  (i) removing the focus indicator from the focused line data point; and
  (ii) adding the focus indicator to the unfocused line data point.

15. The method of claim 1, wherein:
(a) the dynamic graphical representation includes a pie graph;
(b) the data representation element includes at least one pie element having at least one user manipulable edge; and
(c) the step of creating the pie graph comprises:
  (i) determining initialization data including pie graph parameters and pie data;
  (ii) determining the pie element value for each pie element using initialization data and a scaling factor required to display the pie element within the parameters of the pie graph;
  (iii) creating pie display characteristics of the pie element using the pie element value and the pie data; and
  (iv) displaying the pie graph and corresponding pie element using the pie display characteristics on the video display.

16. The method of claim 15, wherein:
(a) the pie graph further includes a focued pie element having a corresponding focus indicator;
(b) the user manipulation device includes a pointer indicating the position of the edge of the pie element within the parameters of the pie graph;
(c) the size of the pie element within the parameters of the pie graph represents the value of the corresponding pie data;
(d) the step of determining the alteration information concerning the focused pie element comprises:
  (i) monitoring the position of the pointer within the parameters of the pie graph;
  (ii) determining new pie data based on changes in the size of the pie element corresponding to the position of the pointer;
  (iii) creating new pie display characteristics of the pie element using the pie element value and the new pie data; and
(e) the step of modifying the focused pie element according to the alteration information comprises altering the pie graph and corresponding pie elements according to the pie display characteristics.

17. The method of claim 16, wherein:
(a) the pie graph includes at least two pie elements, a focused pie element and at least one unfocused pie element;
(b) the step of determining new pie data based on the position of the pointer includes determining the alteration in size of the focused pie wedge;

(c) the step of altering the pie graph and corresponding pie elements according to the pie display characteristics comprises:
  (i) if the pie display characteristics indicate an increase in the size of the focused pie element, increasing the size of the focused pie element; and
  (ii) if the pie display characteristics indicate a decrease in size of the focused pie element, reducing the size of the focused pie element by increasing the size of the unfocused pie wedge.

18. The method of claim 15, wherein:
(a) the pie graph includes at least two pie elements; and
(b) the step of altering the data stored in system memory includes altering the pie data corresponding to at least two pie elements.

19. The method of claim 18, wherein the step of altering the data stored in system memory comprises altering the pie data such that change to the pie data corresponding to one pie element offsets exactly the change to the pie data corresponding to a different pie element.

20. The method of claim 18, wherein the step of altering the data stored in system memory comprises altering the pie data such that the net change in pie data corresponding to the at least two pie elements is zero.

21. The method of claim 1, wherein:
(a) the dynamic graphical representation includes a pie graph;
(b) the data representation element includes at least two pie elements, a focused pie element having a corresponding focus indicator, and an unfocused pie element;
(c) the step of reconfiguring the pie graph according to the focus information comprises:
  (i) removing the focus indicator from the focused pie element; and
  (ii) adding the focus indicator to the unfocused pie element.

22. The method of claim 21, wherein:
(a) the step of creating the pie graph further includes saving the pie elements of the pie graph without the corresponding focus indicators in system memory; and
(b) the step of removing the focus indicator from the focused pie element includes using the saved pie elements of the pie graph.

23. The method of claim 1, wherein:
(a) the user manipulation device comprises:
  (i) a pointer indicating a position within the dynamic graphical representation; and
  (ii) a pointer indicator displayed on the video display, corresponding to the position of the pointer, having at least one active image and at least one inactive image;
(b) the dynamic graphical representation has at least one active region corresponding to a data representation element capable of manipulation; and
(c) manipulation of the pointer comprises:
  (i) monitoring the active region for pointer activity;
  (ii) if there is no pointer activity within the active region, displaying the inactive image of the pointer indicator on the video display; and
  (iii) if there is pointer activity within the active region, displaying the active image of the pointer indicator on the video display.

24. The method of claim 1, wherein:
(a) the step of creating a dynamic graphical representation includes determining initialization data including dynamic graphical representation parameters;

(b) the step of modifying the focused data representation element according to the alteration information comprises:
  (i) determining whether the alteration information will cause the focused data representation element to exceed the dynamic graphical representation parameters;
  (ii) if the dynamic graphical representation parameters will be exceeded, creating data representation element display characteristics according to a scaling factor required to display the focused data representation element within the parameters of the dynamic graphical representation.

25. The method of claim 1, wherein the step of creating the dynamic graphical representation comprises:
(a) determining initialization data including dynamic graphical representation parameters and data representation element data describing the actual underlying data corresponding to the data representation element;
(b) determining the data representation element value for each data representation element using initialization data, wherein the data representation element value describes the scaling factor required to display the data representation element within the parameters of the dynamic graphical representation;
(c) creating data representation element display characteristics of the data representation element using the data representation element value and the data representation element data;
(d) saving the data representation element display characteristics in system memory; and
(e) displaying the dynamic graphical representation and corresponding data representation element using the data representation element display characteristics on the video display.

26. The method of claim 25, wherein:
(a) the user manipulation device includes a pointer indicating through its position the data representation element data of the corresponding focused data representation element within the dynamic graphical representation;
(b) the step of determining the alteration information concerning the focused data representation element comprises:
  (i) monitoring the position of the pointer within the parameters of the dynamic graphical representation; and
  (ii) calculating alteration information based on the position of the pointer.

27. The method of claim 26, wherein:
(a) the computer system further includes associated system components affected by manipulation of the dynamic graphical representation; and
(b) the step of monitoring the position of the pointer includes notifying the associated system components of the start of manipulation of the dynamic graphical representation.

28. The method of claim 26, wherein:
(a) the computer system further includes associated system components affected by manipulation of the dynamic graphical representation; and
(b) the step of monitoring the position of the pointer includes notifying the associated system components of the end of manipulation of the dynamic graphical representation.

29. The method of claim 26, wherein:
(a) the data representation element includes a manipulation region defining the boundaries within which manipulation of the focused data representation element to alter data can occur;
(b) the step of calculating alteration information includes saving the focused data representation element display characteristics prior to manipulation of the focused data representation element in system memory; and
(c) the step of modifying the focused data representation element includes if the position of the pointer exceeds the manipulation region, restoring the focused data representation element using the saved focused data representation element display characteristics.

30. The method of claim 29, wherein if the position of the pointer is within the manipulation region, the step of determining the alteration information concerning the focused data representation element comprises:
(a) monitoring the position of the pointer within the parameters of the dynamic graphical representation; and
(b) calculating alteration information based on the position of the pointer.

31. The method of claim 29, wherein:
(a) the computer system further includes associated system components affected by manipulation of the dynamic graphical representation; and
(b) the step of restoring the focused data representation element includes notifying the associated system components of the restoration of the pre-manipulation focused data representation element display characteristics.

32. The method of claim 25, wherein:
(a) the user manipulation device includes a button capable of manipulation used to indicate the position of a data representation element display characteristic of the focused data representation element within the parameters of the dynamic graphical representation;
(b) the position of the focused data representation element within the parameters of the dynamic graphical representation represents the value of the corresponding data representation element data;
(c) the step of creating the dynamic graphical representation further includes determining an increment value using initialization data, wherein the incremental value defines the incremental movement of the position of the data representation element display characteristic of the focused data representation element within the parameters of the dynamic graphical representation corresponding to manipulation of the button; and
(d) the step of determining the alteration information concerning the focused data representation element comprises:
(i) monitoring the button; and
(ii) if the button is manipulated, calculating alteration information using the increment value based on the position of the data representation element display characteristic of the focused data representation element within the parameters of the dynamic graphical representation.

33. A computer-readable memory that can be used to direct a computer system to function in the manner defined in claim 1 when used by the computer system.

34. A method for creating a dynamic graphical representation of data having a background and at least one data representation element for use with a computer system having a processing unit, system memory having a first and a second system memory location, and a video display, comprising:
(a) determining initialization data including dynamic graphical representation parameters and data representation element data describing the actual underlying data corresponding to the data representation element;
(b) creating the background of the dynamic graphical representation without the data representation element using the dynamic graphical representation parameters;
(c) saving the background in a first system memory location;
(d) copying the background from the first system memory location to a second system memory location;
(e) creating the data representation element on the background at the second system memory location; and
(f) displaying the dynamic graphical representation at the second system memory location having the background and the data representation element on the video display.

35. The method of claim 34, wherein:
(a) the dynamic graphical representation of data further includes dynamic graphical representation type identifier; and
(b) the step of creating the data representation element further includes creating on the background at the second system memory location the dynamic graphical representation type identifier.

36. The method of claim 34, wherein the step of creating the data representation element on the background at the second system memory location comprises:
(a) determining the data representation element value for each data representation element using initialization data, wherein the data representation element value describes the scaling factor required to display the data representation element within the parameters of the dynamic graphical representation;
(b) creating data representation element display characteristics of the data representation element using the data representation element value and the data representation element data; and
(c) saving the data representation element display characteristics in system memory; and
(d) creating the data representation element using the data representation element display characteristics on the background.

37. A method for altering data of a dynamic graphical representation of data having a background and at least one data representation element for use with a computer system having a processing unit, system memory having a first and a second system memory location, associated system components involved in monitoring and providing information about the dynamic graphical representation, and a video display, comprising:
(a) creating a dynamic graphical representation by:
(i) determining initialization data including dynamic graphical representation parameters and data representation element data describing the actual underlying data corresponding to the data representation element;
(ii) creating the background of the dynamic graphical representation without the data representation element using the dynamic graphical representation parameters;

(iii) saving the background in a first system memory location;

(iv) copying the background from the first system memory location to a second system memory location;

(v) creating the data representation element on the background at the second system memory location; and (vi) displaying the dynamic graphical representation at the second system memory location having the background and the data representation element on the video display; and (b) modifying the dynamic graphical representation by:

(i) copying the background from the first system memory location to the second system memory location;

(ii) creating a new data representation element according to information received from the associated system components on the background at the second system memory location; and (iii) displaying the dynamic graphical representation at the second system memory location having the background and the new data representation element on the video display.

38. A method for creating a dynamic graphical representation of data having at least one data representation element for use with a computer system having a processing unit, system memory, a user manipulation device, and a video display, comprising:

(a) determining initialization data including dynamic graphical representation parameters, data representation element data describing the actual underlying data corresponding to the data representation element, and manipulation information indicating the manipulability of the dynamic graphical representation by the user manipulation device; and (b) if the manipulation information indicates that the dynamic graphical representation cannot be manipulated by the user manipulation device, creating an output dynamic graphical representation.

39. The method of claim 38, wherein:

(a) the dynamic graphical representation of data further includes a background and a dynamic graphical representation type identifier;

(b) memory includes a first and a second system memory location; and (c) the step of creating an output dynamic graphical representation comprises:

(i) creating the background of the dynamic graphical representation without the data representation element using the dynamic graphical representation parameters;

(ii) saving the background in a first system memory location;

(iii) copying the background from the first system memory location to a second system memory location;

(iv) creating the data representation element on the background at the second system memory location;

(v) creating the dynamic graphical representation type identifier on the background at the second system memory location; and (vi) displaying the dynamic graphical representation at the second system memory location having the background, the data representation element, and the dynamic graphical representation type identifier on the video display.

40. Apparatus for use with a computer system having a processing unit, system memory, a user manipulation device, and a video display, for altering data by manipulation of a dynamic graphical representation of the data, comprising:

(a) a video display for displaying a dynamic graphical representation of data;

(b) a system memory for storing program instruction, data, and video display information;

(c) a user manipulation device for manipulating the dynamic graphical representation; and (d) a processing unit, coupled to said video display, system memory, and user manipulation device, for altering data according to the manipulation of the dynamic graphical representation displayed on the video display according to the user manipulation device by:

(i) creating a dynamic graphical representation using data elements, wherein the data elements include graphical elements having at least one data representation element which may be focused or unfocused;

(ii) determining focus information based on input received from the user manipulation device;

(iii) if the focus information indicates an unfocused data representation element, reconfiguring the dynamic graphical representation to shift focus to the data representation element indicated by the focus information;

(iv) determining alteration information concerning the focused data representation element based on input received from the user manipulation device;

(v) modifying the focused data representation element according to the alteration information; and (vi) altering the data stored in system memory corresponding to the focused data representation element according to the alteration information.

41. Apparatus for use with a computer system having a processing unit, system memory having a first and a second system memory location, and a video display, for creating a dynamic graphical representation of data, comprising:

(a) a video display for displaying a dynamic graphical representation of data;

(b) a system memory having a first and a second system memory location for storing program instruction, data, and video display information; and (c) a processing unit, coupled to said video display, and system memory, for creating the dynamic graphical representation of data for display on the video display by:

(i) determining initialization data including dynamic graphical representation parameters and data representation element data describing the actual underlying data corresponding to the data representation element;

(ii) creating the background of the dynamic graphical representation without the data representation element using the dynamic graphical representation parameters;

(iii) saving the background in a first system memory location;

(iv) copying the background from the first system memory location to a second system memory location;

(v) creating the data representation element on the background at the second system memory location; and (vi) displaying the dynamic graphical representation at the second system memory location having the background and the data representation element on the video display.

42. The apparatus of claim 41, wherein:

(a) the dynamic graphical representation of data further includes dynamic graphical representation type identifier; and (b) the processing unit creates the data representation element by creating on the background at the second system memory location the dynamic graphical representation type identifier.

43. The apparatus of claim 41, wherein the processing unit creates the data representation element on the background at the second system memory location by:

(a) determining the data representation element value for each data representation element using initialization data, wherein the data representation element value describes the scaling factor required to display the data representation element within the parameters of the dynamic graphical representation;

(b) creating data representation element display characteristics of the data representation element using the data representation element value and the data representation element data; and (c) saving the data representation element display characteristics in system memory; and (d) creating the data representation element using the data representation element display characteristics on the background.

44. Apparatus for use with a computer system having a processing unit, system memory having a first and a second system memory location, associated system components involved in monitoring and providing information about the dynamic graphical representation, and a video display, for altering data of a dynamic graphical representation of data having a background and at least one data representation element, comprising:

(a) a video display for displaying a dynamic graphical representation of data;

(b) a system memory having a first and a second system memory location for storing program instruction, data, and video display information;

(c) associated system components for monitoring and providing information about the dynamic graphical representation; and (d) a processing unit, coupled to said video display, system memory, and associated system components, for altering data according to the information provided by the associated system components by:

(i) creating a dynamic graphical representation by:

(A) determining initialization data including dynamic graphical representation parameters and data representation element data describing the actual underlying data corresponding to the data representation element;

(B) creating the background of the dynamic graphical representation without the data representation element using the dynamic graphical representation parameters;

(C) saving the background in a first system memory location;

(D) copying the background from the first system memory location to a second system memory location;

(E) creating the data representation element on the background at the second system memory location; and (F) displaying the dynamic graphical representation at the second system memory location having the background and the data representation element on the video display; and (ii) modifying the dynamic graphical representation by:

(A) copying the background from the first system memory location to the second system memory location;

(B) creating a new data representation element according to information received from the associated system components on the background at the second system memory location; and (C) displaying the dynamic graphical representation at the second system memory location having the background and the new data representation element on the video display.

45. Apparatus for use with a computer system having a processing unit, system memory, a user manipulation device, and a video display, for creating a dynamic graphical representation of data having at least one data representation element, comprising:

(a) a video display for displaying a dynamic graphical representation of data;

(b) a system memory for storing program instruction, data, and video display information;

(c) a user manipulation device for manipulating the dynamic graphical representation; and (d) a processing unit, coupled to said video display, system memory, and user manipulation device, for creating the dynamic graphical representation of data for display on the video display by:

(i) determining initialization data including dynamic graphical representation parameters, data representation element data describing the actual underlying data corresponding to the data representation element, and manipulation information indicating the manipulability of the dynamic graphical representation by the user manipulation device; and (ii) if the manipulation information indicates that the dynamic graphical representation cannot be manipulated by the user manipulation device, creating an output dynamic graphical representation.

46. The apparatus of claim 45, wherein:

(a) the dynamic graphical representation of data further includes background and a dynamic graphical representation type identifier;

(b) memory includes a first and a second system memory location; and (c) the processing unit creates an output dynamic graphical representation by:

(i) creating the background of the dynamic graphical representation without the data representation element using the dynamic graphical representation parameters;

(ii) saving the background in a first system memory location;

(iii) copying the background from the first system memory location to a second system memory location;

(iv) creating the data representation element on the background at the second system memory location;

(v) creating the dynamic graphical representation type identifier on the background at the second system memory location; and (vi) displaying the dynamic graphical representation at the second system memory location having the background, the data representation element, and the dynamic graphical representation type identifier on the video display.

* * * * *